(12) United States Patent
Kwak et al.

(10) Patent No.: US 12,328,169 B2
(45) Date of Patent: *Jun. 10, 2025

(54) CHANNEL STATE INFORMATION REPORTING FOR NON-COHERENT JOINT TRANSMISSION

(71) Applicant: Ofinno, LLC, Reston, VA (US)

(72) Inventors: Youngwoo Kwak, Woodbury, NY (US); Hua Zhou, Vienna, VA (US); Esmael Hejazi Dinan, McLean, VA (US); Ali Cagatay Cirik, Chantilly, VA (US)

(73) Assignee: OFINNO, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,728

(22) Filed: Mar. 6, 2024

(65) Prior Publication Data

US 2024/0259067 A1 Aug. 1, 2024

Related U.S. Application Data

(63) Continuation of application No. 16/939,242, filed on Jul. 27, 2020, now Pat. No. 11,929,805.

(Continued)

(51) Int. Cl.
*H04B 7/06* (2006.01)
*H04W 24/10* (2009.01)
(Continued)

(52) U.S. Cl.
CPC .......... *H04B 7/0626* (2013.01); *H04B 7/063* (2013.01); *H04W 24/10* (2013.01); *H04W 72/23* (2023.01)

(58) Field of Classification Search
None
See application file for complete search history.

(56) References Cited

U.S. PATENT DOCUMENTS

2015/0092768 A1 4/2015 Ng et al.
2016/0183244 A1 6/2016 Papasakellariou
(Continued)

OTHER PUBLICATIONS

3GPP TS 38.211 V15.6.0 (Jun. 2019); Technical Specification; 3rd Generation Partnership Project; Technical Specification Group Radio Access Network; NR; Physical channels and modulation; (Release 15).

(Continued)

*Primary Examiner* — Scott M Sciacca
(74) *Attorney, Agent, or Firm* — Matthew Fernandez; Kavon Nasabzadeh; Jacob L. Mangan

(57) ABSTRACT

A wireless device receives configuration parameters of channel state information (CSI) resource configurations for a CSI report configuration of a cell. The CSI resource configurations comprise first CSI resource configurations associated with a first transmission reception point (TRP) of the cell and second CSI resource configurations associated with at least two TRPs of the cell, wherein the at least two TRPs comprise the first TRP. The wireless device receives a command comprising a first field triggering the CSI report configuration of the cell and a second field indicating that the CSI report configuration is associated with the second CSI resource configurations. The wireless device transmits, based on the CSI report configuration and in response to the command, a CSI report comprising one or more CSI quantities of the at least two TRPs.

20 Claims, 51 Drawing Sheets

---

Receive configuration parameters of CSI resource configurations for a CSI report configuration, the CSI resource configurations comprising 1st CSI resource configurations for a 1st TRP and 2nd CSI resource configurations for 2nd TRPs
3910

↓

Receive a command comprising a 1st field triggering the CSI report configuration and a 2nd field indicating whether the CSI resport configuration is associated with the 1st CSI resource configurations or the 2nd CSI resource configurations
3920

↓

Transmit, based on the CSI report configuration and in response to the 2nd field indicating the CSI report configuration is associated with the 1st CSI resource configurations, a CSI report comprising 1st CSI quantit(ies) of the 1st TRP
3930

Related U.S. Application Data

(60) Provisional application No. 62/884,894, filed on Aug. 9, 2019, provisional application No. 62/878,928, filed on Jul. 26, 2019.

(51) Int. Cl.
*H04W 72/04* (2023.01)
*H04W 72/23* (2023.01)

(56) References Cited

U.S. PATENT DOCUMENTS

| | | | | |
|---|---|---|---|---|
| 2021/0167829 | A1* | 6/2021 | Li | H04B 7/0626 |
| 2021/0328644 | A1* | 10/2021 | Hao | H04B 7/0645 |
| 2022/0094399 | A1* | 3/2022 | Gao | H04B 7/0417 |
| 2022/0116183 | A1 | 4/2022 | Gao et al. | |

OTHER PUBLICATIONS

3GPP TS 38.212 V15.6.0 (Jun. 2019); Technical Specification; 3rd Generation Partnership Project; Technical Specification Group Radio Access Network; NR; Multiplexing and channel coding; (Release 15).
3GPP TS 38.213 V15.6.0 (Jun. 2019); Technical Specification; 3rd Generation Partnership Project; Technical Specification Group Radio Access Network; NR; Physical layer procedures for control; (Release 15).
3GPP TS 38.214 V15.6.0 (Jun. 2019); Technical Specification; 3rd Generation Partnership Project; Technical Specification Group Radio Access Network; NR; Physical layer procedures for data; (Release 15).
3GPP TS 38.321 V15.6.0 (Jun. 2019); Technical Specification; 3rd Generation Partnership Project; Technical Specification Group Radio Access Network; NR; Medium Access Control (MAC) protocol specification; (Release 15).
3GPP TS 38.331 V15.6.0 (Jun. 2019); Technical Specification; 3rd Generation Partnership Project; Technical Specification Group Radio Access Network; NR; Radio Resource Control (RRC) protocol specification; (Release 15).
R1-1906029; 3GPP TSG RAN WG1 #97; Reno, USA, May 13-17, 2019; Agenda Item: 7.2.8.2; Source: Huawei, HiSilicon; Title: Enhancements on Multi-TRP/panel transmission; Document for: Discussi on and Decision.
R1-1906159; 3GPP TSG RAN WG1 #97; Reno, USA, May 13-17, 2019; Source: vivo; Title: Further discussion on Multi-TRP/Panel transmission; Agenda Item: 7.2.8.2; Document for: Discussion and Decision.
R1-1906224; 3GPP TSG RAN WG1 #97; Reno, USA, May 13-17, 2019; Source: Ntt Docomo, Inc; Title: Enhancements on multi-TRP/ panel transmission; Agenda Item: 7.2.8.2; Document for: Discussion and Decision.
R1-1906236; 3GPP TSG RAN WG1 #97; Reno, USA, May 13-17, 2019; Source: ZTE; Title:Enhancements on Multi-TRP and Multi-panel Transmission; Agenda item: 7.2.8.2; Document for: Discussion and Decision.
R1-1906241; 3GPP TSG RAN WG1 #97; Reno, USA, May 13-17, 2019; Source: ZTE; Title: On single PDCCH design for multi-TRP and multi-panel; Agenda item: 7.2.8.5; Document for: Discussion and Decision.
R1-1906242; 3GPP TSG RAN WG1 #97; Reno, USA, May 13-17, 2019; Source: ZTE; Title: On multi-PDCCH design for multi-TRP; Agenda item: 7.2.8.5; Document for: Discussion and Decision.
R1-1906274; 3GPP TSG RAN WG1 Meeting #97; Reno, USA, May 13-17, 2019; Agenda Item: 7.2.8.2; Source: Lenovo, Motorola Mobility; Title: Discussion of multi-TRP/panel transmission; Document for: Discussion.
R1-1906287; 3GPP TSG RAN WG1 Meeting #97; Reno, USA, May 13-17, 2019; Source: OPPO; Title: Enhancements on multi-TRP and multi-panel transmission; Agenda Item: 7.2.8.2; Document for: Discussion and Decision.
R1-1906345; 3GPP TSG RAN WG1 Meeting #97; Reno, USA, May 13-17, 2019; Source: CATT; Title: On multi-TRP/panel transmission; Agenda Item: 7.2.8.2; Document for: Discussion and decision.
R1-1906369; 3GPP TSG RAN WG1 Meeting #97; Reno, USA, 1May 13-17, 2019; Agenda Item: 7.2.8.2; Source: Spreadtrum Communications; Title: Discussion on Multi-TRP transmission; Document for: Discussion and decision.
R1-1906398; 3GPP TSG RAN WG1 #97; Reno, US, May 13-17, 2019; Agenda item: 7.2.8.2; Source: NEC; Title: Discussion on multi-TRP operation; Document for: Discussion and Decision.
R1-1906445; 3GPP TSG RAN WG1 Meeting #97; Reno, USA, May 13-17, 2019; Source: Fujitsu; Title: Enhancements on multi-TRP transmission; Agenda Item: 7.2.8.2; Document for: Discussion and Decision.
R1-1906521; 3GPP TSG RAN WG1 #97; Reno, USA, May 13-17, 2019; Agenda item: 7.2.8.2; Source: CMCC; Title: Discussion on multi-TRP/panel transmission; Document for: Discussion and Decision.
R1-1906536; 3GPP TSG RAN WG1 #97; Reno, USA, May 13-17, 2019; Agenda Item: 7.2.8.2; Source: MediaTek Inc .; Title: Enhancements on multi-TRP/panel transmission; Document for: Discussion.
R1-1906730_MTRP; 3GPP TSG RAN WG1 Meeting #97; Reno, USA, May 13-17, 2019; Agenda item: 7.2.8.2; Source: LG Electronics; Title: Enhancements on multi-TRP/panel transmission; Document for: Discussion and Decision.
R1-1906815; 3GPP TSG RAN WG1 Meeting #97; Reno, Nevada, USA, May 13-17, 2019; Source: Intel Corporation; Title: On multi-TRP/multi-panel transmission; Agenda item: 7.2.8.2; Document for: Discussion and Decision.
R1-1906838; 3GPP TSG RAN WG1 Meeting #97; Reno, USA, May 13-17, 2019; Agenda Item: 7.2.8.2; Source: Sony; Title: Considerations on Multi-TRP/Panel Transmission; Document for: Discussion and Decision.
R1-1906860; 3GPP TSG RAN WG1 #97; Reno, USA, May 13- 17, 2019; Source: InterDigital Inc.; Title: Link-level Evaluation for M-TRP Transmission; Agenda item: 7.2.8.2; Document for: Discussion and Decision.
R1-1906886; 3GPP TSG RAN WG1 #97; Reno, USA, May 13-17, 2019; Agenda item: 7.2.8.2; Source: China Telecom; Title: Discussion on Multi-TRP/Panel Transmission enhancements; Document for: Discussion.
R1-1906968; 3GPP TSG RAN WG1 Meeting #97; Reno, USA, May 13-17, 2019; Agenda item: 7.2.8.2; Source: Samsung; Title: Enhancements on Multi-TRP/Panel Transmission; Document for: Discussion and Decision.
R1-1907026; 3GPP TSG RAN WG1 Meeting #97; Reno, USA, May 13-17, 2019; Agenda Item: 7.2.8.2; Source: CHTTL; Title: Discussion on Multi-TRP transmission; Document for: Discussion and decision.
R1-1907031; 3GPP TSG RAN WG1 #97; Reno, USA, May 13-17, 2019; Source: Panasonic; Title: On multi-TRP enhancements for NR MIMO in Rel. 16; Agenda Item: 7.2.8.2; Document for: Discussion.
R1-1907054; 3GPP TSG RAN WG1 Meeting #97; Reno, USA May 13-17, 2019; Agenda Item: 7.2.8.2—Enhancements on multi-TRP/ panel transmission; Source: Fraunhofer IIS, Fraunhofer HHI; Title: Enhancements on multi-TRP/panel transmission; Document for: Decision.
R1-1907171; 3GPP TSG RAN WG1 #97; Reno, USA, May 13-17, 2019; Agenda item: 7.2.8.2; Source: AT&T; Title: Remaining Issues in Multi TRP Transmission; Document for: Discussion/Decision.
R1-1907174; 3GPP TSG RAN WG1 Meeting #97; Reno, USA, May 13-May 17, 2019; Source: Mitsubishi Electric; Title: Views on NR multi-beam operations; Agenda Item: 7.2.8.2Enhancements on Multi-TRP/Panel Transmission; Document for: Discussion/ Decision.
R1-1907228; 3GPP TSG RAN WG1 Meeting #97; Reno, USA, May 13-17, 2019; Source: Sharp; Title: Discussion on multi-TRP/ panel techniques for URLLC; Agenda Item: 7.2.8.2; Enhancements on Multi-TRP/Panel Transmission; Document for: Discussion and Decision.

(56) References Cited

OTHER PUBLICATIONS

R1-1907289; 3GPP TSG-RAN WG1 Meeting #97; May 13-17, 2019; Reno, Nevada, USA; Agenda item: 7.2.8.2; Source: Qualcomm Incorporated; Title: Multi-TRP Enhancements; Document for: Discussion/Decision.

R1-1907316; 3GPP TSG RAN WG1 #97 Meeting; Reno, USA, May 13-May 17, 2019; Agenda item: 7.2.8.2; Source: Nokia, Nokia Shanghai Bell; Title: Enhancements on Multi-TRP/Panel Transmission; Document for: Discussion and Decision.

R1-1907342; 3GPP TSG RAN WG1 #97; Reno, USA, May 13-17, 2019; Agenda Item: 7.2.8.2; Source: Apple; Title: Considerations on enhancements on multi-beam operation; Document for: Discussion/Decision.

R1-1907359; 3GPP TSG-RAN WG1 Meeting #97; Reno, USA, May 13-17, 2019; Source: Asia Pacific Telecom; Title: Enhancements on Multi-TRP transmission; Agenda item: 7.2.8.2; Document for: Discussion and Decision.

R1-1907417; 3GPP TSG RAN WG1 Meeting #97; Reno, USA, May 13-17, 2019; Source: KDDI; Title: Enhancements on Multi-TRP/panel transmission; Agenda Item: 7.2.8.2; Document for: Discussion/Decision.

R1-1907418; 3GPP TSG RAN WG1 Meeting RAN1#97; Reno, US, May 13-17, 2019; Source: Ericsson; Title: On multi-TRP and multi-panel; Agenda Item: 7.2.8.2; Document for: Discussion and Decision.

R1-1907442; 3GPP TSG RAN WG1 #97; Reno, USA, May 13-17, 2019; Agenda Item: 7.2.8.2; Source: Xiaomi; Title: Enhancements on Multi-TRP/Panel Transmission; Document for: Discussion and Decision.

R1-1907443; 3GPP TSG RAN WG1 #97; Reno, USA, May 13-17, 2019; Agenda Item: 7.2.8.2; Source: ASUSTek; Title: Enhancements on multiple TRP or panel transmission; Document for: Discussion and Decision.

\* cited by examiner

User Plane Protocol Stack

Control Plane Protocol Stack

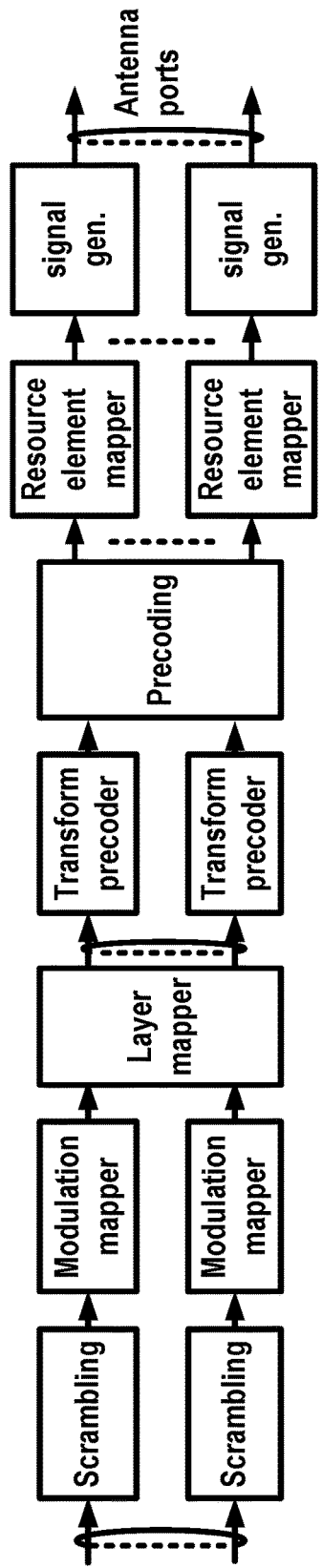
FIG. 4A
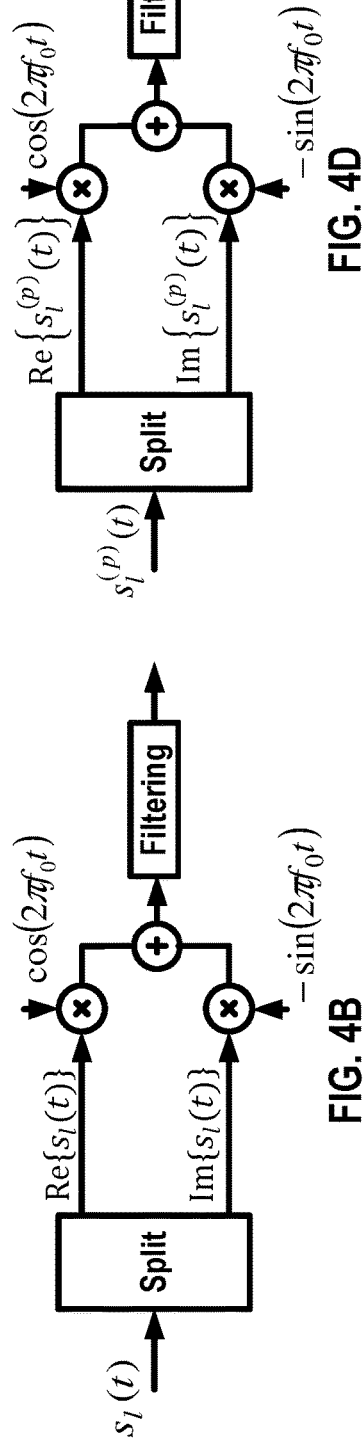
FIG. 4B
FIG. 4D
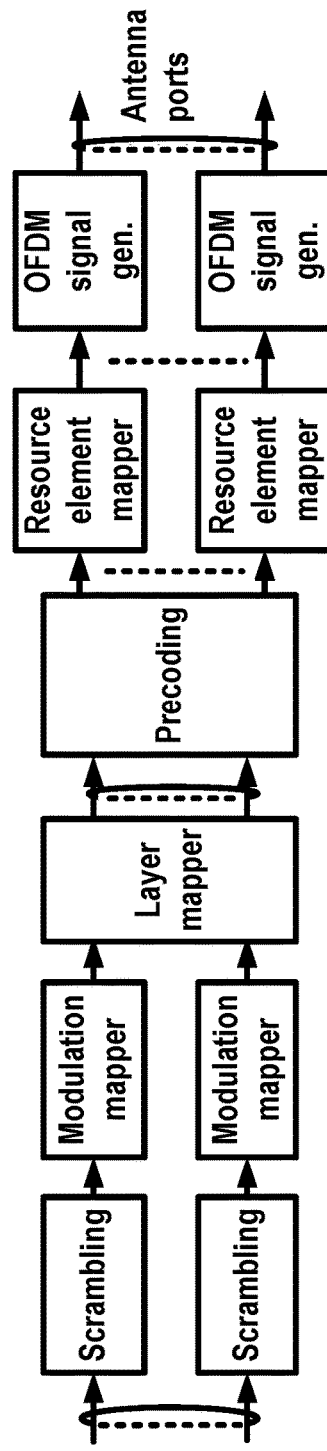
FIG. 4C

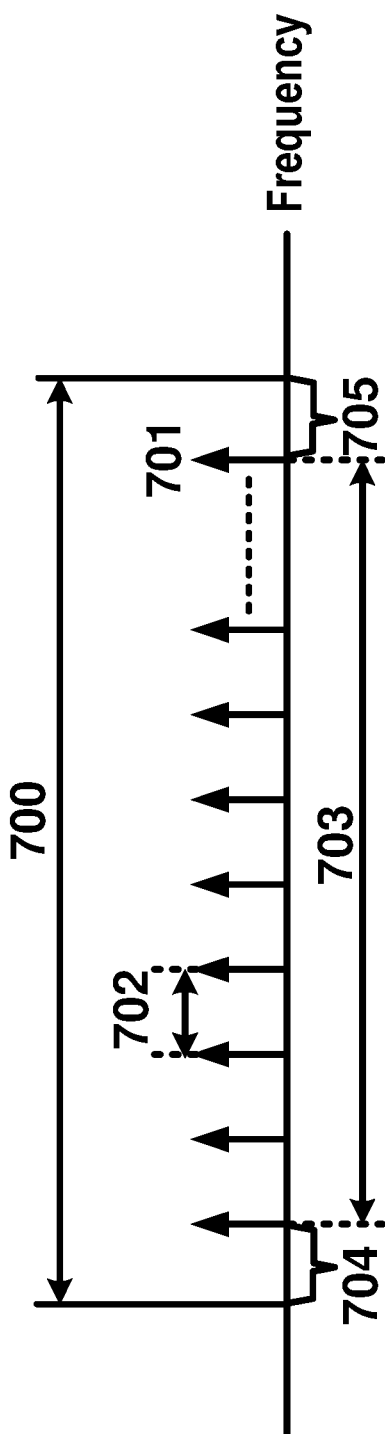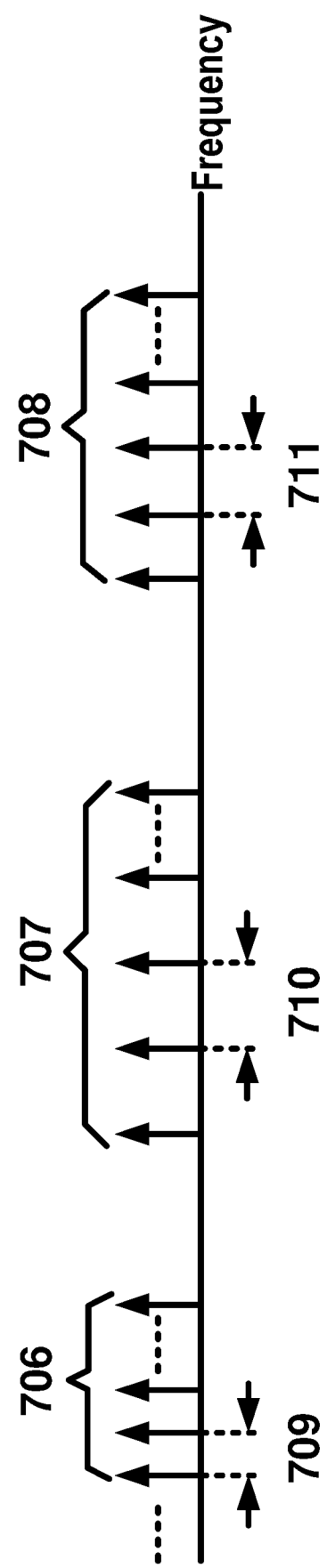

| | Oct 1 | Oct 2 | Oct 3 | | Oct N | |
|---|---|---|---|---|---|---|
| R | BWP ID | $T_0$ | $T_8$ | | $T_{(N-2) \times 8}$ | |
| | | $T_1$ | $T_9$ | | $T_{(N-2) \times 8+1}$ | |
| | Serving Cell ID | $T_2$ | $T_{10}$ | ⋮ | $T_{(N-2) \times 8+2}$ | |
| | | $T_3$ | $T_{11}$ | | $T_{(N-2) \times 8+3}$ | |
| | | $T_4$ | $T_{12}$ | | $T_{(N-2) \times 8+4}$ | |
| | | $T_5$ | $T_{13}$ | | $T_{(N-2) \times 8+5}$ | |
| | | $T_6$ | $T_{14}$ | | $T_{(N-2) \times 8+6}$ | |
| | | $T_7$ | $T_{15}$ | | $T_{(N-2) \times 8+7}$ | |

FIG. 25

Activation/deactivation MAC CE for semi-persistent CSI with PUCCH

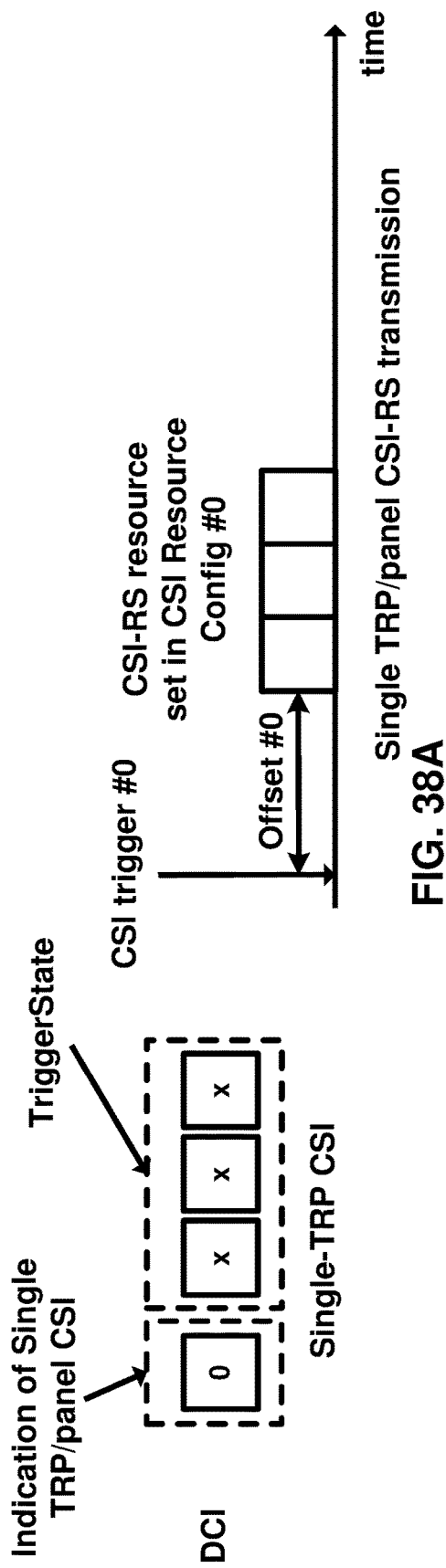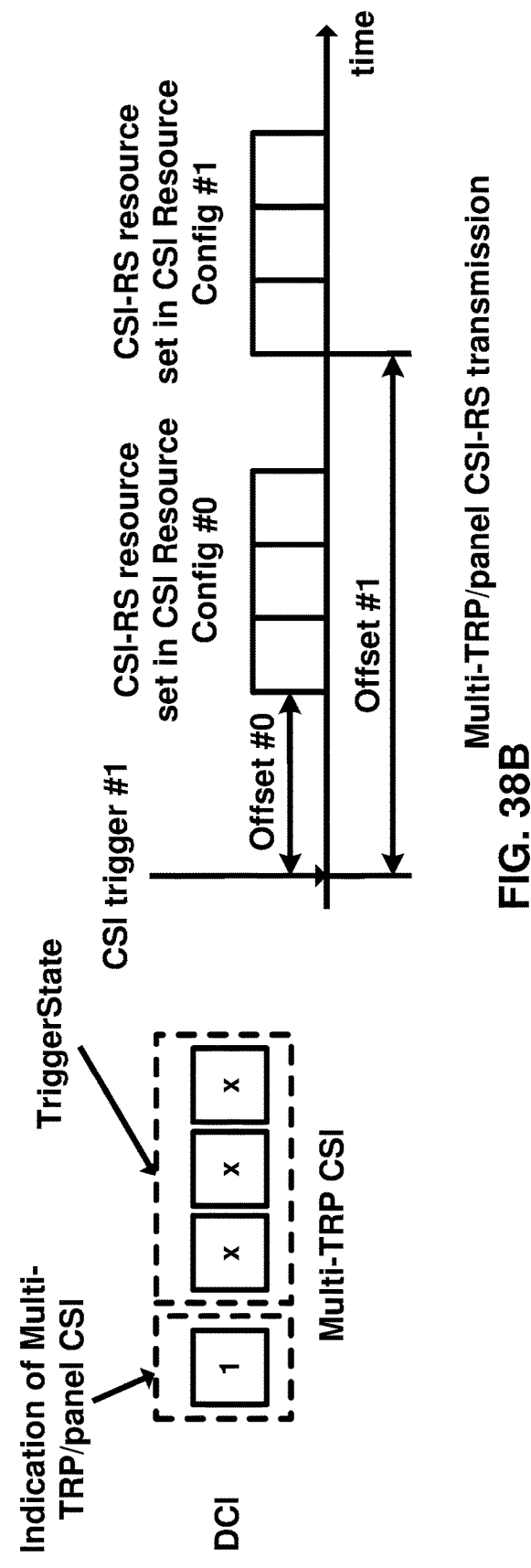
FIG. 38A
FIG. 38B

SRS resource set activation/deactivation MAC CE

Activation/deactivation MAC CE for semi-persistent CSI with PUCCH

Activation/deactivation MAC CE for semi-persistent CSI-RS and CSI-IM

CHANNEL STATE INFORMATION REPORTING FOR NON-COHERENT JOINT TRANSMISSION

CROSS-REFERENCE TO RELATED APPLICATIONS

This application is a continuation of U.S. patent application Ser. No. 16/939,242, filed Jul. 27, 2020, which claims the benefit of U.S. Provisional Application No. 62/878,928, filed Jul. 26, 2019, and U.S. Provisional Application No. 62/884,894, filed Aug. 9, 2019, all of which are hereby incorporated by reference in their entireties.

BRIEF DESCRIPTION OF THE DRAWINGS

Examples of several of the various embodiments of the present disclosure are described herein with reference to the drawings.

FIG. 4A, FIG. 4B, FIG. 4C, and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an example embodiment of the present disclosure.

FIG. 25 is a diagram showing applications of MAC CE for trigger state subselection as per an aspect of an example embodiment of the present disclosure.

FIG. 38A and FIG. 38B are diagrams showing operation of CSI-RS transmission as per an aspect of an example embodiment of the present disclosure.

DETAILED DESCRIPTION

Figure 1:
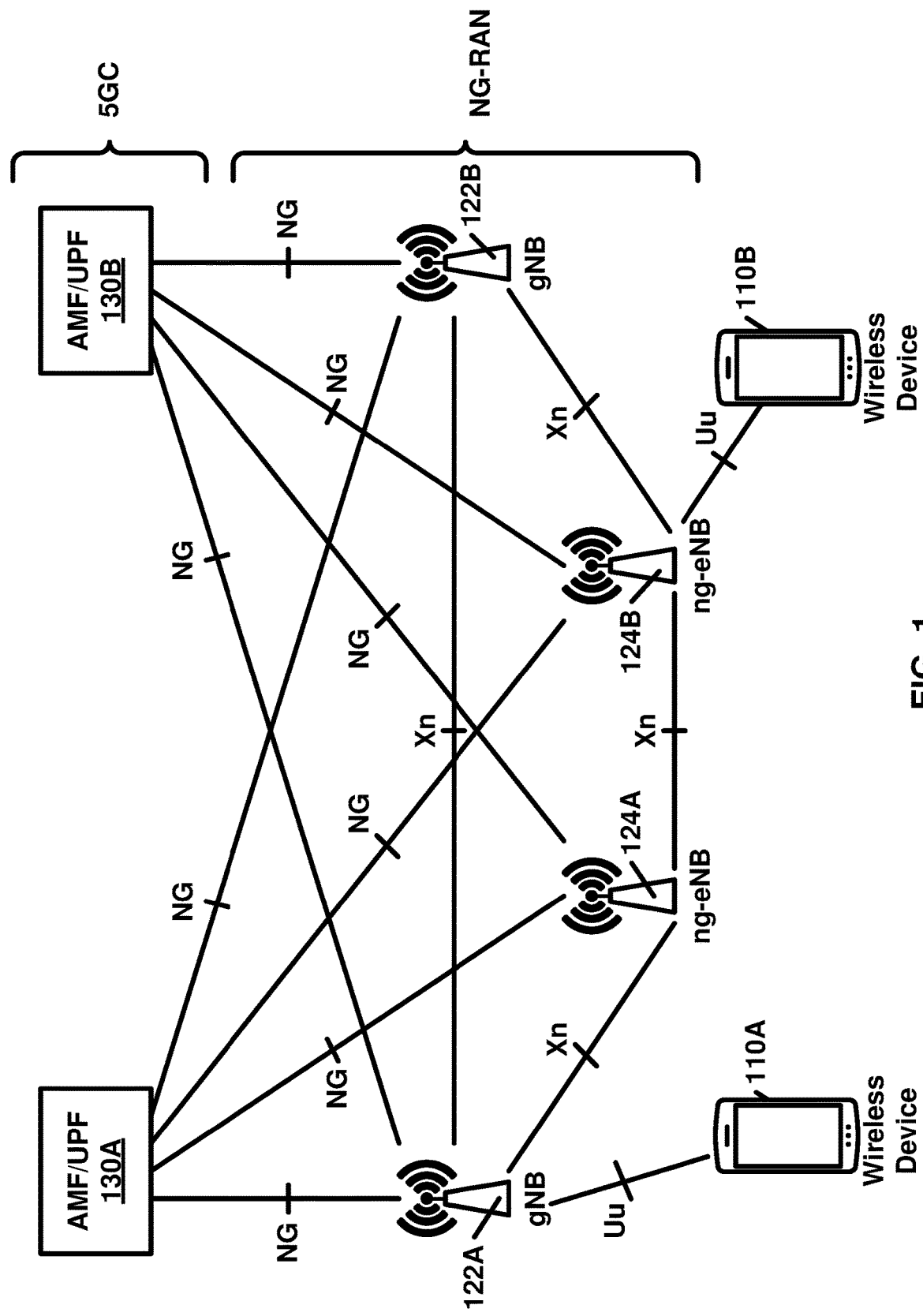
FIG. 1 is a diagram of an example RAN architecture as per an aspect of an embodiment of the present disclosure.

Example embodiments of the present disclosure enable dynamic indication of channel state information reporting type from a base station to a wireless device. Embodiments of the technology disclosed herein may be employed in the technical field of multicarrier communication systems. More particularly, the embodiments of the technology disclosed herein may relate to a wireless device and/or a base station in multicarrier communication systems.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
AP Aperiodic
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix—Orthogonal Frequency Division Multiplex
C-RNTI Cell-Radio Network Temporary Identifier
CS Configured Scheduling
CSI Channel State Information
CSI-IM Channel State Information-Interference Measurement
CSI-RS Channel State Information-Reference Signal
CQI Channel Quality Indicator
CRI CSI-RS Resource Indicator
CSS Common Search Space
CU Central Unit
DC Dual Connectivity
DCCH Dedicated Control CHannel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic CHannel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LI Layer Indicator
LTE Long Term Evolution
L1-RSRP Layer-1 Reference Signal Received Power
MAC Media Access Control
MAC CE Media Access Control Control Element
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC NZP CSI-RS Non Zero Power Channel State Information Reference Signal
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTIRandom Access-Radio Network Temporary Identifier
RB Resource Blocks
RBG Resource Block Groups
RI Rank Indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SP Semi-Persistent
SpCell Special Cell
SRB Signaling Radio Bearer
SRS Sounding Reference Signal
SS Synchronization Signal
SSBRI SS/PBCH Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TCI Transmit Configuration Indicator
TC-RNTITemporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane
ZP CSI-RS Zero Power Channel State Information Reference Signal Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
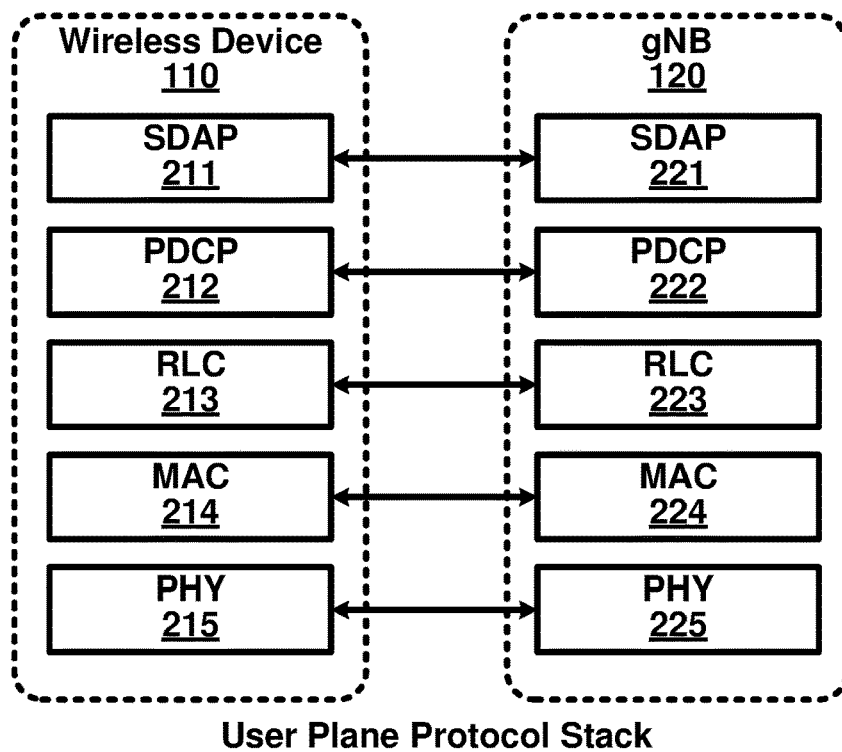
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
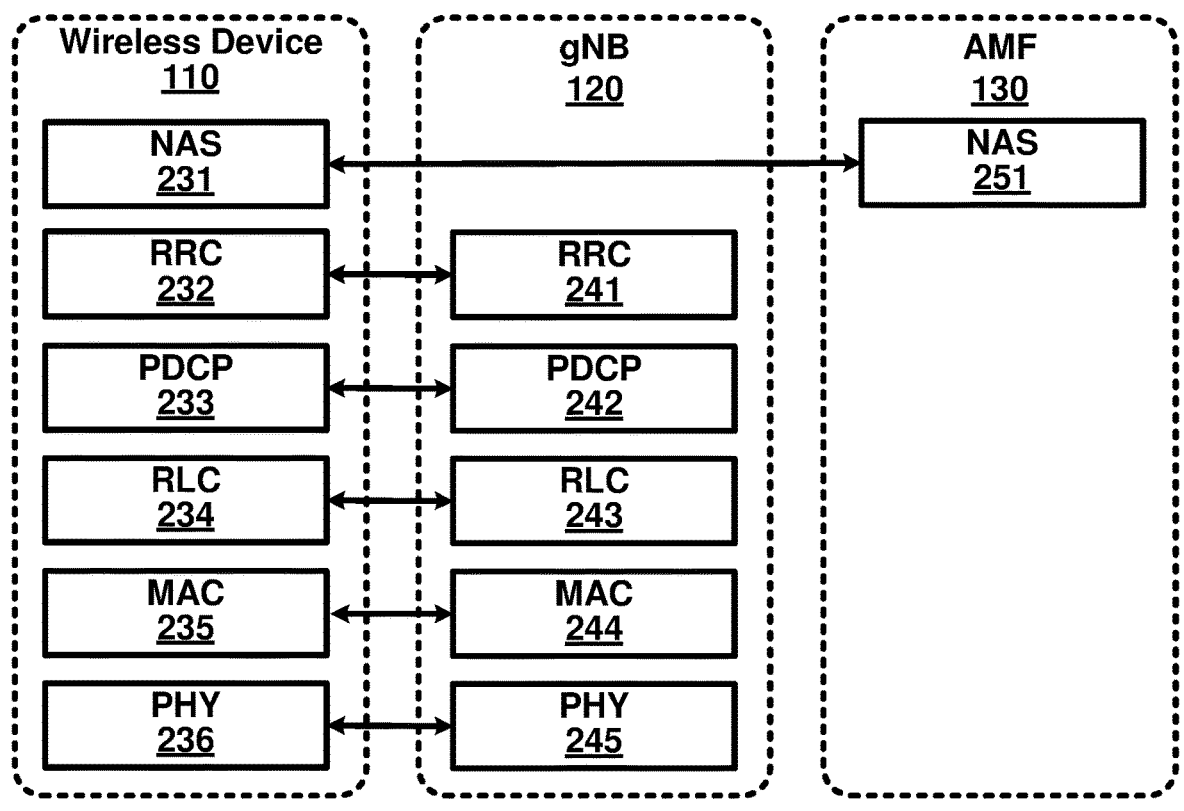
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTIlnumerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
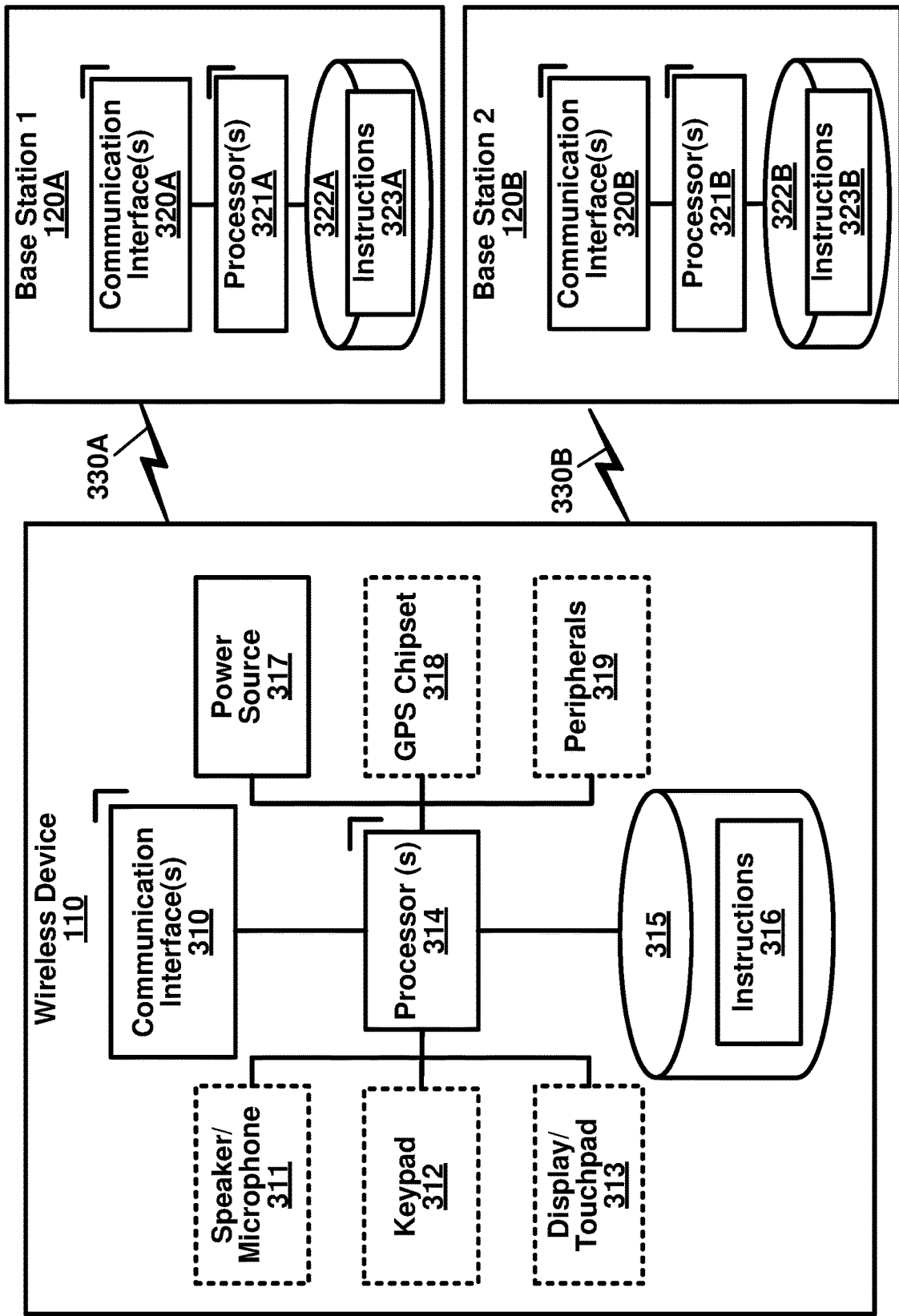
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. Master/nformationBlock and SysteminformationBlockType1). Another SI may be transmitted via SysteminformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C, and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
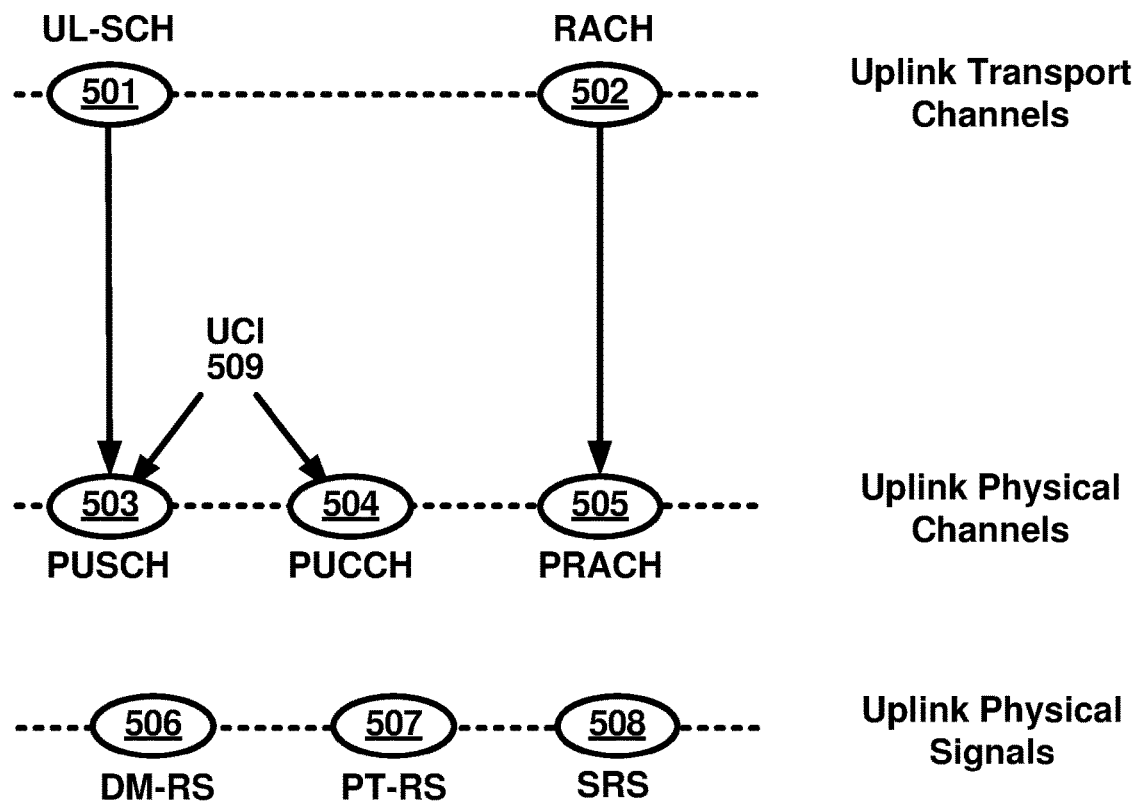
FIG. 5A is a diagram of an example uplink channel mapping and example uplink physical signals as per an aspect of an embodiment of the present disclosure.
Figure 5B:
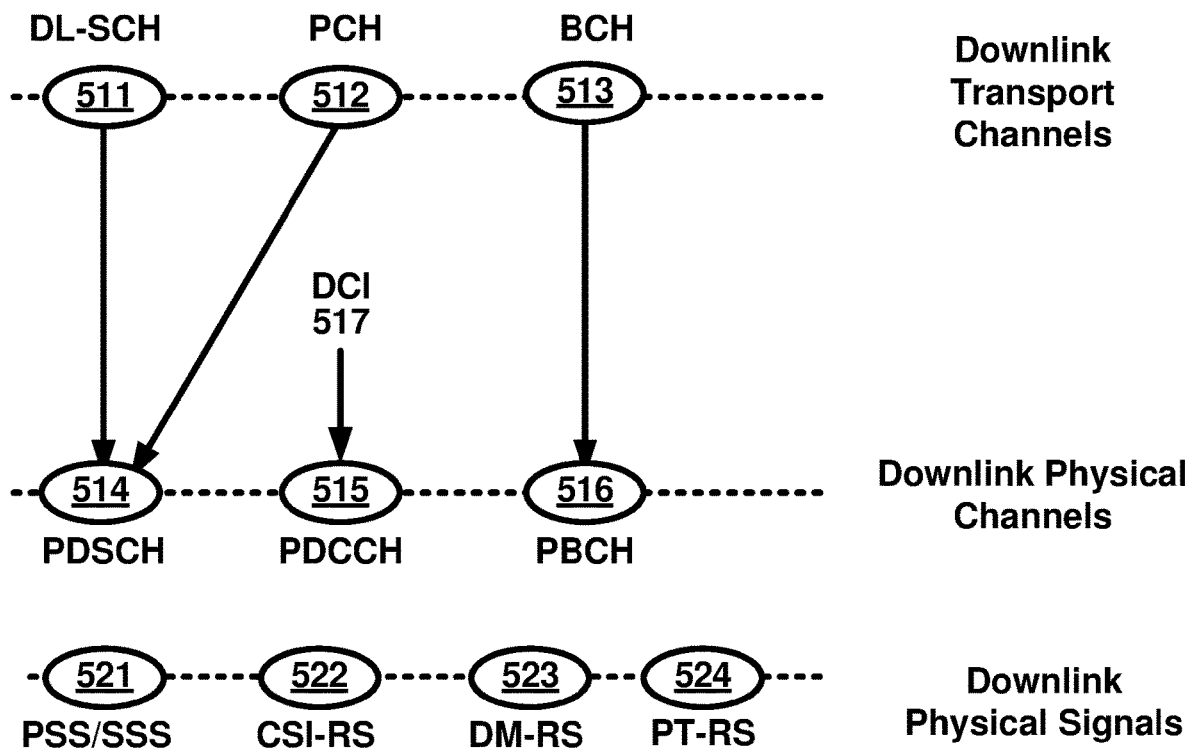
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (CORESET) when the downlink CSI-RS 522 and CORESET are spatially quasi co-located and resource elements associated with the downlink CSI-RS 522 are the outside of PRBs configured for CORESET. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
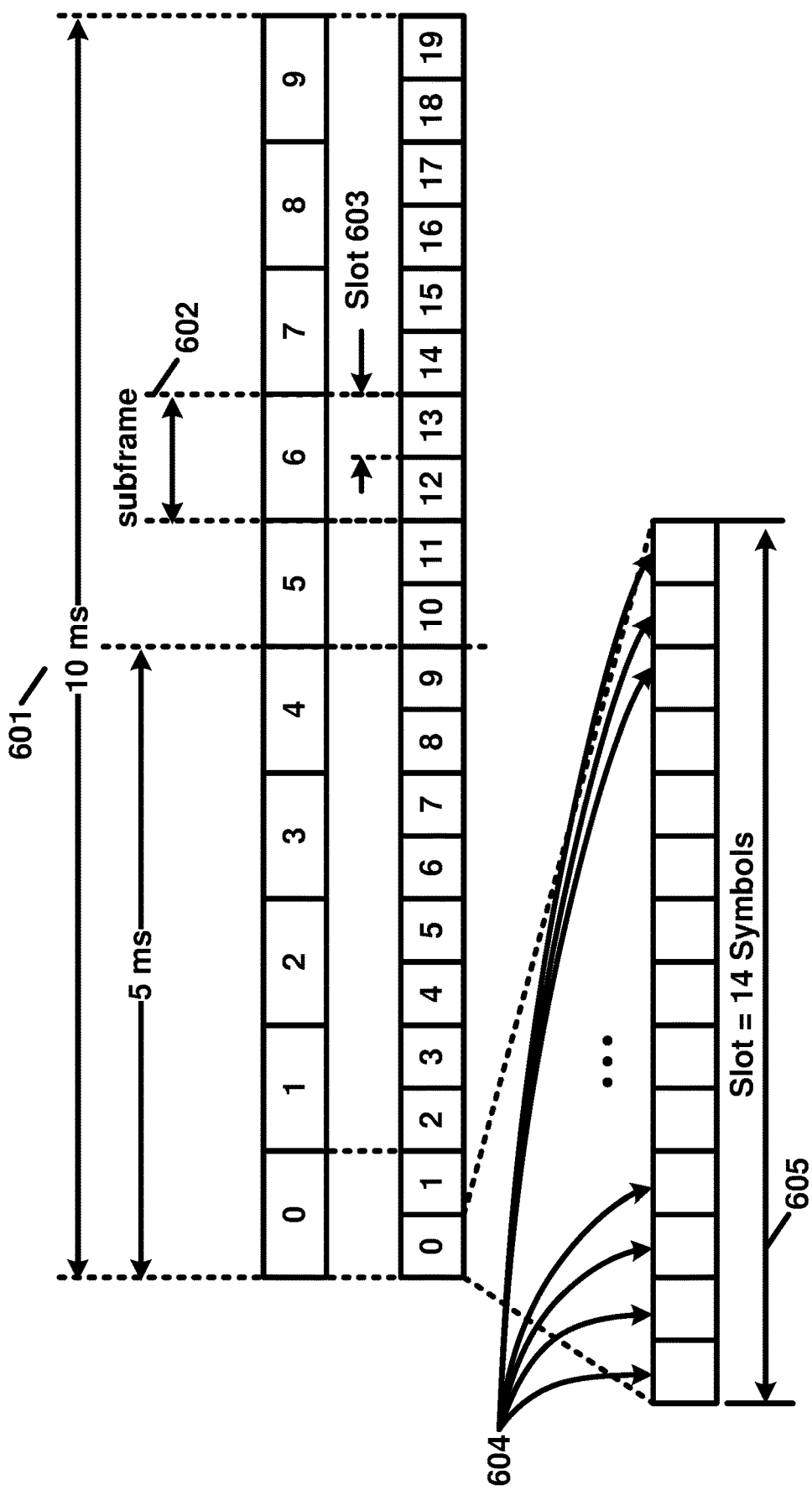
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
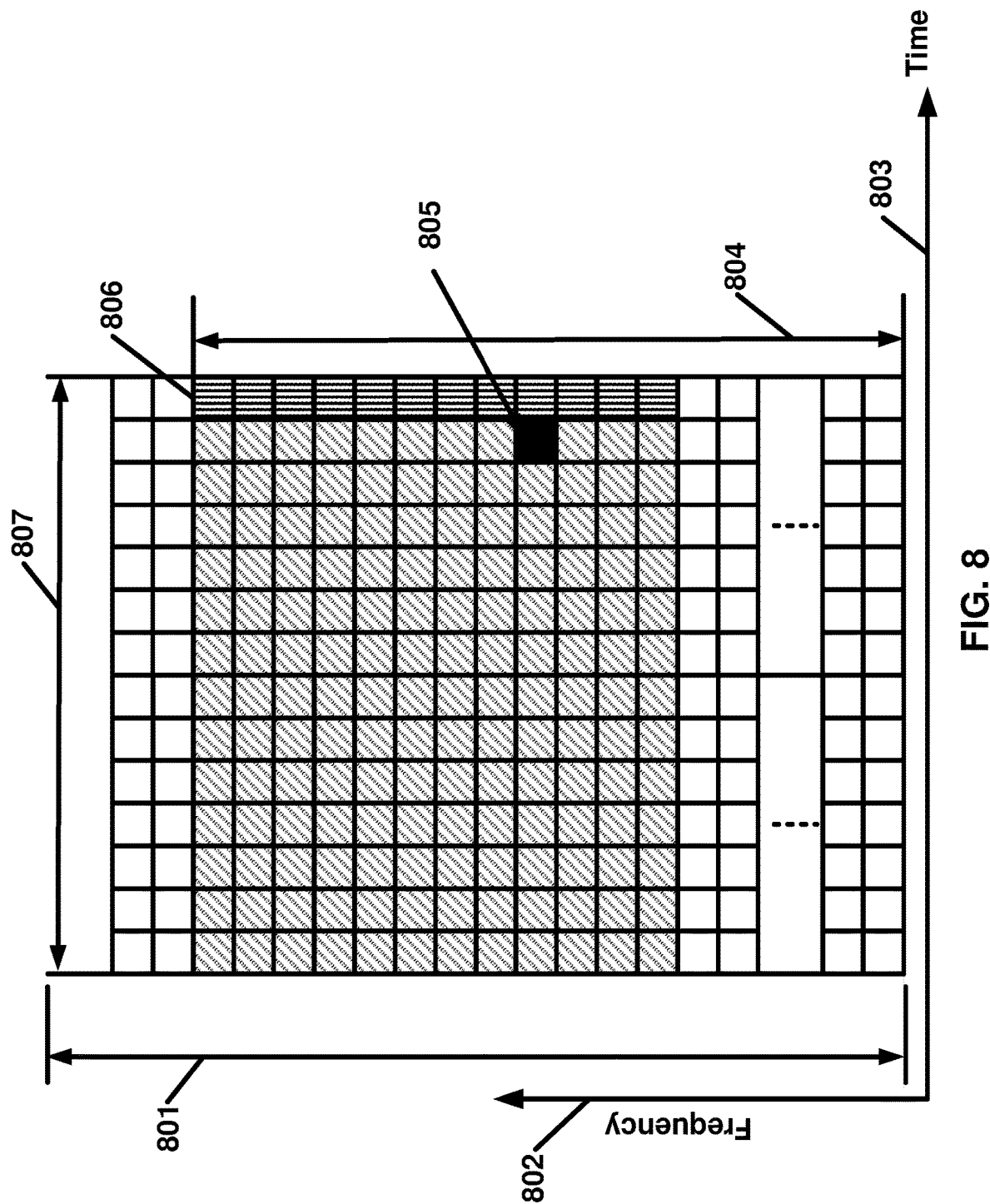
FIG. 8 is a diagram depicting example OFDM radio resources as per an aspect of an example embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
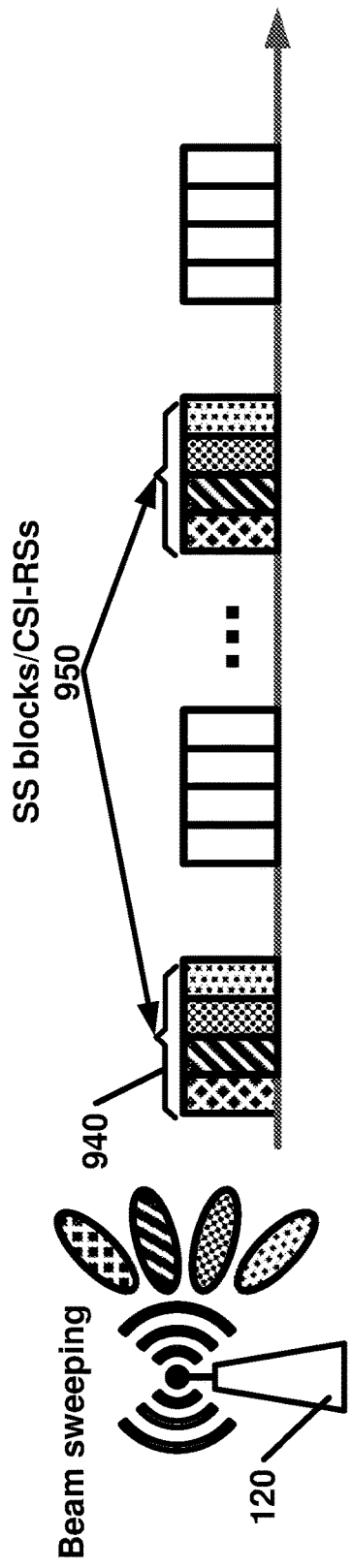
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
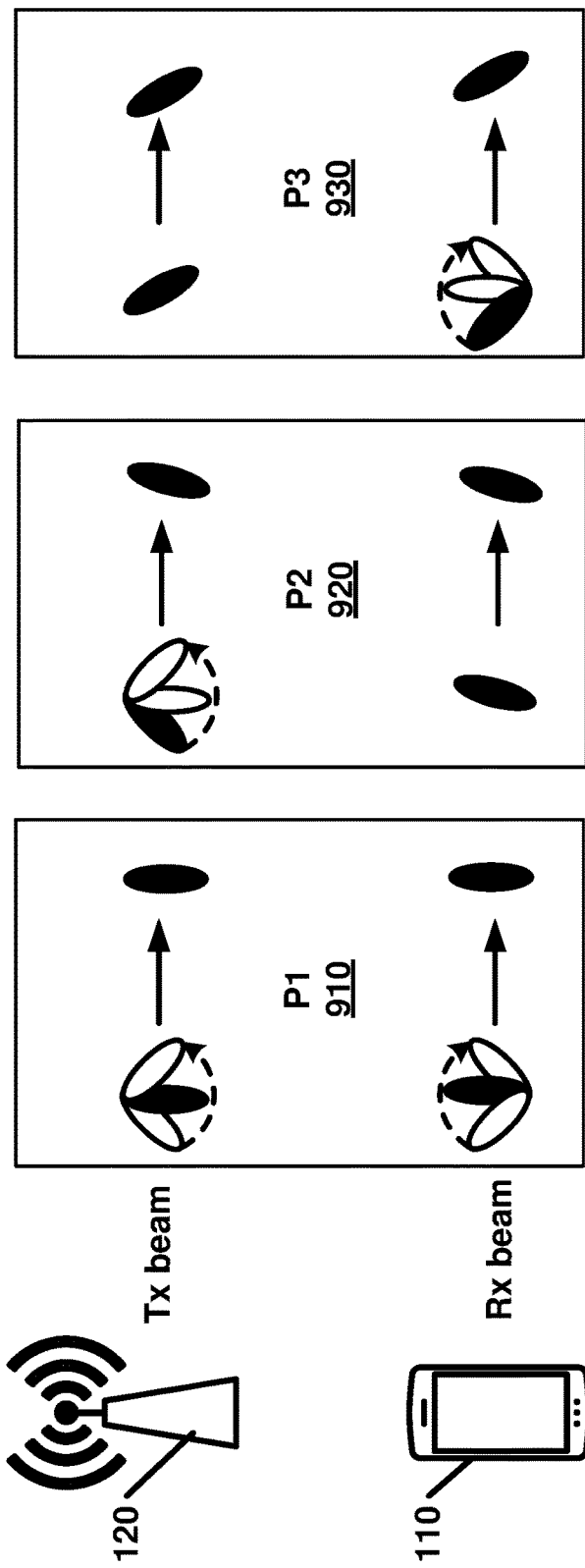
FIG. 9B is a diagram depicting an example downlink beam management procedure as per an aspect of an example embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
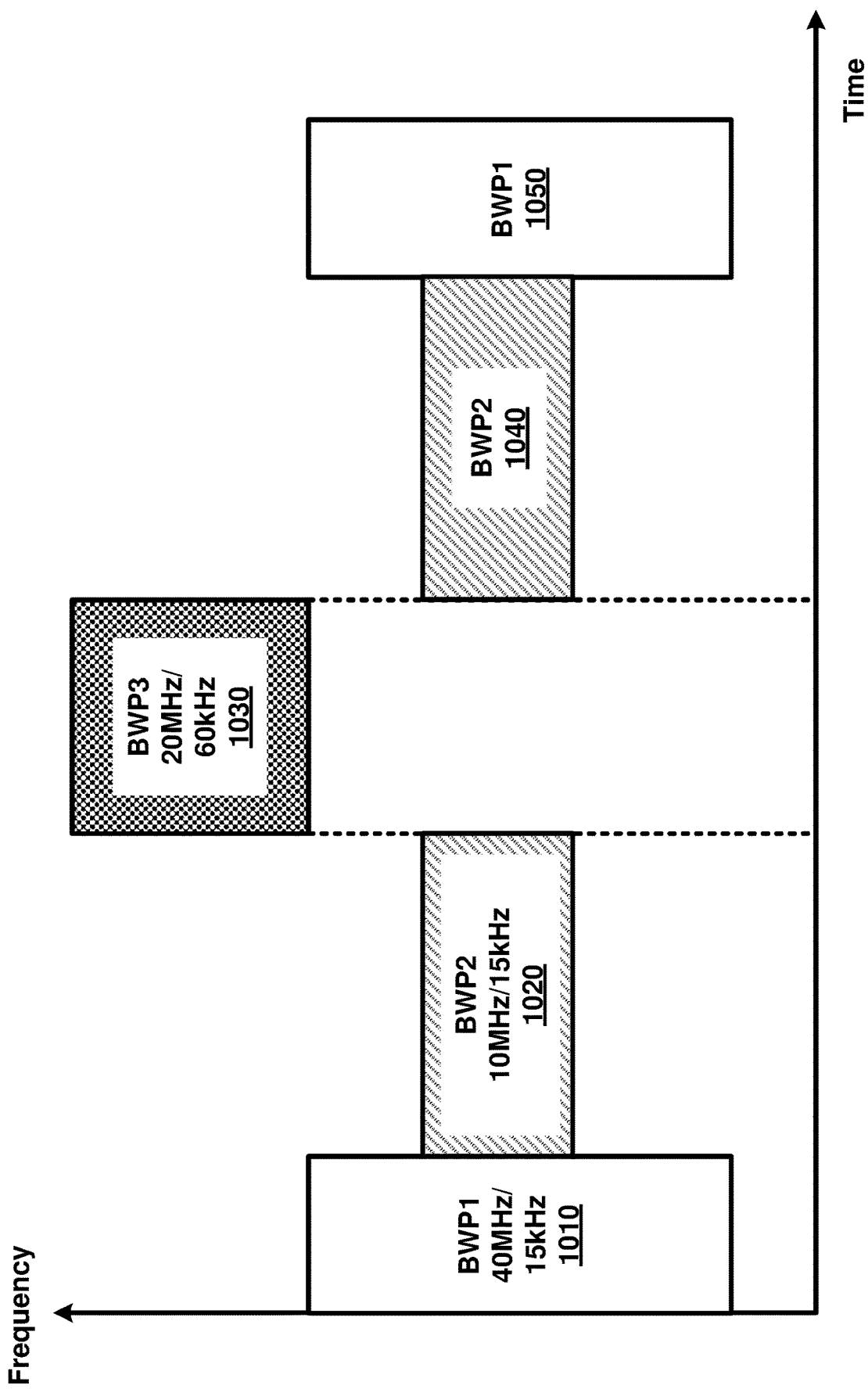
FIG. 10 is a diagram of configured BWPs as per an aspect of an example embodiment of the present disclosure.

FIG. 10 is a diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is a diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
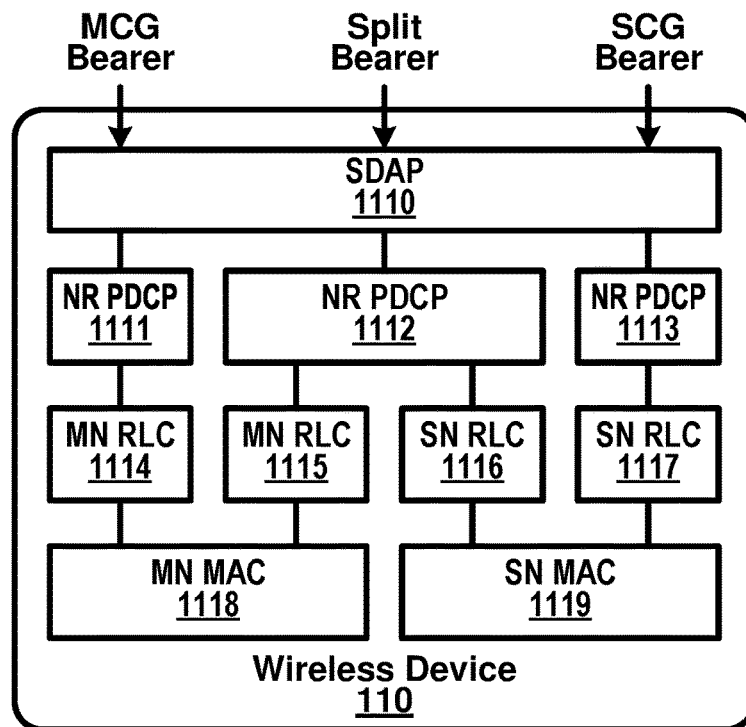
FIG. 11A and FIG. 11B are diagrams of a multi connectivity as per an aspect of an example embodiment of the present disclosure.
Figure 11B:
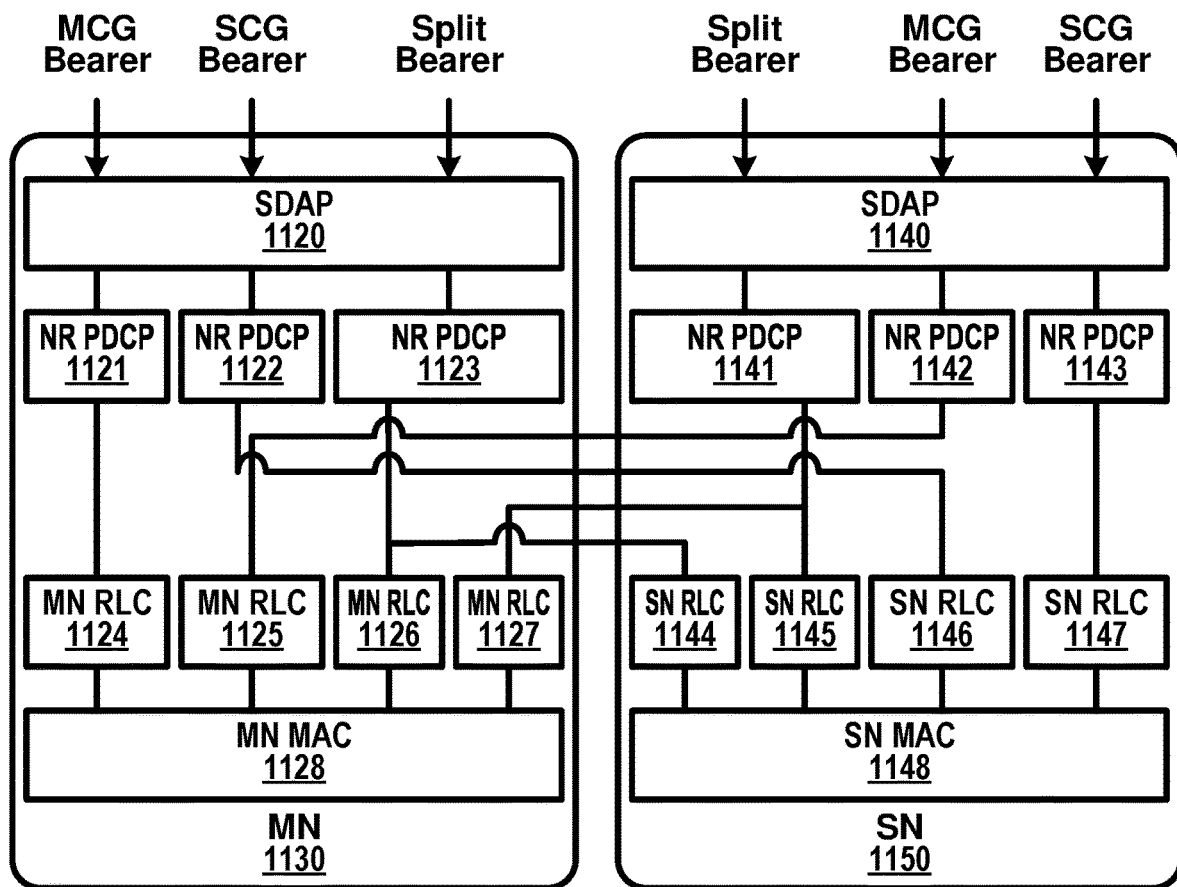

FIG. 11A and FIG. 11B show packet flows employing a multi connectivity (e.g. dual connectivity, multi connectivity, tight interworking, and/or the like). FIG. 11A is a diagram of a protocol structure of a wireless device 110 (e.g. UE) with CA and/or multi connectivity as per an aspect of an embodiment. FIG. 11B is a diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not be supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
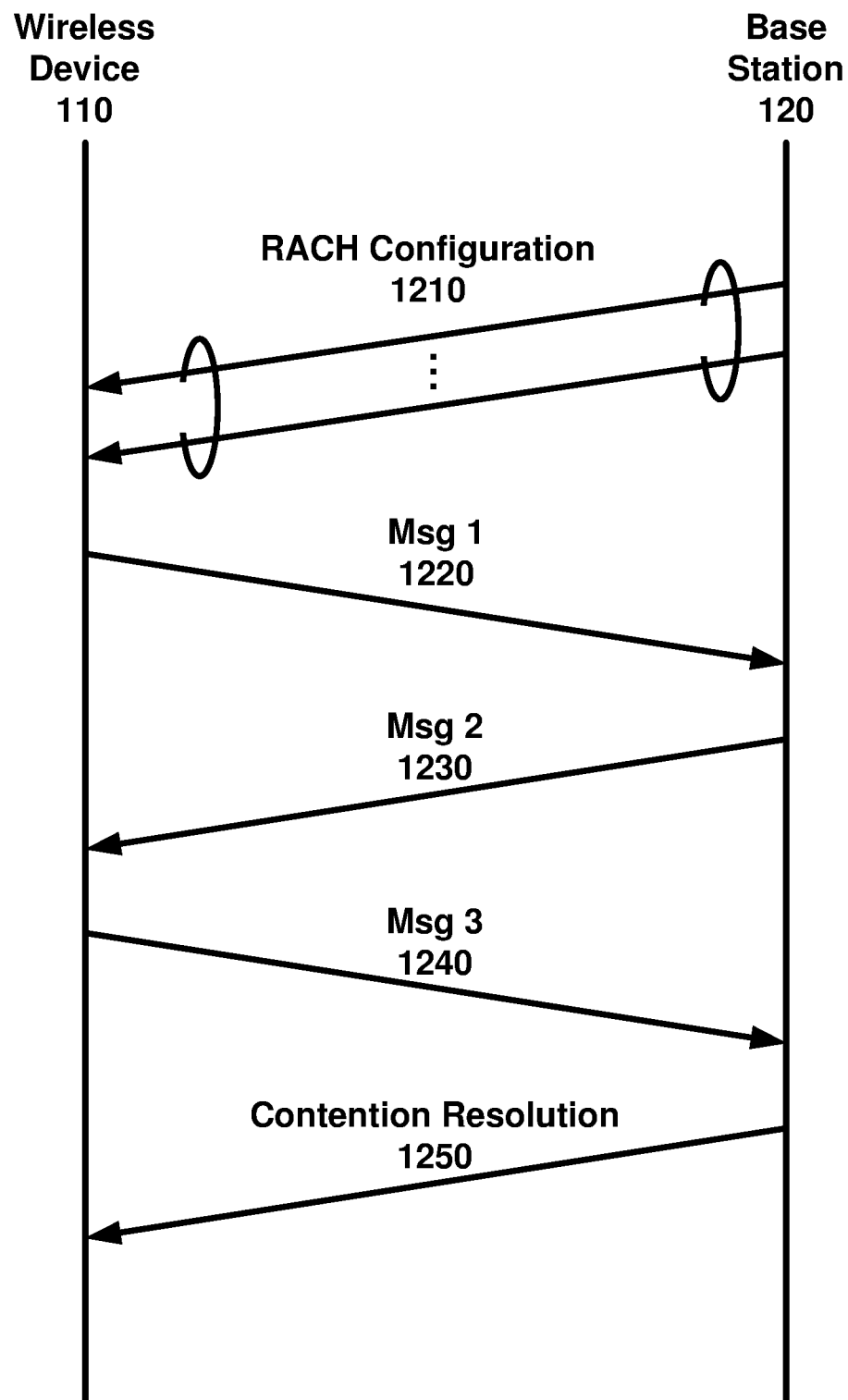
FIG. 12 is a diagram of a random access procedure as per an aspect of an example embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-Response Window) to monitor a random access response. For beam failure recovery request, a base station may configure a UE with a different time window (e.g., bfr-Response Window) to monitor response on beam failure recovery request. For example, a UE may start a time window (e.g., ra-Response Window or bfr-Response Window) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
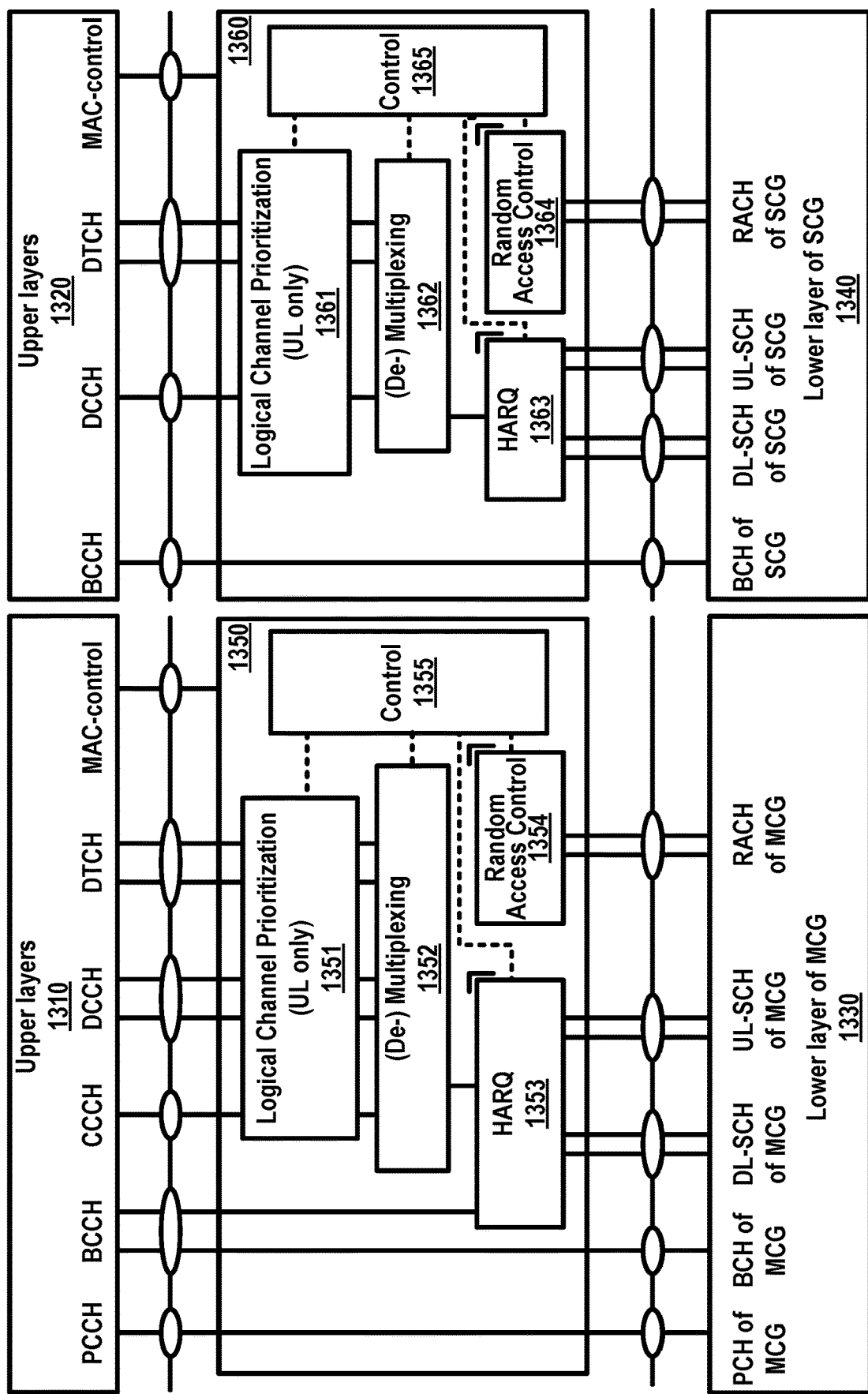
FIG. 13 is a structure of example MAC entities as per an aspect of an example embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
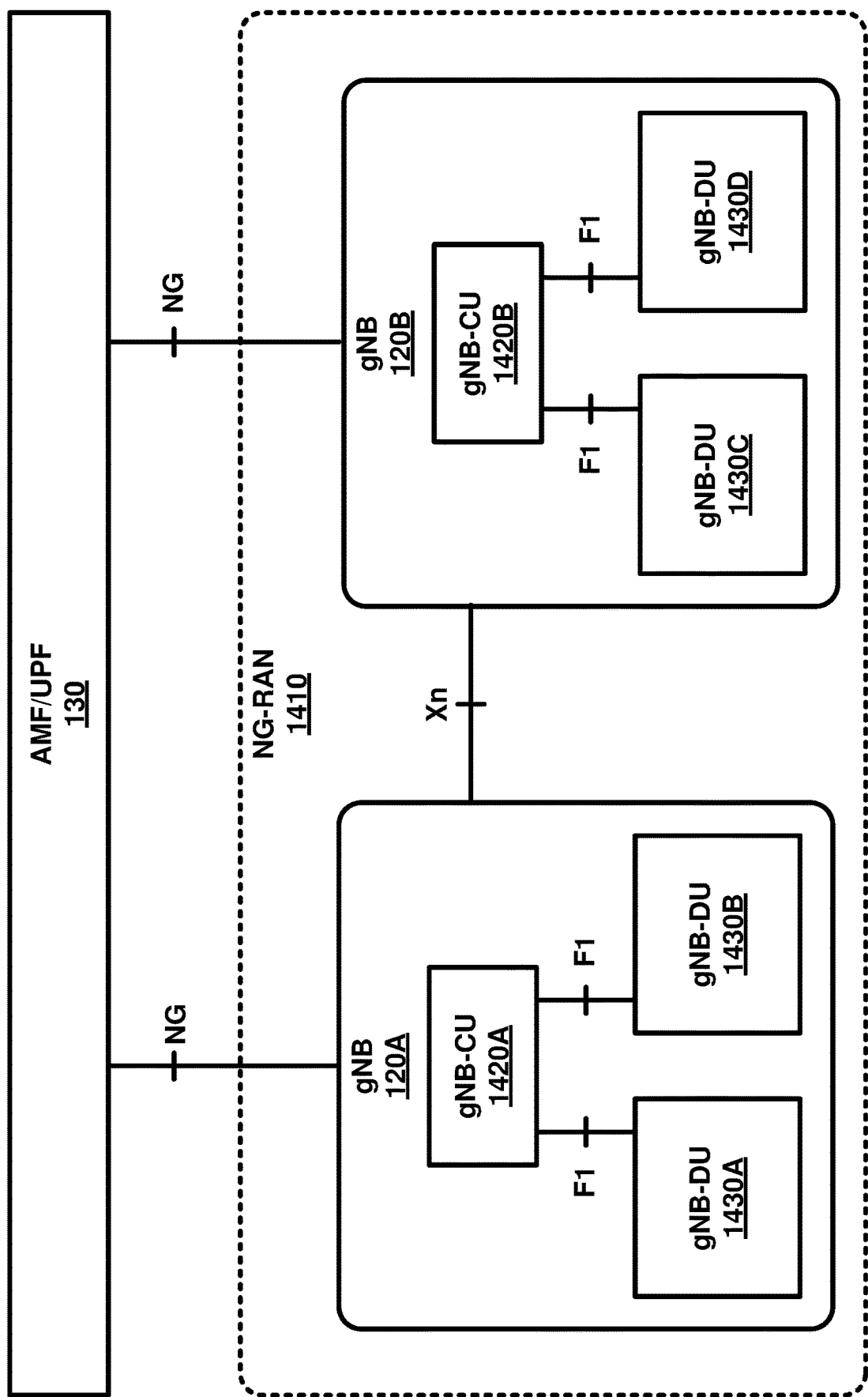
FIG. 14 is a diagram of a RAN architecture as per an aspect of an example embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
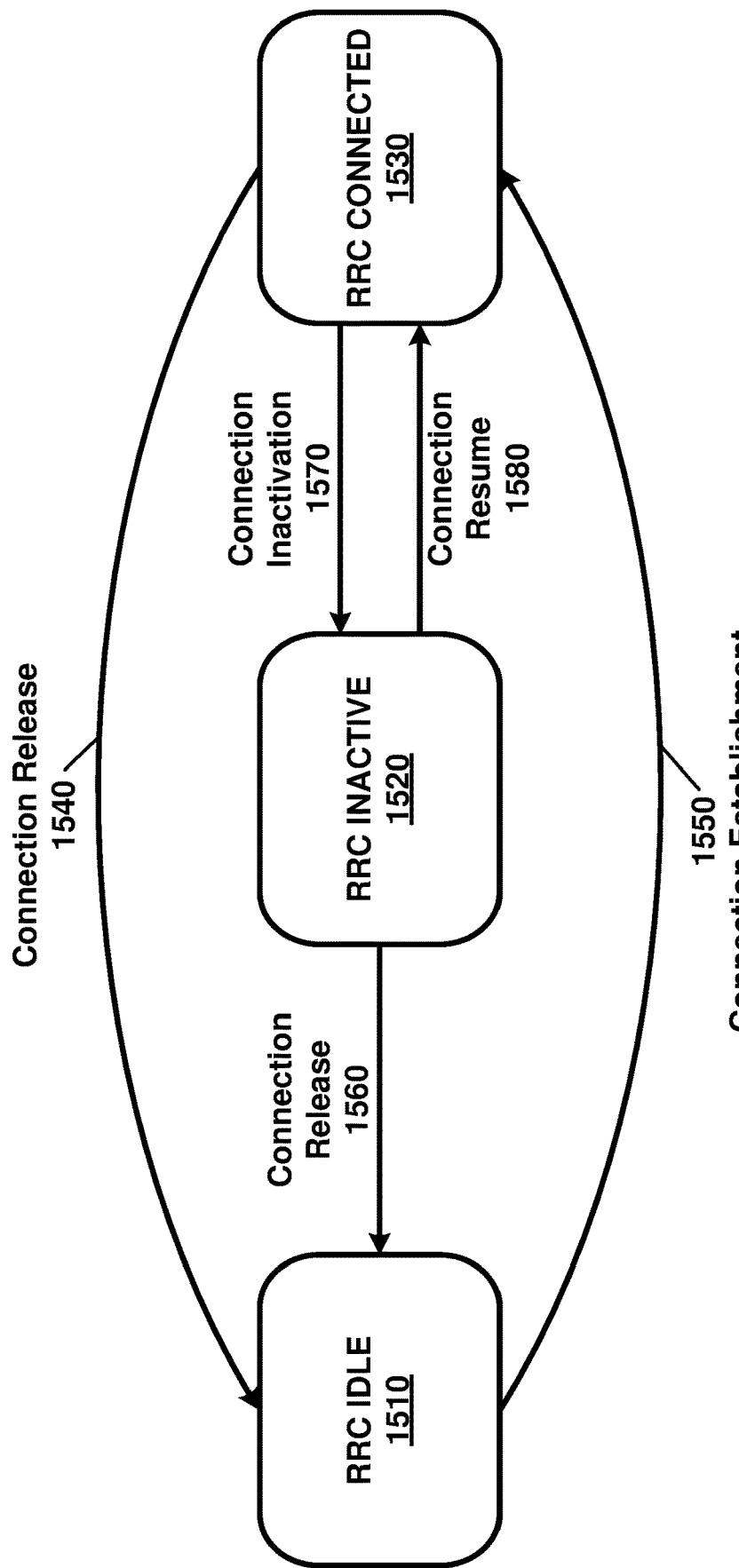
FIG. 15 is a diagram of RRC states as per an aspect of an example embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Figure 16:
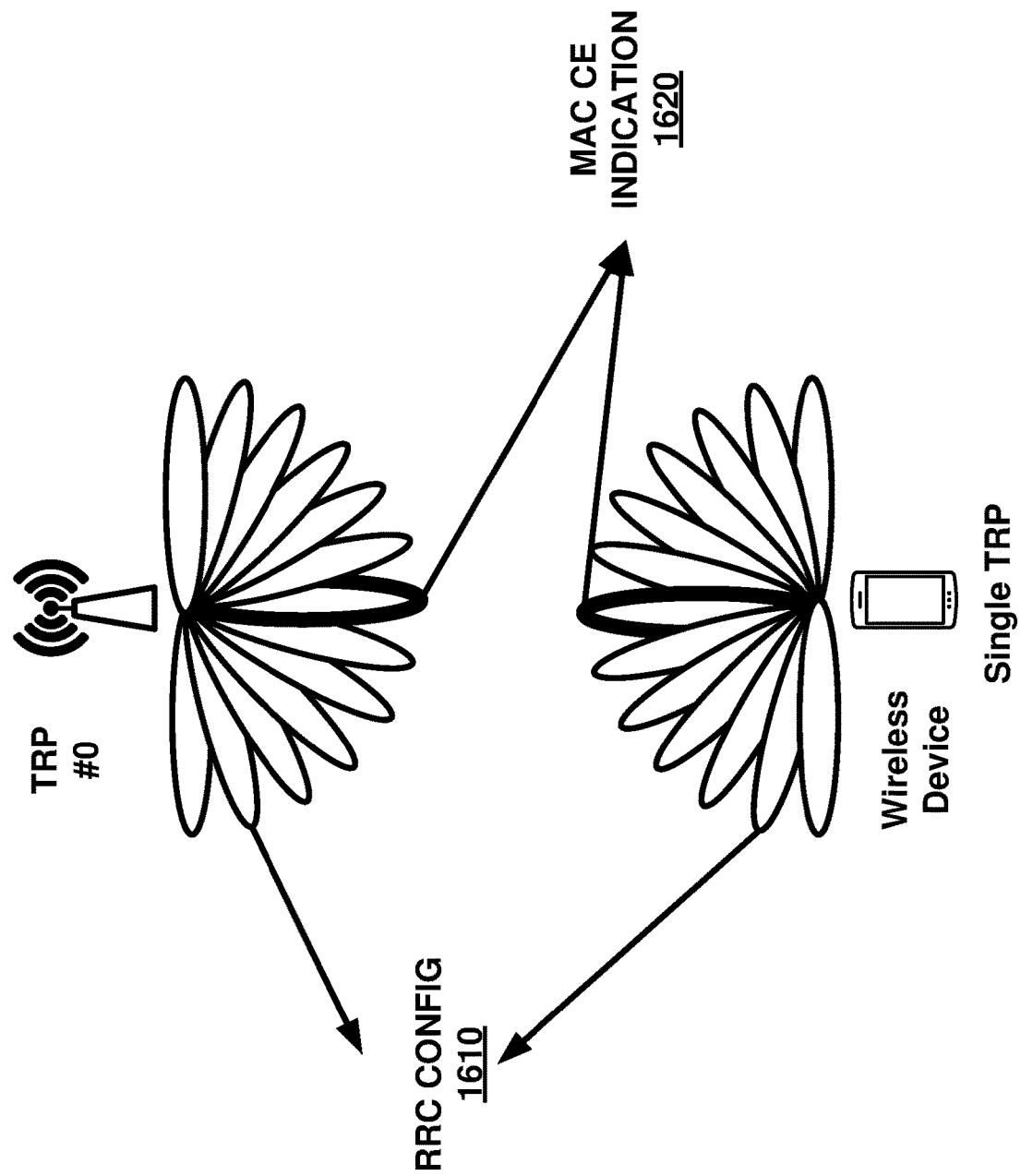
FIG. 16 is a diagram showing beam operation procedures as per an aspect of an example embodiment of the present disclosure.

FIG. 16 is an example diagram illustrating procedures for beam configuration activation, and indication procedures from a base station with a single Transmission and Reception Point (TRP) and panel in accordance with embodiments of the present disclosure. In an example, the base station may configure one or more Transmission Configuration Indication (TCI) states in RRC configurations (e.g., 1610) to support configurations of one or more reference signals to acquire channel characteristics (e.g., Doppler spread, Doppler shift, average delay, delay spread, and spatial Rx parameter) of the wireless channel between the base station and the wireless device. MAC CE signaling (e.g., 1620) from the base station may indicate one TCI state, which may be used for the reception of downlink channels (e.g., PDCCH), among the configured TCI states in RRC configurations (e.g., 1610) of the wireless device.

For each DL BWP configured to a wireless device in a serving cell, the wireless device may be provided by higher layer signaling with up to 3 CORESETs. For each CORESET, the wireless device may be provided a CORESET index p (e.g., 0 p<12, by controlResourceSetId), a DMRS scrambling sequence initialization value (e.g., pdcch-DMRS-ScramblingID), a precoder granularity for a number of REGs in the frequency domain where the UE may assume use of a same DMRS precoder (e.g., precoderGranularity), a number of consecutive symbols (e.g., duration), a set of resource blocks provided by frequencyDomainResources, CCE-to-REG mapping parameters (e.g., cce-REG-MappingType), an antenna port quasi co-location, from a set of antenna port quasi co-locations provided by TCI-State, indicating quasi co-location information of the DMRS antenna port for PDCCH reception in a respective CORESET, and an indication for a presence or absence of a TCI field for DCI format 11 transmitted by a PDCCH in CORESET (e.g., TCI-PresentInDCI).

Figure 17:
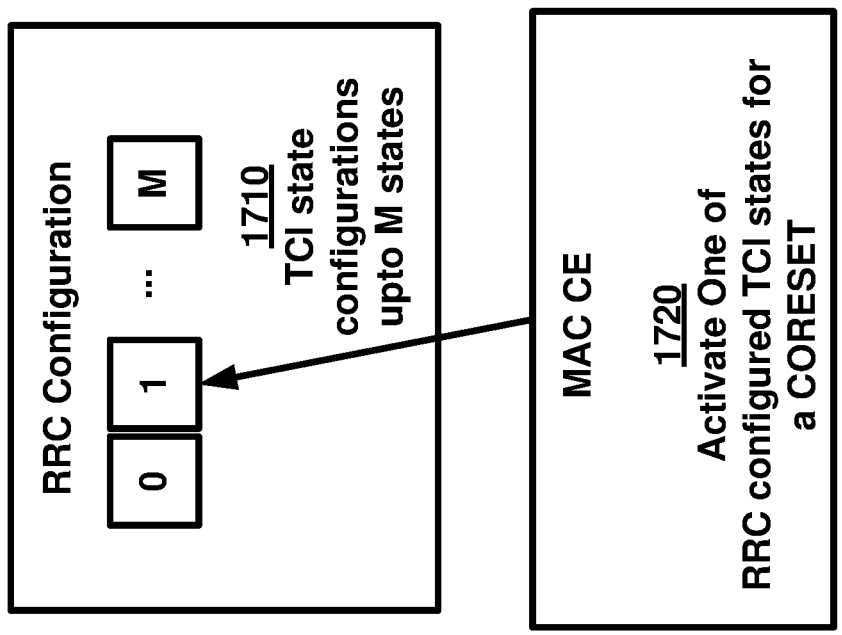
FIG. 17 is a diagram showing applications of TCI state as per an aspect of an example embodiment of the present disclosure.

FIG. 17 is an example diagram illustrating applications of a configured or activated TCI state (e.g., 1710) in accordance with embodiments of the present disclosure. If a wireless device has not received a MAC CE activation command (e.g., 1720) for a TCI state (e.g., 1710) for CORESETs other than a CORESET with index 0, a wireless device may assume that the DMRS port associated with PDCCH receptions may be quasi co-located with the SS/PBCH block the wireless device identified during the initial access procedure.

If a wireless device has not received a MAC CE activation command (e.g., 1720) for a TCI state for CORESET with index 0, the wireless device may assume that DMRS antenna port for PDCCH receptions in the CORESET may be quasi co-located with a SS/PBCH block the wireless identified either during initial access or, if any, a most recent random access procedure not initiated by a PDCCH order that triggers a non-contention based random access procedure.

If a wireless is provided a TCI state (e.g., 1710) for a CORESET, or if the wireless device receives a MAC CE activation command via a MAC CE activation command (e.g., 1720), the wireless device may assume that the DMRS antenna port associated with PDCCH receptions in the CORESET may be quasi co-located with the one or more DL RS configured by the TCI state (e.g., 1710). For a CORESET with index 0, the wireless device may expect that QCL-TypeD of a CSI-RS in a TCI state indicated by a MAC CE activation command for the CORESET may be provided by a SS/PBCH block. If the wireless device receives a MAC CE activation command (e.g., 1720) for one of the TCI states (e.g., 1710), the wireless device may apply the activation command (e.g., 1720) 3 msec after a slot where the wireless device transmits HARQ-ACK information for the PDSCH providing the activation command (e.g., 1720). The active BWP may be defined as the active BWP in the slot when the activation command is applied.

Figure 18:
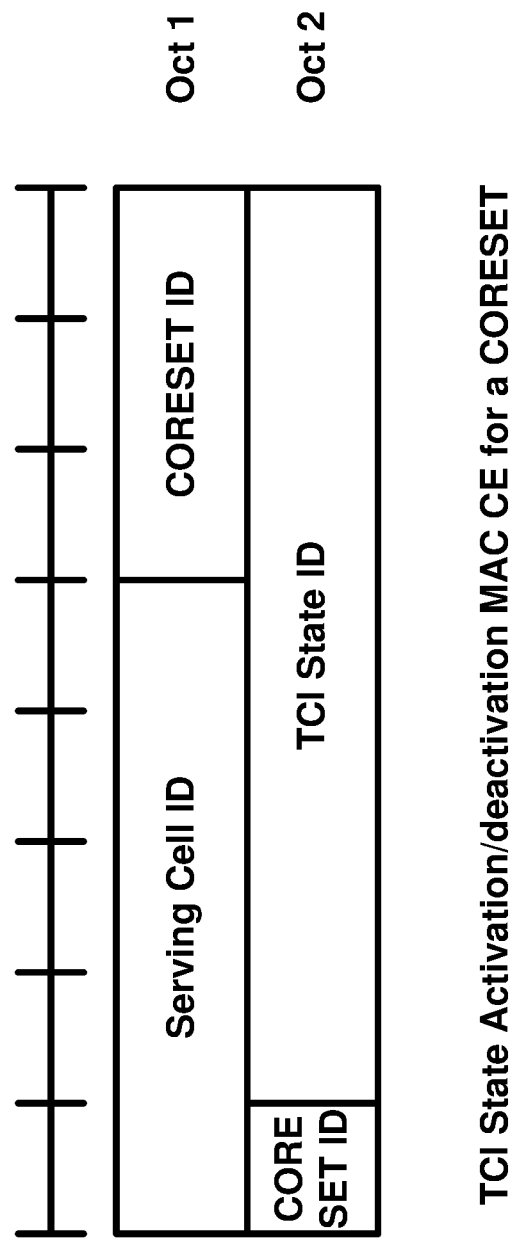
FIG. 18 is a diagram showing an indication in MAC CE as per an aspect of an example embodiment of the present disclosure.

FIG. 18 is an example diagram illustrating applications of a MAC CE command for a TCI state activation of a CORESET in accordance with embodiments of the present disclosure. The MAC CE command may be sent by a base station to a wireless device. The activation command may be identified by a MAC PDU subheader with an LCID. The activation command may have a fixed size of 16 bits with Serving Cell ID, CORESET ID, and TCI state ID. In the activation command, Serving Cell ID may indicate the identity of the Serving Cell for which the MAC CE applies. The length of the field may be 5 bits. In the activation command, CORESET ID may indicate a Control Resource Set identified with ControlResourceSetID for which the TCI state may be indicated. In case the value of the field is 0, the field may refer to the CORESET configured by controlResourceSetZero. The length of the field may be 4 bits. In the activation command, TCI State ID may indicate the TCI state identified by TCI-StateId applicable to the CORESET identified by CORESET ID field. If the field of CORESET ID is set to 0, this field may indicate a TCI-StateId for a TCI state of the first 64 TCI states configured by tci-StatesToAddModList and tci-States-ToReleaseList in the PDSCH-Config in the active BWP. If the field of CORESET ID is set to a value other than 0, this field may indicate a TCI-StateId configured by tci-statesPDCCH-ToAddList and tci-StatesPDCCH-ToReleaseList in the controlResourceSet identified by the indicated CORESET ID. The length of the field may be 7 bits.

Figure 19:
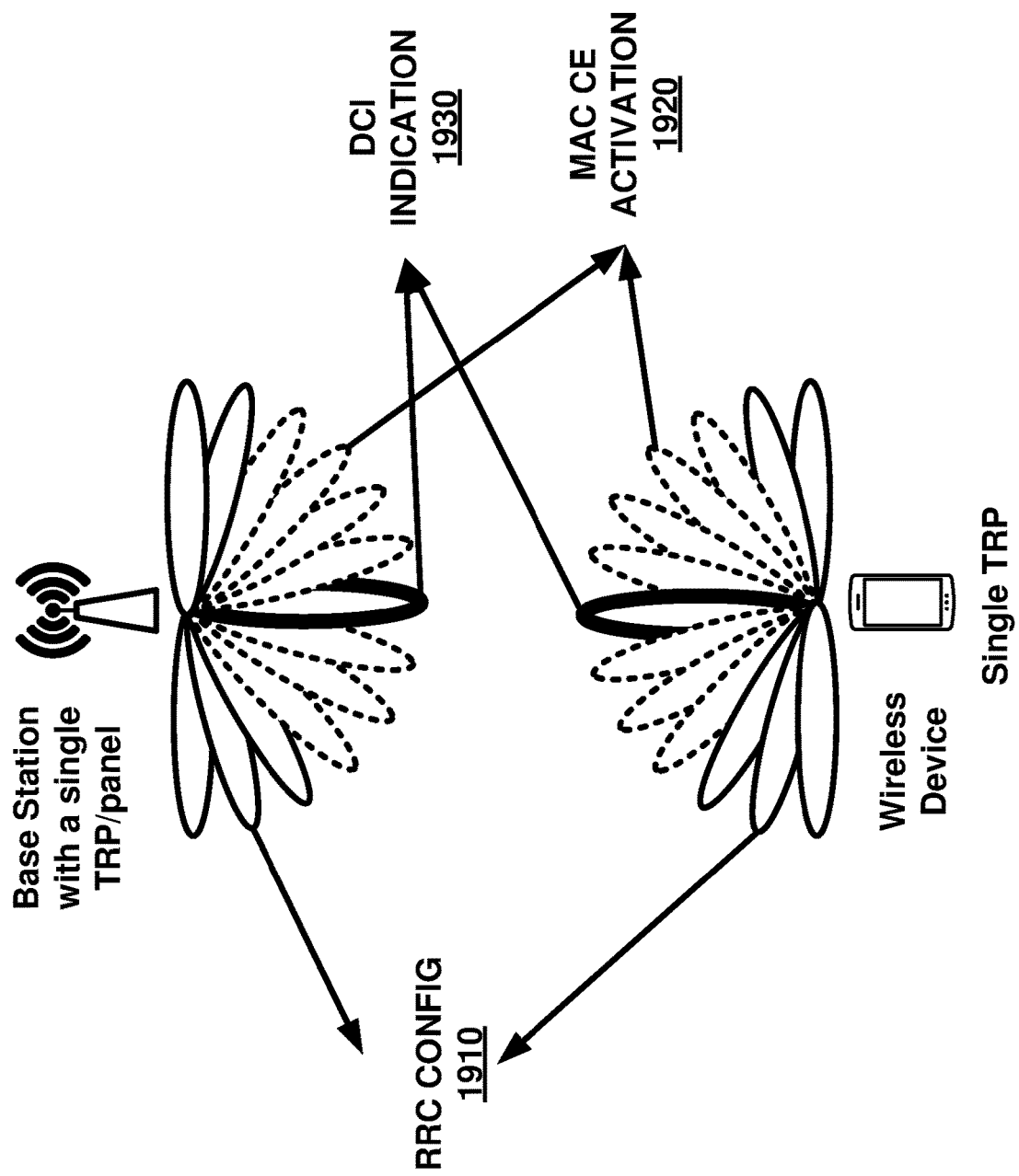
FIG. 19 is a diagram showing beam operation procedures as per an aspect of an example embodiment of the present disclosure.

FIG. 19 is an example diagram illustrating procedures for beam configuration activation, and indication procedures from a base station with a single TRP/panel in accordance with embodiments of the present disclosure. In an example, the base station may configure one or more TCI states in RRC configurations (e.g., 1910) to support configurations of one or more reference signals to acquire channel characteristics (e.g., Doppler spread, Doppler shift, average delay, delay spread, and spatial Rx parameter) of the wireless channel between the base station and the wireless device. MAC CE signaling (e.g., 1920) from the base station may activate or deactivate at least one TCI state among the configured TCI states in RRC configurations (e.g., 1910) of the wireless device. Among the activated TCI states, one of TCI states may be indicated via DCI (e.g., 1930) to indicate one of the activated TCI states that may be used for the reception of downlink channels (e.g., PDSCH) for the wireless device.

Figure 20:
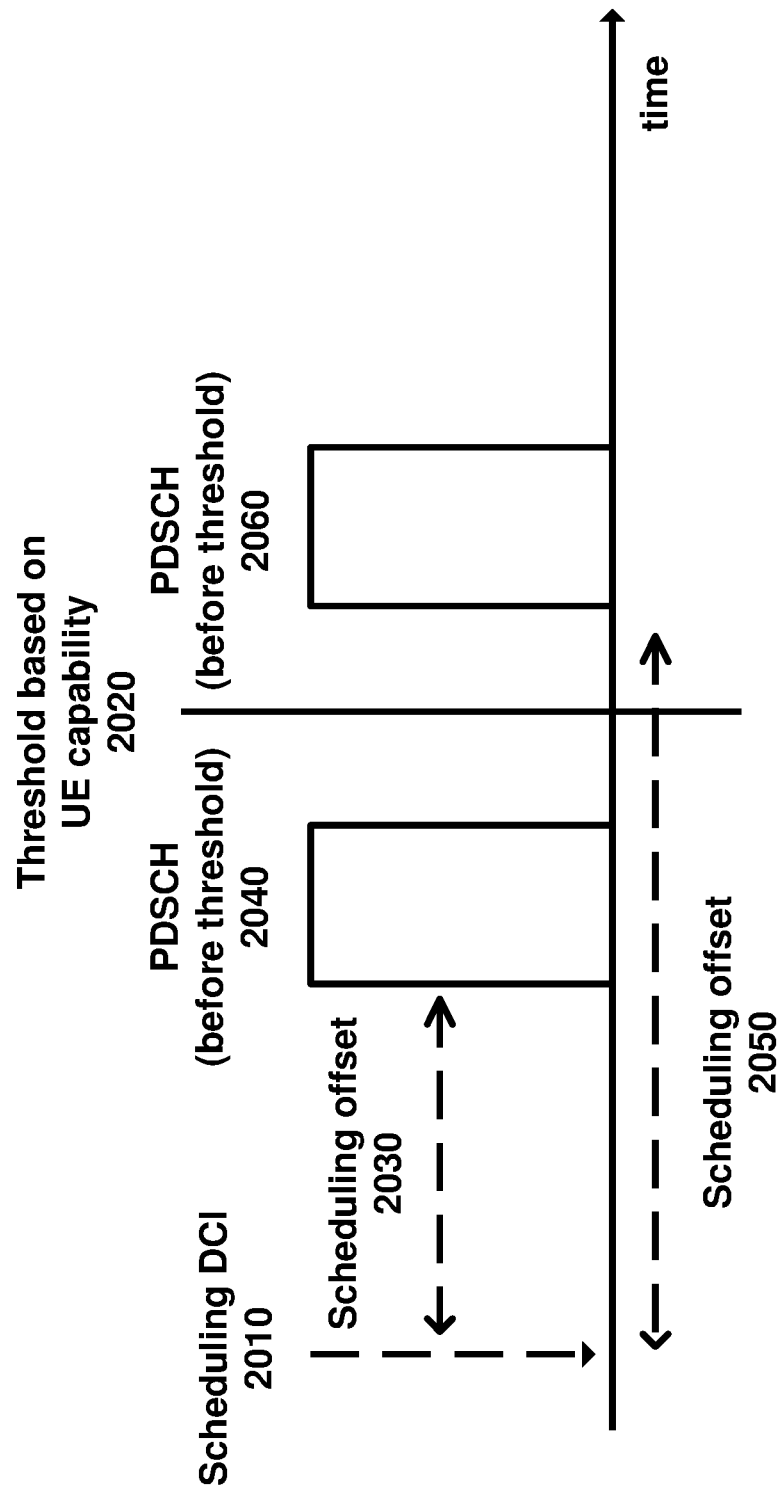
FIG. 20 is a diagram showing applications of TCI state as per an aspect of an example embodiment of the present disclosure.

FIG. 20 is an example diagram illustrating applications of a configured or an indicated TCI state by a wireless device in accordance with embodiments of the present disclosure. A base station may configure whether to use DCI based TCI state indication or not (e.g., TCI-PresentInDCI). When DCI based TCI state indication is not configured to a wireless device (e.g., TCI-PresentInDCI is not configured), one RRC configured TCI state may be used. Otherwise, DCI based TCI state indication may be used by the wireless device (e.g., TCI-PresentInDCI is configured). For TCI state configuration, activation, and indication, a threshold (e.g., 2020 and timeDurationForQCL) to apply to the configured or indicated TCI state may be indicated by the wireless device. For example, the threshold (e.g., 2020 and timeDurationForQCL) may be indicated via UE capability signaling. Based on the threshold (e.g., 2020 and timeDurationForQCL), when a scheduling offset (e.g., the offset 2030 between scheduling DCI (e.g., 2010) and the downlink channel (e.g., 2040)) is smaller than the threshold (e.g., 2020 and timeDurationForQCL), the indicated TCI state for one CORESET may be used. In an example, the CORESET may be the CORESET that has the lowest CORESET ID in the latest slot. Otherwise, when the scheduling offset (e.g., the offset 2050 between scheduling DCI (e.g., 2010) and the downlink channel (e.g., 2060)) is larger than threshold (e.g., 2020 and timeDurationForQCL), the configured or indicated TCI state for the downlink channel may be used.

Figure 21:
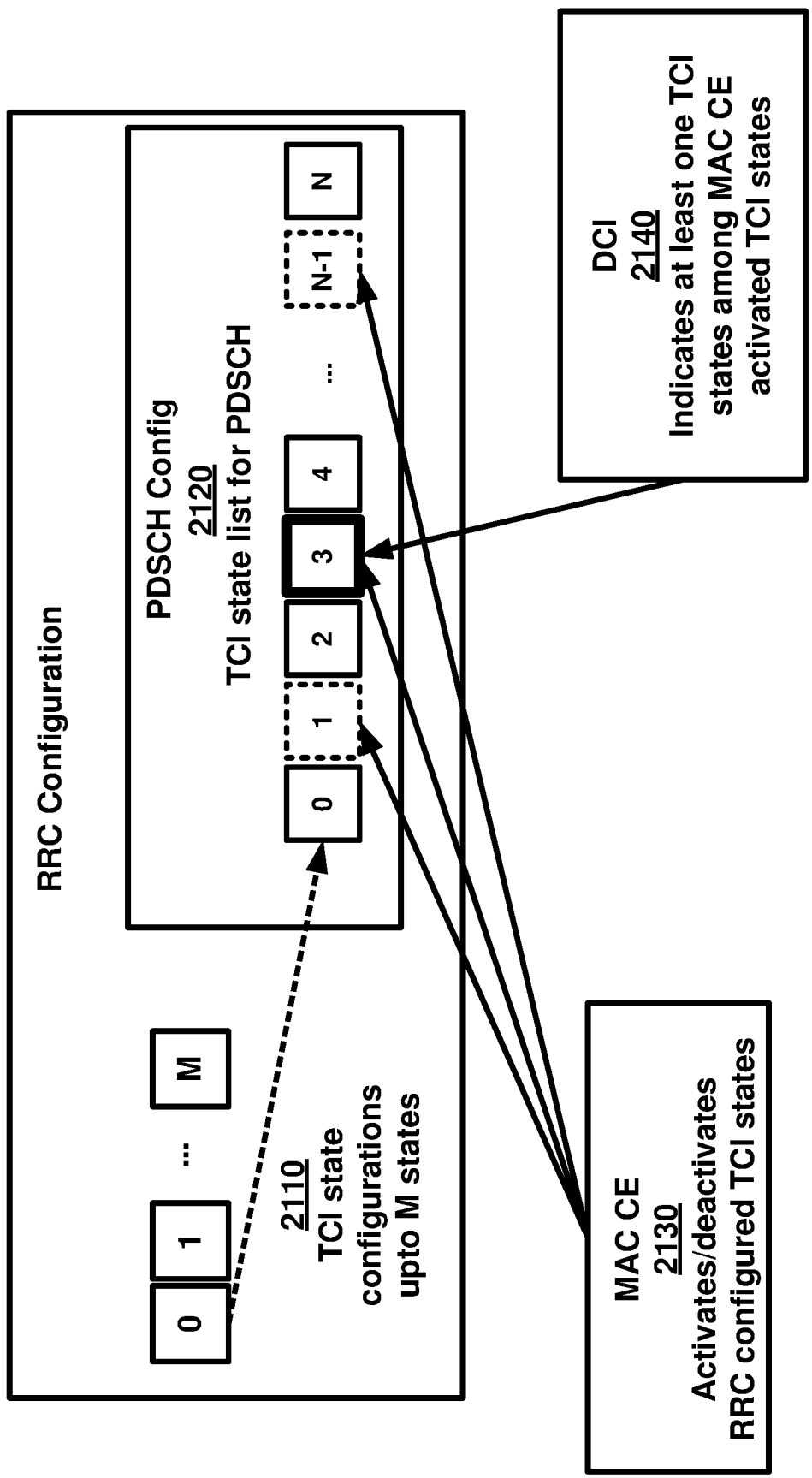
FIG. 21 is a diagram showing RRC configurations as per an aspect of an example embodiment of the present disclosure.

FIG. 21 is an example diagram illustrating detailed configurations in RRC configuration with a single TRP in accordance with embodiments of the present disclosure. A base station may configure multiple TCI state configurations (e.g., 2110) in RRC configuration. Based on the TCI state configurations (e.g., 2110), the base station may configure a list of TCI states (e.g., 2120) for the indication of TCI state for a transmission of downlink channels. In an example, the list of TCI states (e.g., 2120) may exist in a configuration for downlink transmissions, such as PDSCH config. The configuration for downlink transmissions may comprise other configurations such as DMRS, rate matching, RBG size, MCS table, PRB Bundling and ZP CSI-RS. Based on the list of TCI states (e.g., 2120), the base station may activate and deactivate one or more TCI states (e.g., 2130) to the wireless device among the configured TCI states (e.g., 2110) in the list of TCI states (e.g., 2120) via MAC CE signaling. A scheduling DCI (e.g., 2140) may schedule a downlink channel with one TCI state among the activated TCI states in the activated and deactivated one or more TCI states (e.g., 2130).

A base station may configure a wireless device with a list of one or more TCI-State configurations by a higher layer parameter PDSCH-Config for a serving cell. A number of the one or more TCI states may depend on a capability of the wireless device. The wireless device may use the one or more TCI-States to decode a PDSCH according to a detected PDCCH with a DCI. The DCI may be intended for the wireless device and a serving cell of the wireless device.

A TCI state of the one or more TCI-State configurations may contain one or more parameters. The wireless device may use the one or more parameters to configure a quasi co-location relationship between one or two downlink reference signals (e.g., first DL RS and second DL RS) and DM-RS ports of a PDSCH. The quasi co-location relationship may be configured by a higher layer parameter qcl-Type1 for the first DL RS. The quasi co-location relationship may be configured by a higher layer parameter qcl-Type2 for the second DL RS (if configured).

When the wireless device configures a quasi co-location relationship between the two downlink reference signals (e.g., first DL RS and second DL RS), a first QCL type of the first DL RS and a second QCL type of the second DL RS may not be the same. The first DL RS and the second DL RS may be the same. The first DL RS and the second DL RS may be different.

A quasi co-location type (e.g., the first QCL type, the second QCL type) of a DL RS (e.g., the first DL RS, the second DL RS) may be provided to the wireless device by a higher layer parameter qcl-Type in QCL-Info. The higher layer parameter QCL-Type may take at least one of: QCL-TypeA: {Doppler shift, Doppler spread, average delay, delay spread}; QCL-TypeB: {Doppler shift, Doppler spread}; QCL-TypeC: {average delay, Doppler shift} and QCL-TypeD: {Spatial Rx parameter}.

A wireless device may receive an activation command. The activation command may be used to map one or more TCI states (e.g., up to 8) to one or more codepoints of a DCI field "Transmission Configuration Indication (TCI)". The wireless device may transmit a HARQ-ACK corresponding to a PDSCH in slot n. The PDSCH may comprise/carry the activation command. In response to the transmitting the HARQ-ACK in the slot n, the wireless device may apply the mapping between the one or more TCI states and the one or more codepoints of the DCI field "Transmission Configuration Indication" starting from slot $n+3N_{slot}^{subframe,\mu}+1$.

After the wireless device receives an initial higher layer configuration of one or more TCI states and before the reception of the activation command, the wireless device may assume that one or more DM-RS ports of a PDSCH of a serving cell are quasi co-located with an SSB/PBCH block. The wireless device may determine the SSB/PBCH block in an initial access procedure with respect 'QCL-TypeA'. The wireless device may determine the SSB/PBCH block in the initial access procedure with respect to 'QCL-TypeD' (when applicable).

A wireless device may be configured, by a base station, with a higher layer parameter TCI-PresentInDCI. When the higher layer parameter TCI-PresentInDCI is set as 'enabled' for a control resource set (CORESET) scheduling a PDSCH, the wireless device may assume that a TCI field is present in a DCI format (e.g., DCI format 1_1) of a PDCCH transmitted on the CORESET.

A base station may not configure a CORESET with a higher layer parameter TCI-PresentInDCI. The CORESET may schedule a PDSCH. A time offset between a reception of a DCI (e.g., DCI format 1_1, DCI format 1_0) received in the CORESET and the (corresponding) PDSCH may be equal to or greater than a threshold (e.g., TimeDurationForQCL). The threshold may be based on a reported UE capability. The wireless device may apply a second TCI state for the CORESET used for a PDCCH transmission of the DCI. The wireless device may apply a second QCL assumption for the CORESET used for a PDCCH transmission of the DCI. In response to the base station not configuring the CORESET with the higher layer parameter TCI-PresentInDCI and the time offset between the reception of the DCI and the PDSCH being equal or greater than the threshold, the wireless device may perform a default PDSCH RS selection. In the default PDSCH RS selection, the wireless device may assume, in order to determine antenna port quasi co-location of the PDSCH, that a first TCI state or a first QCL assumption for the PDSCH is identical to the second TCI state or the second QCL assumption applied for the CORESET.

A base station may configure a CORESET with a higher layer parameter TCI-PresentInDCI. The higher layer parameter TCI-PresentInDCI may be set as "enabled". The CORESET may schedule a PDSCH with a DCI (e.g., DCI format 1_0). The DCI may not comprise a TCI field. A time offset between a reception of the DCI received in the CORESET and the (corresponding) PDSCH may be equal to or greater than a threshold (e.g., TimeDurationForQCL). The threshold may be based on a reported UE capability. The wireless device may apply a second TCI state for the CORESET used for a PDCCH transmission of the DCI. The wireless device may apply a second QCL assumption for the CORESET used for a PDCCH transmission of the DCI. In response to the base station scheduling the PDSCH with the DCI not comprising the TCI field and the time offset between the reception of the DCI and the PDSCH being equal or greater than the threshold, the wireless device may perform a default PDSCH RS selection. In the default PDSCH RS selection, the wireless device may assume, in order to determine antenna port quasi co-location of the PDSCH, that a first TCI state or a first QCL assumption for the PDSCH is identical to the second TCI state or the second QCL assumption applied for the CORESET.

A base station may configure a CORESET with a higher layer parameter TCI-PresentInDCI. The higher layer parameter TCI-PresentInDCI may be set as "enabled". The wireless device may receive a DCI in the CORESET of a scheduling component carrier. The DCI may comprise a TCI field. In response to the higher layer parameter TCI-PresentinDCI being set as 'enabled', the TCI field in the DCI in the scheduling component carrier may point to one or more activated TCI states (e.g., after receiving the activation command) in a scheduled component carrier or in a DL BWP.

A base station may configure a CORESET with a higher layer parameter TCI-PresentInDCI. The higher layer parameter TCI-PresentInDCI may be set as "enabled". The wireless device may receive a DCI (e.g., DCI format 1_1) in the CORESET. The DCI may schedule a PDSCH of a wireless device. A TCI field may be present in the DCI. A time offset between a reception of the DCI and the (corresponding scheduled) PDSCH may be equal to or greater than a threshold (e.g., TimeDurationForQCL). The threshold may be based on a reported UE capability. In response to the TCI field being present in the DCI scheduling the PDSCH and the higher layer parameter TCI-PresentinDCI being set as 'enabled' for the CORESET, the wireless device may, in order to determine antenna port quasi co-location for the PDSCH, use a TCI State according to a value of the TCI field in a detected PDCCH with the DCI. The using the TCI State according to the value of the TCI field may comprise that the wireless device may assume that one or more DM-RS ports of the PDSCH of a serving cell are quasi co-located with one or more RS(s) in the TCI State with respect to one or more QCL type parameter(s) given by the TCI state when the time offset between the reception of the DCI and the PDSCH is equal or greater than the threshold. The value of the TCI field may indicate the TCI state.

A base station may configure a wireless device with a single slot PDSCH. The single slot PDSCH may be scheduled in a slot. The base station may activate one or more TCI states in the slot. In response to being configured with the single slot PDSCH, a TCI state (e.g., indicated by a TCI field in a DCI scheduling the single slot PDSCH) may be based on the one or more activated TCI states in the slot with the scheduled single slot PDSCH. The TCI state may be one of the one or more activated TCI states in the slot. The TCI field in the DCI may indicate a TCI state of the one or more activated TCI states in the slot.

A wireless device may be configured with a CORESET. The CORESET may be associated with a search space set for cross-carrier scheduling. In response to the CORESET being associated with the search space set for cross-carrier scheduling, the wireless device may expect the higher layer parameter TCI-PresentInDCI set as 'enabled' for the CORESET. A base station may configure a serving cell with one or more TCI states. The wireless device may detect, in the search space set, a PDCCH, with a DCI, scheduling a PDSCH. A TCI field in the DCI may indicate at least one of the one or more TCI states. The at least one of the one more TCI states (scheduled by the search space set) may comprise/contain a QCL type (e.g., QCL-TypeD). In response to the at least one of the one or more TCI states scheduled by the search space set containing the QCL type, the wireless device may expect a time offset between a reception of the PDCCH detected in the search space set and the (corresponding) PDSCH is larger than or equal to the threshold (e.g., TimeDurationForQCL).

A base station may configure a CORESET with a higher layer parameter TCI-PresentInDCI. The higher layer parameter TCI-PresentInDCI may be set as "enabled". When the higher layer parameter TCI-PresentInDCI is set to 'enabled' for the CORESET, an offset between a reception of a DCI in the CORESET and a PDSCH scheduled by the DCI may be less than the threshold (e.g., TimeDurationForQCL).

A base station may not configure a CORESET with a higher layer parameter TCI-PresentInDCI. The wireless device may be in an RRC connected mode. The wireless device may be in an RRC idle mode. The wireless device may be in an RRC inactive mode. When the higher layer parameter TCI-PresentInDCI is not configured for the CORESET, an offset between a reception of a DCI in the CORESET and a PDSCH scheduled by the DCI may be lower than the threshold (e.g., TimeDurationForQCL).

A wireless device may monitor one or more CORESETs (or one or more search spaces) within/in an active BWP (e.g., active downlink BWP) of a serving cell in one or more slots. The monitoring the one or more CORESETs within/in the active BWP of the serving cell in the one or more slots may comprise monitoring at least one CORESET within/in the active BWP of the serving cell in each slot of the one or more slots. A latest slot of the one or more slots may occur latest in time. The wireless device may monitor, within/in the active BWP of the serving cell, one or more second CORESETs of the one or more CORESETs in the latest slot. In response to the monitoring the one or more second CORESETs in the latest slot and the latest slot occurring latest in time, the wireless device may determine the latest slot. Each CORESET of the one or more second CORESETs may be identified by a CORESET specific index (e.g., indicated by a higher layer CORESET-ID). A CORESET specific index of a CORESET of the one or more secondary CORESETs may be the lowest among the CORESET specific indices of the one or more second CORESETs. The wireless device may monitor a search space associated with the CORESET in the latest slot. In response to the CORESET specific index of the CORESET being the lowest and the monitoring the search space associated with the CORESET in the latest slot, the wireless device may select the CORESET of the one or more secondary CORESETs.

When the offset between the reception of the DCI in the CORESET and the PDSCH scheduled by the DCI is lower than the threshold (e.g., TimeDurationForQCL), the wireless device may perform a default PDSCH RS selection. In the default PDSCH RS selection, the wireless device may assume that one or more DM-RS ports of the PDSCH of a serving cell are quasi co-located with one or more RSs in a TCI state with respect to one or more QCL type parameter(s). The one or more RSs in the TCI state may be used for PDCCH quasi co-location indication of the (selected) CORESET of the one or more second CORESETs.

A wireless device may receive a DCI via a PDCCH in a CORESET. The DCI may schedule a PDSCH. An offset between a reception of the DCI and the PDSCH may be less than a threshold (e.g., TimeDurationForQCL). A first QCL type (e.g., 'QCL-TypeD') of one or more DM-RS ports of the PDSCH may be different from a second QCL type (e.g., 'QCL-TypeD') of one or more second DM-RS ports of the PDCCH. The PDSCH and the PDCCH may overlap in at least one symbol. In response to the PDSCH and the PDCCH overlapping in at least one symbol and the first QCL type being different from the second QCL type, the wireless device may prioritize a reception of the PDCCH associated with the CORESET. The prioritizing may apply to an intra-band CA case (when the PDSCH and the CORESET are in different component carriers). The prioritizing the reception of the PDCCH may comprise receiving the PDSCH with the second QCL type of one or more second DM-RS ports of the PDCCH. The prioritizing the reception of the PDCCH may comprise overwriting the first QCL type of the one or more DM-RS ports of the PDSCH with the second QCL type of the one or more second DM-RS ports of the PDCCH. The prioritizing the reception of the PDCCH may comprise assuming a spatial QCL of the PDCCH (e.g., the second QCL type), for the simultaneous reception of the PDCCH and PDSCH, on the PDSCH. The prioritizing the reception of the PDCCH may comprise applying a spatial QCL of the PDCCH (e.g., the second QCL type), for the simultaneous reception of the PDCCH and PDSCH, on the PDSCH.

None of the configured TCI states may contain a QCL type (e.g., 'QCL-TypeD'). In response to the none of the configured TCI states containing the QCL type, the wireless device may obtain the other QCL assumptions from the indicated TCI states for its scheduled PDSCH irrespective of the time offset between the reception of the DCI and the corresponding PDSCH.

A wireless device may use CSI-RS for at least one of: time/frequency tracking, CSI computation, L1-RSRP computation and mobility.

A base station may configure a wireless device to monitor a CORESET on one or more symbols. A CSI-RS resource may be associated with a NZP-CSI-RS-ResourceSet. A higher layer parameter repetition of the NZP-CSI-RS-ResourceSet may be set to 'on'. In response to the CSI-RS resource being associated with the NZP-CSI-RS-ResourceSet with the higher layer parameter repetition set to 'on', the wireless device may not expect to be configured with a CSI-RS of the CSI-RS resource over the one or more symbols.

A higher layer parameter repetition of the NZP-CSI-RS-ResourceSet may not be set to 'on'. A base station may configure a CSI-RS resource and one or more search space sets associated with a CORESET in the same one or more symbols (e.g., OFDM symbols). In response to the higher layer parameter repetition of the NZP-CSI-RS-ResourceSet not being set to 'on', and the CSI-RS resource and the one or more search space sets associated with the CORESET being configured in the same one or more symbols, the wireless device may assume that a CSI-RS of the CSI-RS resource and one or more DM-RS ports of a PDCCH are quasi co-located with 'QCL-TypeD'. The base station may transmit the PDCCH in the one or more search space sets associated with the CORESET.

A higher layer parameter repetition of the NZP-CSI-RS-ResourceSet may not be set to 'on'. A base station may configure a CSI-RS resource of a first cell and one or more search space sets associated with a CORESET of a second cell in the same one or more symbols (e.g., OFDM symbols). In response to the higher layer parameter repetition of the NZP-CSI-RS-ResourceSet not being set to 'on', and the CSI-RS resource and the one or more search space sets associated with the CORESET being configured in the same one or more symbols, the wireless device may assume that a CSI-RS of the CSI-RS resource and one or more DM-RS ports of a PDCCH are quasi co-located with 'QCL-TypeD'. The base station may transmit the PDCCH in the one or more search space sets associated with the CORESET. The first cell and the second cell may be in different intra-band component carriers.

A base station may configure a wireless device with a CSI-RS in a first set of PRBs. The base station may configure the wireless device with one or more search space sets associated with a CORESET in one or more symbols (e.g., OFDM symbols) and in a second set of PRBs. The wireless device may not expect the first set of PRBs sand the second set of PRBs overlapping in the one or more symbols.

A base station may configure a wireless device with a CSI-RS resource and an SS/PBCH block in the same one or more (OFDM) symbols. In response to the CSI-RS resource and the SS/PBCH block being configured in the same one or more (OFDM) symbols, the wireless device may assume that the CSI-RS resource and the SS/PBCH block are quasi co-located with a QCL type (e.g., 'QCL-TypeD').

The base station may configure the CSI-RS resource in a first set of PRBs for the wireless device. the base station may configure the SS/PBCH block in a second set of PRBs for the wireless device. The wireless device may not expect the first set of PRBs overlapping with the second set of PRBs.

The base station may configure the CSI-RS resource with a first subcarrier spacing for the wireless device. the base station may configure the SS/PBCH block with a second subcarrier spacing for the wireless device. The wireless device may expect the first subcarrier spacing and the second subcarrier spacing being the same.

A base station may configure a wireless device with a NZP-CSI-RS-ResourceSet. The NZP-CSI-RS-ResourceSet may be configured with a higher layer parameter repetition set to 'on'. In response to the NZP-CSI-RS-ResourceSet being configured with the higher layer parameter repetition set to 'on', the wireless device may assume that the base station transmits one or more CSI-RS resources within the NZP-CSI-RS-ResourceSet with the same downlink spatial domain transmission filter. The base station may transmit each CSI-RS resource of the one or more CSI-RS resources in different symbols (e.g., OFDM symbols).

The NZP-CSI-RS-ResourceSet may be configured with a higher layer parameter repetition set to 'off'. In response to the NZP-CSI-RS-ResourceSet being configured with the higher layer parameter repetition set to 'off', the wireless device may not assume that the base station transmits one or more CSI-RS resources within the NZP-CSI-RS-ResourceSet with the same downlink spatial domain transmission filter.

A base station may configure a wireless device with a higher layer parameter groupBasedBeamReporting. The base station may set the higher layer parameter groupBasedBeamReporting to "enabled". In response to the higher layer parameter groupBasedBeamReporting set to "enabled", the wireless device may report at least two different resource indicators (e.g., CRI, SSBRI) in a single reporting instance for a reporting setting of one or more report settings. The wireless device may receive at least two RSs (e.g., CSI-RS, SSB) indicated by the at least two different resource indicators simultaneously. The wireless device may receive the at least two RSs simultaneously with a single spatial domain receive filter. The wireless device may receive the at least two RSs simultaneously with a plurality of simultaneous spatial domain receive filters.

A base station may need (additional) one or more UE radio access capability information of a wireless device. In response to the needing the one or more UE radio access capability information, the base station may initiate a procedure to request the one or more UE radio access capability information (e.g., by an information element UECapabilityEnquiry) from the wireless device. The wireless device may use an information element (e.g., UECapabilitylnformation message) to transfer one or more UE radio access capability information requested by the base station. The wireless device may provide a threshold (e.g., timeDurationForQCL) in FeatureSetDownlink indicating a set of features that the wireless device supports.

The threshold may comprise a minimum number of OFDM symbols required by the wireless device to perform a PDCCH reception with a DCI and to apply a spatial QCL information (e.g., TCI-State) received in (or indicated by) the DCI for a processing of a PDSCH scheduled by the DCI.

The wireless device may require the minimum number of OFDM symbols between the PDCCH reception and the processing of the PDSCH to apply the spatial QCL information, indicated by the DCI, to the PDSCH.

Figure 22:
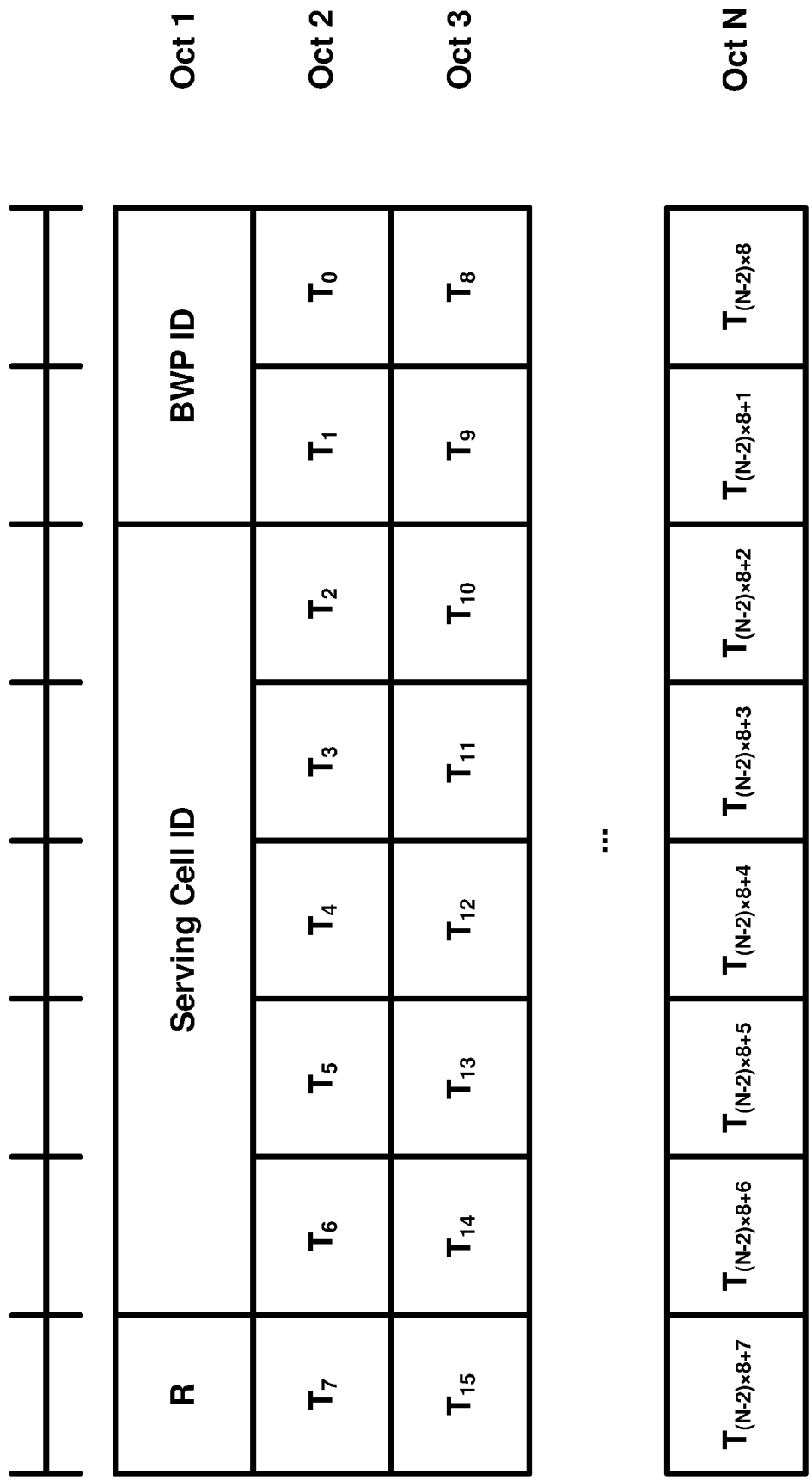
FIG. 22 is a diagram showing applications of MAC CE activation command as per an aspect of an example embodiment of the present disclosure.

FIG. 22 is an example diagram illustrating applications of a MAC CE activation command for TCI states of a downlink channel by a wireless device in accordance with embodiments of the present disclosure. The activation command may be identified by a MAC PDU subheader with LCID. In the activation command, Serving Cell ID may indicate the identity of the Serving Cell for which the MAC CE applies. The length of the Serving Cell ID may be 5 bits. In the activation command, BWP ID may indicate a DL BWP for which the MAC CE may apply as the codepoint of the DCI (e.g., bandwidth part indicator field). The length of the BWP ID field may be 2 bits. If there is a TCI state with TCI-StateId i, the Ti field may indicate the activation/deactivation status of the TCI state with TCI-StateId i, otherwise MAC entity shall ignore the Ti field. The Ti field may be set to "1" to indicate that the TCI state with TCI-StateId i shall be activated and mapped to the codepoint of the DCI field (e.g., Transmission Configuration Indication). The Ti field may be set to "0" to indicate that the TCI state with TCI-StateId i shall be deactivated is not mapped to the codepoint of the DCI field (e.g., Transmission Configuration Indication). The codepoint to which the TCI state is mapped may be determined by its ordinal position among all the TCI states with Ti field set to "1", i.e. the first TCI state with Ti field set to "1" shall be mapped to the codepoint value 0, second TCI state with Ti field set to "1" shall be mapped to the codepoint value 1 and so on. The maximum number of activated TCI states may be 8. In the activation command, R may indicate a reserved bit which may be set to "0".

Figure 23:
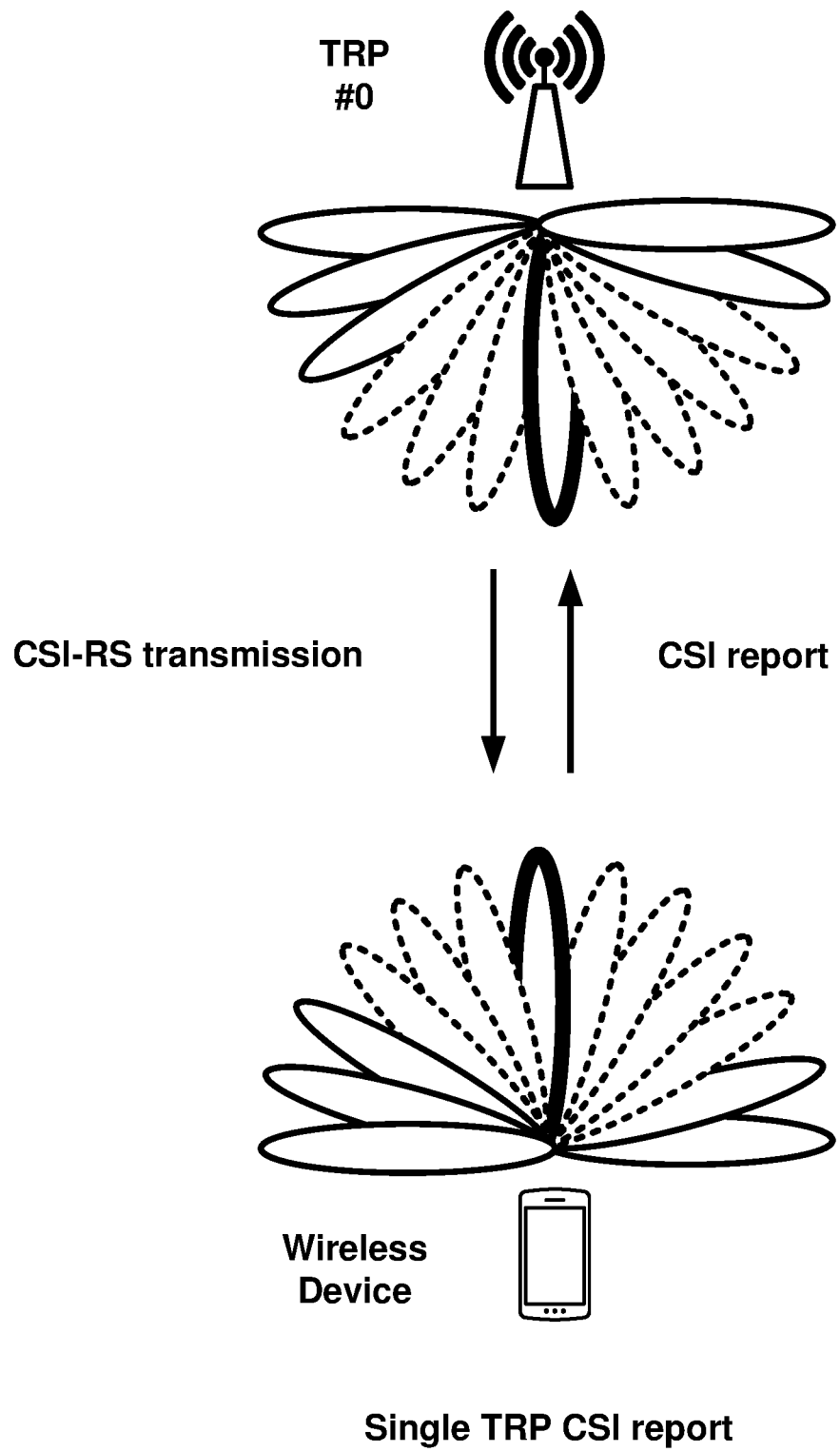
FIG. 23 is a diagram showing CSI measurement and reporting as per an aspect of an example embodiment of the present disclosure.

FIG. 23 is an example diagram illustrating CSI-RS transmission and CSI reporting with single TRP and panel in accordance with embodiments of the present disclosure. In order to support effective data transmission via a wireless channel between a base station and a wireless device, the channel state information may be needed. The base station may transmit CSI-RS and the wireless device may receive and measure CSI-RS to process the channel state information.

The time and frequency resources that can be used by a wireless device to report channel state information (CSI) may be controlled by a base station. CSI may consist of Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP.

For CQI, PMI, CRI, SSBRI, LI, RI, L1-RSRP, a wireless device may be configured by higher layers with N≥1 CSI-ReportConfig Reporting Settings, M≥1 CSI-ResourceConfig Resource Settings, and one or two list(s) of trigger states (given by the higher layer parameters CSI-AperiodicTriggerStateList and CSI-SemiPersistentOnPUSCH-TriggerStateList). Each trigger state in CSI-AperiodicTriggeStateList may contain a list of associated CSI-ReportConfigs indicating the Resource Set IDs for channel and optionally for interference. Each trigger state in CSI-SemiPersistentOnPUSCH-TriggerStateList may contain one associated CSI-ReportConfig.

Each Reporting Setting CSI-ReportConfig may be associated with a single downlink BWP (indicated by higher layer parameter BWP-Id) given in the associated CSI-ResourceConfig for channel measurement and contains the parameter(s) for one CSI reporting band:codebook configuration including codebook subset restriction, time-domain behavior, frequency granularity for CQI and PMI, measurement restriction configurations, and the CSI-related quantities to be reported by the wireless device such as the layer indicator (LI), L1-RSRP, CRI, and SSBRI (SSB Resource Indicator).

The time domain behavior of the CSI-ReportConfig may be indicated by the higher layer parameter reportConfigType and may be set to 'aperiodic', 'semiPersistentOnPUCCH', 'semiPersistentOnPUSCH', or 'periodic'. For periodic and semiPersistentOnPUCCHlsemiPersistentOnPUSCH CSI reporting, the configured periodicity and slot offset may apply in the numerology of the UL BWP in which the CSI report is configured to be transmitted on. The higher layer parameter reportQuantity may indicate the CSI-related or L1-RSRP-related quantities to report. The reportFreqConfiguration may indicate the reporting granularity in the frequency domain, including the CSI reporting band and if PMI/CQI reporting is wideband or sub-band. The timeRestrictionForChannelMeasurements parameter in CSI-ReportConfig may be configured to enable time domain restriction for channel measurements and timeRestrictionForlnterferenceMeasurements may be configured to enable time domain restriction for interference measurements. The CSI-ReportConfig may also contain CodebookConfig, which contains configuration parameters for Type-I or Type II CSI including codebook subset restriction, and configurations of group based reporting.

Each CSI Resource Setting CSI-ResourceConfig may contain a configuration of a list of S≥1 CSI Resource Sets (given by higher layer parameter csi-RS-ResourceSetList), where the list is comprised of references to either or both of NZP CSI-RS resource set(s) and SS/PBCH block set(s) or the list is comprised of references to Channel State Information—Interference Measurement (CSI-IM) resource set(s). Each CSI Resource Setting may be located in the DL BWP identified by the higher layer parameter BWP-id, and all CSI Resource Settings linked to a CSI Report Setting have the same DL BWP.

The time domain behavior of the CSI-RS resources within a CSI Resource Setting may be indicated by the higher layer parameter resourceType and may be set to aperiodic, periodic, or semi-persistent. For periodic and semi-persistent CSI Resource Settings, the number of CSI-RS Resource Sets configured may be limited to S=1. For periodic and semi-persistent CSI Resource Settings, the configured periodicity and slot offset may be given in the numerology of its associated DL BWP, as given by BWP-id. When a wireless device is configured with multiple CSI-ResourceConfigs consisting the same NZP CSI-RS resource ID, the same time domain behavior may be configured for the CSI-ResourceConfigs. When a wireless device is configured with multiple CSI-ResourceConfigs consisting the same CSI-IM resource ID, the same time-domain behavior may be configured for the CSI-ResourceConfigs. All CSI Resource Settings linked to a CSI Report Setting may have the same time domain behavior.

The CSI-IM resource for interference measurement, NZP CSI-RS resource for interference measurement, and/or NZP CSI-RS resource for channel measurement may be configured via higher layer signaling for one or more CSI Resource Settings for channel and interference measurement. CSI-IM resource for interference measurement.

The wireless device may assume that the NZP CSI-RS resource(s) for channel measurement and the CSI-IM resource(s) for interference measurement configured for one CSI reporting are resource-wise QCLed with respect to 'QCL-TypeD'. When NZP CSI-RS resource(s) is used for interference measurement, the wireless device may assume that the NZP CSI-RS resource for channel measurement and the CSI-IM resource and/or NZP CSI-RS resource(s) for interference measurement configured for one CSI reporting are QCLed with respect to 'QCL-TypeD'.

The wireless device may calculate CSI parameters (if reported) assuming the dependencies between CSI parameters (if reported). For example, LI may be calculated conditioned on the reported CQI, PMI, RI and CRI. CQI may be calculated conditioned on the reported PMI, RI and CRI. PMI may be calculated conditioned on the reported RI and CRI. RI may be calculated conditioned on the reported CRI.

The Reporting configuration for CSI may be aperiodic (using PUSCH), periodic (using PUCCH) or semi-persistent (using PUCCH, and DCI activated PUSCH). The CSI-RS Resources may be periodic, semi-persistent, or aperiodic. When periodic CSI-RS is configured, periodic, semi-persistent or aperiodic CSI reporting may be supported. When semi-persistent CSI-RS is configured, semi-persistent or aperiodic CSI reporting may be supported (periodic CSI reporting may not be supported). When aperiodic CSI-RS is configured, only aperiodic CSI reporting may be supported. For periodic CSI reporting, no dynamic triggering/activation is supported. For semi-persistent CSI reporting on PUCCH, the wireless device may receive an activation command. For semi-persistent CSI reporting on PUSCH, the wireless device receives triggering on DCI. Aperiodic CSI reporting may be triggered by DCI. Periodic CSI-RS is configured by higher layers. Semi-persistent CSI-RS may be activated and deactivated by MAC CE. Aperiodic CSI-RS may be configured and triggered/activated with MAC CE and DCI.

When the wireless device is configured with higher layer parameter NZP-CSI-RS-ResourceSet and when the higher layer parameter repetition is set to 'off', the wireless may determine a CRI from the supported set of CRI values and report the number in each CRI report. When the higher layer parameter repetition is set to 'on', CRI may not be reported. CRI reporting may not be supported when the higher layer parameter codebookType is set to 'typeII' or to 'typeII-PortSelection'.

For a periodic or semi-persistent CSI report on PUCCH, the periodicity (measured in slots) may be configured by the higher layer parameter reportSlotConfig.

For a semi-persistent or aperiodic CSI report on PUSCH, the allowed slot offsets may be configured by the higher layer parameter reportSlotOffsetList. The offset may be selected in the activating/triggering DCI.

For CSI reporting, a wireless device may be configured via higher layer signaling with one out of two possible subband sizes, where a subband is defined as $N_{PRB}^{SB}$ contiguous PRBs and depends on the total number of PRBs in the bandwidth part.

The reportFreqConfiguration contained in a CSI-ReportConfig may indicate the frequency granularity of the CSI Report. A CSI Reporting Setting configuration may define a CSI reporting band as a subset of subbands of the bandwidth part, where the reportFreqConfiguration may indicate the csi-ReportingBand, wideband CQI/subband CQI reporting, and wideband PMI/subband PMI reporting.

The csi-ReportingBand indicates a contiguous or non-contiguous subset of subbands in the bandwidth part for which CSI shall be reported. A wireless device may not be expected to be configured with csi-ReportingBand which contains a subband where a CSI-RS resource linked to the CSI Report setting has the frequency density of each CSI-RS port per PRB in the subband less than the configured density of the CSI-RS resource. If a CSI-IM resource is linked to the CSI Report Setting, a wireless device may not be expected to be configured with csi-ReportingBand which contains a subband where not all PRBs in the subband have the CSI-IM REs present.

Wideband CQI or subband CQI reporting may be indicated as configured by the higher layer parameter cqi-FormatIndicator. When wideband CQI reporting is configured, a wideband CQI may be reported for each codeword for the entire CSI reporting band. When subband CQI reporting is configured, one CQI for each codeword may be reported for each subband in the CSI reporting band.

Wideband PMI or subband PMI reporting may be indicated as configured by the higher layer parameter pmi-FormatIndicator. When wideband PMI reporting is configured, a wideband PMI may be reported for the entire CSI reporting band. When subband PMI reporting is configured, except with 2 antenna ports, a single wideband indication (e.g., i1) may be reported for the entire CSI reporting band and one subband indication (e.g., i2) may be reported for each subband in the CSI reporting band. When subband PMIs are configured with 2 antenna ports, a PMI may be reported for each subband in the CSI reporting band.

A CSI Reporting Setting may be said to have a wideband frequency-granularity if reportQuantity is set to 'cri-RI-PMI-CQI', or 'cri-RI-LI-PMI-CQI', cqi-FormatIndicator indicates single CQI reporting and pmi-FormatIndicator indicates single PMI reporting, or reportQuantity is set to 'cri-RI-i1' or reportQuantity is set to 'cri-RI-CQI' or 'cri-RI-i1-CQI' and cqi-FormatIndicator indicates single CQI reporting, or reportQuantity is set to 'cri-RSRP' or 'ssb-Index-RSRP'. Otherwise, the CSI Reporting Setting may be said to have a subband frequency-granularity.

If a wireless device is configured with semi-persistent CSI reporting, the wireless device may report CSI when both CSI-IM and NZP CSI-RS resources are configured as periodic or semi-persistent. If a wireless device is configured with aperiodic CSI reporting, the wireless device may report CSI when both CSI-IM and NZP CSI-RS resources are configured as periodic, semi-persistent or aperiodic.

A wireless device configured with DCI 01 may not expect to be triggered with multiple CSI reports with the same CSI-ReportConfigId.

Figure 24:
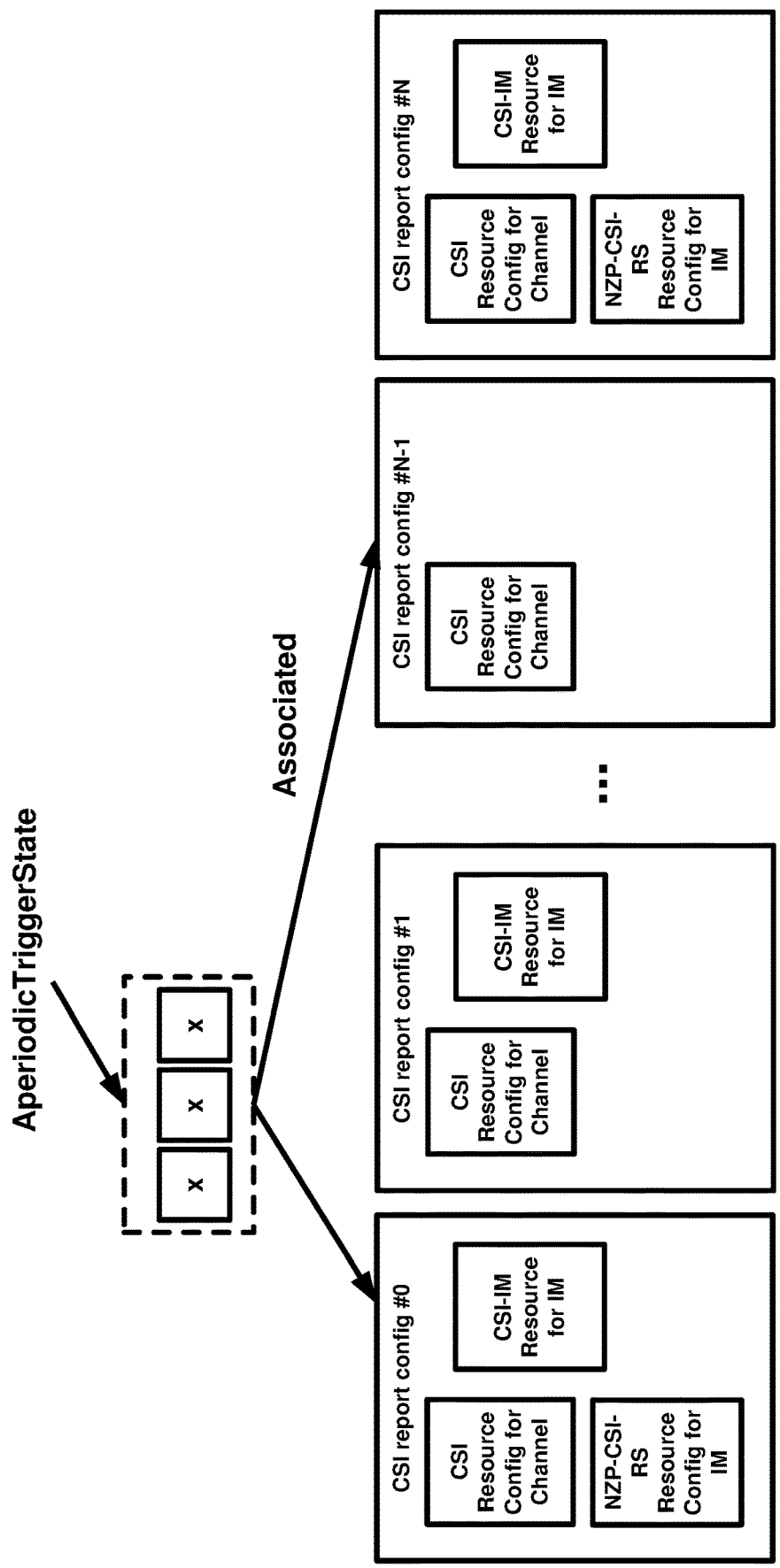
FIG. 24 is a diagram showing operations of CSI reporting as per an aspect of an example embodiment of the present disclosure.

For aperiodic CSI, each trigger state configured using the higher layer parameter CSI-AperiodicTriggerState may be associated with one or multiple CSI-ReportConfig where each CSI-ReportConfig is linked to periodic, or semi-persistent, or aperiodic resource setting(s). FIG. 24 is an example diagram illustrating application of each trigger state configured using the higher layer parameter CSI— AperiodicTriggerState in accordance with embodiments of the present disclosure. When one Resource Setting is configured, the Resource Setting (given by higher layer parameter resourcesForChannelMeasurement) may be for channel measurement for L1-RSRP computation. When two Resource Settings are configured, the first one Resource Setting (given by higher layer parameter resourcesForChannelMeasurement) may be for channel measurement and the second one (given by either higher layer parameter csi-IM-ResourcesForInterference or higher layer parameter nzp-CSI-RS-ResourcesForInterference) may be for interference measurement performed on CSI-IM or on NZP CSI-RS. When three Resource Settings are configured, the first Resource Setting (higher layer parameter resourcesForChannelMeasurement) may be for channel measurement, the second one (given by higher layer parameter csi-IM-ResourcesForInterference) may be for CSI-IM based interference measurement and the third one (given by higher layer parameter nzp-CSI-RS-ResourcesForInterference) may be for NZP CSI-RS based interference measurement.

For semi-persistent or periodic CSI, each CSI-ReportConfig may be linked to periodic or semi-persistent Resource Setting(s). When one Resource Setting (given by higher layer parameter resourcesForChannelMeasurement) is configured, the Resource Setting may be for channel measurement for L1-RSRP computation. When two Resource Settings are configured, the first Resource Setting (given by higher layer parameter resourcesForChannelMeasurement) may be for channel measurement and the second Resource Setting (given by higher layer parameter csi-IM-ResourcesForInterference) may be used for interference measurement performed on CSI-IM. A wireless device may not be expected to be configured with more than one CSI-RS resource in resource set for channel measurement for a CSI-ReportConfig with the higher layer parameter codebookType set to 'typeII' or to 'typeII-PortSelection'. A wireless device may not be expected to be configured with more than 64 NZP CSI-RS resources in resource setting for channel measurement for a CSI-ReportConfig with the higher layer parameter reportQuantity set to 'none', 'cri-RI-CQI', 'cri-RSRP' or 'ssb-Index-RSRP'. If interference measurement is performed on CSI-IM, each CSI-RS resource for channel measurement may be resource-wise associated with a CSI-IM resource by the ordering of the CSI-RS resource and CSI-IM resource in the corresponding resource sets. The number of CSI-RS resources for channel measurement may equal to the number of CSI-IM resources. If interference measurement is performed on NZP CSI-RS, a wireless device may not expect to be configured with more than one NZP CSI-RS resource in the associated resource set within the resource setting for channel measurement. The wireless device configured with the higher layer parameter nzp-CSI-RS-ResourcesForInterference may expect no more than 18 NZP CSI-RS ports configured in a NZP CSI-RS resource set.

For CSI measurement(s), a wireless device may assume each NZP CSI-RS port configured for interference measurement corresponds to an interference transmission layer, all interference transmission layers on NZP CSI-RS ports for interference measurement take into account the associated EPRE ratios and other interference signal on REs of NZP CSI-RS resource for channel measurement, NZP CSI-RS resource for interference measurement, or CSI-IM resource for interference measurement.

A wireless device may be configured with a CSI-ReportConfig with the higher layer parameter reportQuantity set to either 'none', 'cri-RI-PMI-CQI', 'cri-RI-i1', 'cri-RI-i1-CQI', 'cri-RI-CQI', 'cri-RSRP', 'ssb-Index-RSRP' or 'cri-RI-LI-PMI-CQI'.

If the wireless device is configured with a CSI-ReportConfig with the higher layer parameter reportQuantity set to 'none', then the wireless device may not report any quantity for the CSI-ReportConfig.

If the wireless device is configured with a CSI-ReportConfig with the higher layer parameter reportQuantity set to 'cri-RI-PMI-CQI', or 'cri-RI-LI-PMI-CQI', the wireless device may report a preferred precoder matrix for the entire reporting band, or a preferred precoder matrix per subband.

If the wireless device is configured with a CSI-ReportConfig with the higher layer parameter reportQuantity set to 'cri-RI-i1', the wireless device may expect, for that CSI-ReportConfig, to be configured with higher layer parameter codebookType set to 'typeI-SinglePanel' and pmi-FormatIndicator configured for wideband PMI reporting, and, the wireless device may report a PMI consisting of a single wideband indication (e.g., i1) for the entire CSI reporting band.

If the wireless device is configured with a CSI-ReportConfig with the higher layer parameter reportQuantity set to 'cri-RI-i1-CQI', the wireless device may expect, for that CSI-ReportConfig, to be configured with higher layer parameter codebookType set to 'typeI-SinglePanel' and pmi-FormatIndicator configured for wideband PMI reporting, and the UE may report a PMI consisting of a single wideband indication (e.g., i1) for the entire CSI reporting band. The CQI may be calculated conditioned on the reported assuming PDSCH transmission with $N_P \geq 1$ precoders (e.g., corresponding to the same i1 but different i2), where the wireless device may assume that one precoder is randomly selected from the set of precoders for each PRG on PDSCH, where the PRG size for CQI calculation is configured by the higher layer parameter pdsch-BundleSize-ForCSI.

If the wireless device is configured with a CSI-ReportConfig with the higher layer parameter reportQuantity set to 'cri-RI-CQI', and if the wireless device is configured with higher layer parameter non-PMI-PortIndication contained in a CSI-ReportConfig, r ports may be indicated in the order of layer ordering for rank r and each CSI-RS resource in the CSI resource setting may be linked to the CSI-ReportConfig based on the order of the associated NZP-CSI-RS-ResourceId in the linked CSI resource setting for channel measurement given by higher layer parameter resourcesForChannelMeasurement. The configured higher layer parameter non-PMI-PortIndication may contain a sequence $p_0^{(1)}, p_0^{(2)}, p_1^{(2)}, p_0^{(3)}, p_1^{(3)}, p_2^{(3)}, \ldots, p_0^{(R)}, p_1^{(R)}, \ldots, p_{R-1}^{(R)}$ of port indices, where $p_0^{(v)}, \ldots, p_{v-1}^{(v)}$ are the CSI-RS port indices associated with rank v and $R \in \{1,2, \ldots, P\}$ where $P \in \{1,2,4,8\}$ is the number of ports in the CSI-RS resource. The UE shall only report RI corresponding to the configured fields of PortIndexFor8Ranks.

If the wireless device is configured with a CSI-ReportConfig with the higher layer parameter reportQuantity set to 'cri-RI-CQI', and if the wireless device is not configured with higher layer parameter non-PMI-PortIndication, the wireless device may assume, for each CSI-RS resource in the CSI resource setting linked to the CSI-ReportConfig, that the CSI-RS port indices $p_0^{(v)}, \ldots, p_{v-1}^{(v)}$ $\{0, \ldots v-1\}$ are associated with ranks v=1, 2, . . . , P where P∈{1,2,4,8} is the number of ports in the CSI-RS resource.

When calculating the CQI for a rank, If the wireless device is configured with a CSI-ReportConfig with the higher layer parameter reportQuantity set to 'cri-RI-CQI', the wireless device may use the ports indicated for that rank for the selected CSI-RS resource. The precoder for the indicated ports shall be assumed to be the identity matrix scaled by $1/\sqrt{v}$.

If the wireless device is configured with a CSI-ReportConfig with the higher layer parameter reportQuantity set to 'cri-RSRP' or 'ssb-Index-RSRP', and if the wireless device is configured with the higher layer parameter groupBasedBeamReporting set to 'disabled', the wireless device may not be not required to update measurements for more than 64 CSI-RS and/or SSB resources, and the wireless device may report in a single report nrofReportedRS (higher layer configured) different CRI or SSBRI for each report setting.

If the wireless device is configured with a CSI-ReportConfig with the higher layer parameter reportQuantity set to 'cri-RSRP' or 'ssb-Index-RSRP', and if the wireless device is configured with the higher layer parameter groupBasedBeamReporting set to 'enabled', the wireless device may not be required to update measurements for more than 64 CSI-RS and/or SSB resources, and the wireless device may report in a single reporting instance two different CRI or SSBRI for each report setting, where CSI-RS and/or SSB resources can be received simultaneously by the wireless device either with a single spatial domain receive filter, or with multiple simultaneous spatial domain receive filters.

If the wireless device is configured with a CSI-ReportConfig with the higher layer parameter reportQuantity set to 'cri-RSRP', 'cri-RI-PMI-CQI', 'cri-RI-i1', 'cri-RI-i1-CQI', 'cri-RI-CQI' or 'cri-RI-LI-PMI-CQI', and K_s>1 resources are configured in the corresponding resource set for channel measurement, then the wireless device may derive the CSI parameters other than CRI conditioned on the reported CRI, where CRI k (k≥0) corresponds to the configured (k+1)-th entry of associated nzp-CSI-RSResource in the corresponding nzp-CSI-RS-ResourceSet for channel measurement, and (k+1)-th entry of associated csi-IM-Resource in the corresponding csi-IM-ResourceSet (if configured) If K_s=2 CSI-RS resources are configured, each resource may contain at most 16 CSI-RS ports. If 2<K_s≤8 CSI-RS resources are configured, each resource may contain at most 8 CSI-RS ports.

If the wireless device is configured with a CSI-ReportConfig with the higher layer parameter reportQuantity set to 'ssb-Index-RSRP', the wireless device may report SSBRI, where SSBRI k (k≥0) corresponds to the configured (k+1)-th entry of the associated csi-SSB-ResourceList in the corresponding CSI-SSB-ResourceSet.

If the wireless device is configured with a CSI-ReportConfig with the higher layer parameter reportQuantity set to 'cri-RI-PMI-CQI', 'cri-RI-i1', 'cri-RI-i1-CQI', 'cri-RI-CQI' or 'cri-RI-LI-PMI-CQI', then the wireless device may not be expected to be configured with more than 8 CSI-RS resources in a CSI-RS resource set contained within a resource setting that is linked to the CSI-ReportConfig.

If the wireless device is configured with a CSI-ReportConfig with higher layer parameter reportQuantity set to 'cri-RSRP' or 'none' and the CSI-ReportConfig is linked to a resource setting configured with the higher layer parameter resourceType set to 'aperiodic', then the wireless device may not be expected to be configured with more than 16 CSI-RS resources in a CSI-RS resource set contained within the resource setting.

The LI may indicate which column of the precoder matrix of the reported PMI corresponds to the strongest layer of the codeword corresponding to the largest reported wideband CQI. If two wideband CQIs are reported and have equal value, the LI may correspond to strongest layer of the first codeword.

For L1-RSRP computation, the wireless device may be configured with CSI-RS resources, SS/PBCH Block resources or both CSI-RS and SS/PBCH block resources, when resource-wise quasi co-located with 'QCL-Type C' and 'QCL-TypeD' when applicable. The UE may be configured with CSI-RS resource setting up to 16 CSI-RS resource sets having up to 64 resources within each set. The total number of different CSI-RS resources over all resource sets may be no more than 128. For L1-RSRP reporting, if the higher layer parameter nrofReportedRS in CSI-ReportConfig is configured to be one, the reported L1-RSRP value may be defined by a 7-bit value in the range [−140, −44] dBm with 1 dB step size, if the higher layer parameter nrofReportedRS is configured to be larger than one, or if the higher layer parameter groupBasedBeamReporting is configured as 'enabled', the wireless device may use differential L1-RSRP based reporting, where the largest measured value of L1-RSRP may be quantized to a 7-bit value in the range [−140, −44] dBm with 1 dB step size, and the differential L1-RSRP may be quantized to a 4-bit value. The differential L1-RSRP value may be computed with 2 dB step size with a reference to the largest measured L1-RSRP value which may be part of the same L1-RSRP reporting instance.

For CSI-RS resource sets associated with Resource Settings configured with the higher layer parameter resourceType set to 'aperiodic', 'periodic', or 'semi-persistent', trigger states for Reporting Setting(s) (configured with the higher layer parameter reportConfigType set to 'aperiodic') and/or Resource Setting for channel and/or interference measurement on one or more component carriers may be configured using the higher layer parameter CSI-AperiodicTriggerStateList. For aperiodic CSI report triggering, a single set of CSI triggering states may be higher layer configured, wherein the CSI triggering states may be associated with any candidate DL BWP. A wireless device may not be expected to receive more than one DCI with non-zero CSI request per slot. A wireless device may not be expected to be configured with different TCI-StateId's for the same aperiodic CSI-RS resource ID configured in multiple aperiodic CSI-RS resource sets with the same triggering offset in the same aperiodic trigger state. A wireless device may not be expected to receive more than one aperiodic CSI report request for transmission in a given slot. A wireless device may not be expected to be triggered with a CSI report for a non-active DL BWP. A trigger state may be initiated using the CSI request field in DCI.

When all the bits of CSI request field in DCI are set to zero, no CSI may be requested. When the number of configured CSI triggering states in CSI-AperiodicTriggerStateList is greater than $2^{N_{TS}}-1$, where $N_{TS}$ is the number of bits in the DCI CSI request field, the wireless device may receive a subselection indication used to map up to $2^{N_{TS}}-1$ trigger states to the codepoints of the CSI request field in DCI. $N_{TS}$ may be configured by the higher layer parameter reportTriggerSize where $N_{TS} \in \{0,1,2,3,4,5,6\}$. When the HARQ/ACK corresponding to the PDSCH carrying the subselection indication is transmitted in the slot n, the corresponding action and assumption of the wireless device on the mapping of the selected CSI trigger state(s) to the codepoint(s) of DCI CSI request field may be applied starting from the first slot that is after slot $n+3N_{slot}^{subframe,\mu}$.

When the number of CSI triggering states in CSI-AperiodicTriggerStateList is less than or equal to $2^{N_{TS}}-1$, the CSI request field in DCI may directly indicate the triggering state. For each aperiodic CSI-RS resource in a CSI-RS resource set associated with each CSI triggering state, the wireless device may be indicated the quasi co-location configuration of quasi co-location RS source(s) and quasi co-location type(s) through higher layer signaling of qcl-info which contains a list of references to TCI-State's for the aperiodic CSI-RS resources associated with the CSI triggering state. If a State referred to in the list is configured with a reference to an RS associated with 'QCL-TypeD', that RS may be an SS/PBCH block located in the same or different CC/DL BWP or a CSI-RS resource configured as periodic or semi-persistent located in the same or different CC/DL BWP. If the scheduling offset between the last symbol of the PDCCH carrying the triggering DCI and the first symbol of the aperiodic CSI-RS resources in a NZP-CSI-RS-ResourceSet configured without higher layer parameter trs-Info and without the higher layer parameter repetition is smaller than the reported threshold beamSwitchTiming by the wireless device when the reported value is one of the values of {14, 28, 48}, if there is any other DL signal with an indicated TCI state in the same symbols as the CSI-RS, the wireless device may apply the QCL assumption of the other DL signal also when receiving the aperiodic CSI-RS. The other DL signal may refer to PDSCH scheduled with offset larger than or equal to the threshold timeDurationForQCL aperiodic CSI-RS scheduled with offset larger than or equal to the UE reported threshold beamSwitchTiming when the reported value is one of the values {14,28,48}, periodic CSI-RS, semi-persistent CSI-RS. Else, when receiving the aperiodic CSI-RS, the wireless device may apply the QCL assumption used for the CORESET associated with a monitored search space with the lowest CORESET-ID in the latest slot in which one or more CORESETs within the active BWP of the serving cell are monitored.

If the scheduling offset between the last symbol of the PDCCH carrying the triggering DCI and the first symbol of the aperiodic CSI-RS resources is equal to or greater than the reported threshold beamSwitchTiming by the wireless device when the reported value is one of the values of {14,28,48}, the wireless device may be expected to apply the QCL assumptions in the indicated TCI states for the aperiodic CSI-RS resources in the CSI triggering state indicated by the CSI trigger field in DCI.

A non-zero codepoint of the CSI request field in the DCI may be mapped to a CSI triggering state according to the order of the associated positions of the up to $2^{N_{TS}}-1$ trigger states in CSI-AperiodicTriggerStateList with codepoint '1' mapped to the triggering state in the first position.

For a wireless device configured with the higher layer parameter CSI-AperiodicTriggerStateList, if a Resource Setting linked to a CSI-ReportConfig has multiple aperiodic resource sets, only one of the aperiodic CSI-RS resource sets from the Resource Setting may be associated with the trigger state, and the wireless device may be higher layer configured per trigger state per Resource Setting to select the one CSI-IM/NZP CSI-RS resource set from the Resource Setting.

When aperiodic CSI-RS is used with aperiodic reporting, the CSI-RS offset may be configured per resource set by the higher layer parameter aperiodicTriggeringOffset. The CSI-RS triggering offset may have the values of {0, 1, 2, 3, 4, 16, 24} slots. If all the associated trigger states do not have the higher layer parameter qcl-Type set to 'QCL-TypeD' in the corresponding TCI states, the CSI-RS triggering offset may be fixed to zero. The aperiodic triggering offset of the CSI-IM may follow offset of the associated NZP CSI-RS for channel measurement.

The wireless device may not expect that aperiodic CSI-RS is transmitted before the OFDM symbol(s) carrying its triggering DCI.

If interference measurement is performed on aperiodic NZP CSI-RS, a wireless device may not be expected to be configured with a different aperiodic triggering offset of the NZP CSI-RS for interference measurement from the associated NZP CSI-RS for channel measurement.

If the wireless device is configured with a single carrier for uplink, the wireless device may not be expected to transmit more than one aperiodic CSI report triggered by different DCIs on overlapping OFDM symbols.

For semi-persistent reporting on PUSCH, a set of trigger states may be higher layer configured by CSI-SemiPersistentOnPUSCH-TriggerStateList, where the CSI request field in DCI scrambled with SP-CSI-RNTI may activate one of the trigger states. A wireless device may be not expected to receive a DCI scrambled with SP-CSI-RNTI activating one semi-persistent CSI report with the same CSI-ReportConfigId as in a semi-persistent CSI report which may be activated by a previously received DCI scrambled with SP-CSI-RNTI.

For semi-persistent reporting on PUCCH, the PUCCH resource used for transmitting the CSI report may be configured by reportConfigType. Semi-persistent reporting on PUCCH may be activated by an activation command, which selects one of the semi-persistent Reporting Settings for use by the wireless device on the PUCCH. When the HARQ-ACK corresponding to the PDSCH carrying the activation command is transmitted in slot n, the indicated semi-persistent Reporting Setting may be applied starting from the first slot that is after slot $n+3N_{slot}^{subframe,\mu}$.

For a wireless device configured with CSI resource setting(s) where the higher layer parameter resourceType set to 'semiPersistent', when a wireless device receives an activation command, for CSI-RS resource set(s) for channel measurement and CSI-IM/NZP CSI-RS resource set(s) for interference measurement associated with configured CSI resource setting(s), and when the HARQ-ACK corresponding to the PDSCH carrying the selection command is transmitted in slot n, the corresponding actions and assumptions of the wireless device (including QCL assumptions provided by a list of reference to TCI-State's, one per activated resource) on CSI-RS/CSI-IM transmission corresponding to the configured CSI-RS/CSI-IM resource configuration(s) may be applied starting from the first slot that is after slot $n+3N_{slot}^{subframe,\mu}$. If a TCI-State referred to in the list is configured with a reference to an RS associated with 'QCL-TypeD', that RS may be an SS/PBCH block, periodic or semi-persistent CSI-RS located in same or different CC/DL BWP.

For a wireless device configured with CSI resource setting(s) where the higher layer parameter resourceType set to 'semiPersistent', when a wireless device receives a deactivation command, for activated CSI-RS/CSI-IM resource set(s) associated with configured CSI resource setting(s), and when the HARQ-ACK corresponding to the PDSCH carrying the deactivation command is transmitted in slot n, the corresponding actions and assumption of the wireless device on cessation of CSI-RS/CSI-IM transmission corresponding to the deactivated CSI-RS/CSI-IM resource set(s) may apply starting from the first slot that is after slot $n+3N_{slot}^{subframe,\mu}$.

A codepoint of the CSI request field in the DCI may be mapped to a SP-CSI triggering state according to the order of the positions of the configured trigger states in CSI-SemiPersistentOnPUSCH-TriggerStateList, with codepoint '0' mapped to the triggering state in the first position. A wireless device may validate, for semi-persistent CSI activation or release, a DL semi-persistent assignment PDCCH on a DCI only if the CRC parity bits of the DCI format are scrambled with a SP-CSI-RNTI provided by higher layer parameter sp-CSI-RNTI and special fields for the DCI format are set.

If validation is achieved, the wireless device may consider the information in the DCI format as a valid activation or valid release of semi-persistent CSI transmission on PUSCH, and the wireless device activates or deactivates a CSI Reporting Setting indicated by CSI request field in the DCI. If validation is not achieved, the wireless device may consider the DCI format as having been detected with a non-matching CRC.

If the wireless device has an active semi-persistent CSI-RS/CSI-IM resource configuration, or an active semi-persistent ZP CSI-RS resource set configuration, and has not received a deactivation command, the activated semi-persistent CSI-RS/CSI-IM resource set or the activated semi-persistent ZP CSI-RS resource set configurations may be considered to be active when the corresponding DL BWP is active, otherwise they may be considered suspended.

If the wireless device is configured with carrier deactivation, the following configurations in the carrier in activated state would also be deactivated and need re-activation configuration(s): semi-persistent CSI-RS/CSI-IM resource, semi-persistent CSI reporting on PUCCH, semi-persistent SRS, semi-persistent ZP CSI-RS resource set.

Based on an unrestricted observation interval in time unless specified otherwise, the wireless device may derive for each CQI value reported in uplink slot n the highest CQI index which satisfies a single PDSCH transport block with a combination of modulation scheme, target code rate and transport block size corresponding to the CQI index, and occupying a group of downlink physical resource blocks termed the CSI reference resource, could be received with a transport block error probability not exceeding 0.1 (if the higher layer parameter cqi-Table in CSI-ReportConfig configures 'table1' or 'table2' or 0.00001, if the higher layer parameter cqi-Table in CSI-ReportConfig configures 'table3'.

If a wireless device is not configured with higher layer parameter timeRestrictionForChannelMeasurements, the wireless device may derive the channel measurements for computing CSI value reported in uplink slot n based on only the NZP CSI-RS, no later than the CSI reference resource, associated with the CSI resource setting.

If a wireless device is configured with higher layer parameter timeRestrictionForChannelMeasurements in CSI-ReportConfig, the wireless device may derive the channel measurements for computing CSI reported in uplink slot n based on only the most recent, no later than the CSI reference resource, occasion of NZP CSI-RS associated with the CSI resource setting.

If a wireless device is not configured with higher layer parameter timeRestrictionForInterferenceMeasurements, the wireless device may derive the interference measurements for computing CSI value reported in uplink slot n based on only the CSI-IM and/or NZP CSI-RS for interference measurement no later than the CSI reference resource associated with the CSI resource setting.

If a wireless device is configured with higher layer parameter timeRestrictionForInterferenceMeasurements in CSI-ReportConfig, the wireless device may derive the interference measurements for computing the CSI value reported in uplink slot n based on the most recent, no later than the CSI reference resource, occasion of CSI-IM and/or NZP CSI-RS for interference measurement associated with the CSI resource setting.

For each sub-band index s, a 2-bit sub-band differential CQI may be defined as sub-band Offset level (s)=sub-band CQI index (s)—wideband CQI index.

A combination of modulation scheme and transport block size corresponds to a CQI index if the combination could be signaled for transmission on the PDSCH in the CSI reference resource according to the Transport Block Size determination described, the modulation scheme is indicated by the CQI index, and the combination of transport block size and modulation scheme when applied to the reference resource results in the effective channel code rate which is the closest possible to the code rate indicated by the CQI index. If more than one combination of transport block size and modulation scheme results in an effective channel code rate equally close to the code rate indicated by the CQI index, only the combination with the smallest of such transport block sizes may be relevant.

FIG. 25 is an example diagram illustrating applications of a MAC CE for aperiodic CSI trigger state subselection by a wireless device in accordance with embodiments of the present disclosure. The activation command may be identified by a MAC PDU subheader with LCID. In the activation command, Serving Cell ID may indicate the identity of the Serving Cell for which the MAC CE applies. The length of the Serving Cell ID may be 5 bits. In the activation command, BWP ID may indicate a DL BWP for which the MAC CE may apply as the codepoint of the DCI (e.g., bandwidth part indicator field). The length of the BWP ID field may be 2 bits. The Ti field may indicate the selection status of the Aperiodic Trigger States configured within CSI-aperiodic-TriggerStateList. $T_0$ may refer to the first trigger state within the list, Ti to the second one and so on. If the list does not contain entry with index i, MAC entity may ignore the T field. The T field may be set to "1" to indicate that the Aperiodic Trigger State i may be mapped to the codepoint of the DCI CSI request field. The codepoint to which the Aperiodic Trigger State is mapped may be determined by its ordinal position among all the Aperiodic Trigger States with T field set to '1', i.e. the first Aperiodic Trigger State with T field set to "1" may be mapped to the codepoint value 1, second Aperiodic Trigger State with T field set to "1" shall be mapped to the codepoint value 2 and so on. The maximum number of mapped Aperiodic Trigger States is 63. R may indicate a reserved bit which may be set to "0".

Figure 26:
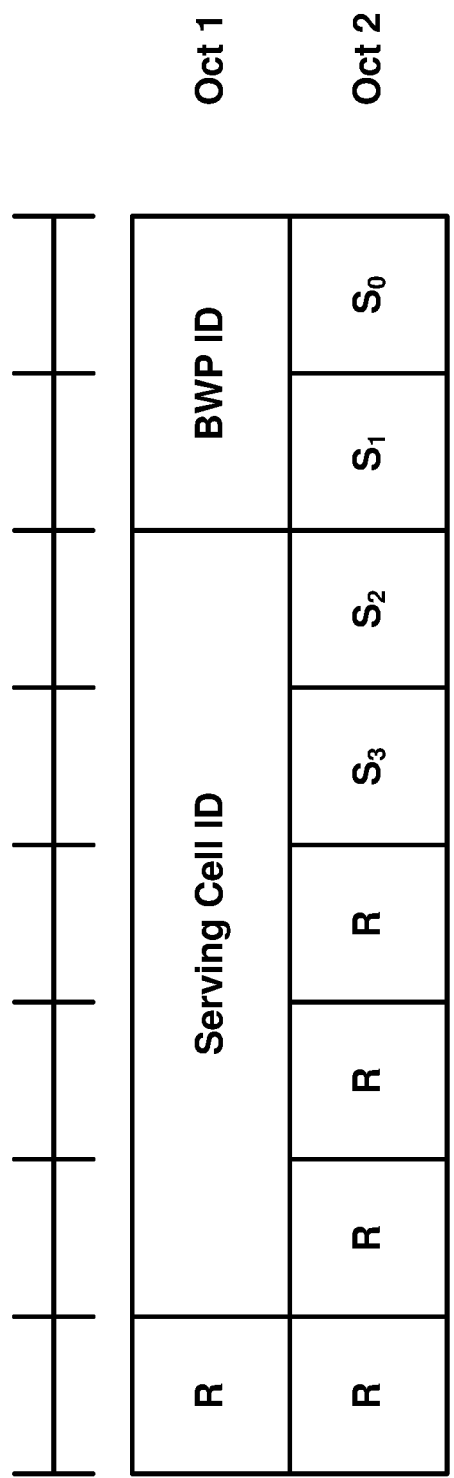
FIG. 26 is a diagram showing applications of MAC CE for semi-persistent CSI reporting as per an aspect of an example embodiment of the present disclosure.

FIG. 26 is an example diagram illustrating applications of an activation/deactivation MAC CE for semi-persistent CSI reporting on PUCCH by a wireless device in accordance with embodiments of the present disclosure. The activation command may be identified by a MAC PDU subheader with LCID. In the activation command, Serving Cell ID may indicate the identity of the Serving Cell for which the MAC CE applies. The length of the Serving Cell ID may be 5 bits. In the activation command, BWP ID may indicate a DL BWP for which the MAC CE may apply as the codepoint of the DCI (e.g., bandwidth part indicator field). The length of the BWP ID field may be 2 bits. The Si field may indicate the activation/deactivation status of the Semi-Persistent CSI report configuration within csi-ReportConfigToAddMod-List. $S_0$ may refer to the report configuration which includes PUCCH resources for semi-persistent CSI reporting in the indicated BWP and has the lowest CSI-ReportConfigId within the list with type set to "semiPersistentOnPUCCH", $S_1$ to the report configuration which includes PUCCH resources for semi-persistent CSI reporting in the indicated BWP and has the second lowest CSI-ReportConfigId and so on. If the number of report configurations within the list with type set to "semiPersistentOnPUCCH" in the indicated BWP is less than i+1, MAC entity may ignore the S field. The S field may be set to "1" to indicate that the corresponding Semi-Persistent CSI report configuration shall be activated. The S field may be set to "0" to indicate that the corresponding Semi-Persistent CSI report configuration i shall be deactivated. R may indicate a reserved bit which may be set to "0".

Figure 27:
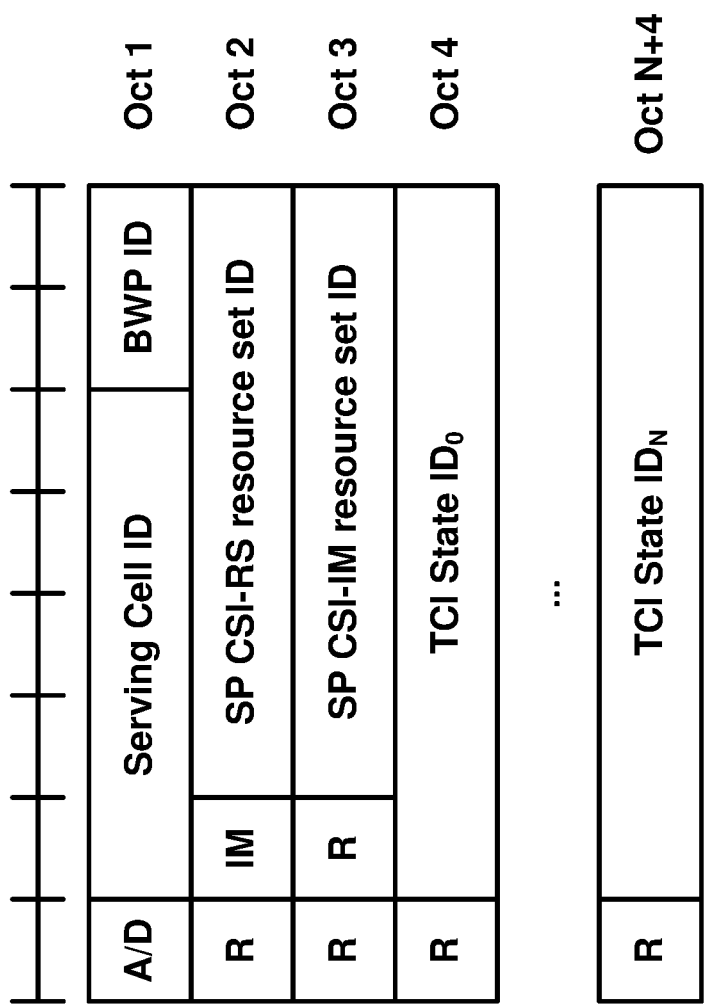
FIG. 27 is a diagram showing applications of an activation/deactivation MAC CE for semi-persistent CSI-RS/CSI-IM as per an aspect of an example embodiment of the present disclosure.

FIG. 27 is an example diagram illustrating applications of an activation/deactivation MAC CE for semi-persistent CSI-RS/CSI-IM resource set by a wireless device in accordance with embodiments of the present disclosure. The SP CSI-RS/CSI-IM Resource Set Activation/Deactivation MAC CE may be identified by a MAC PDU subheader with LCID. The MAC CE may have a variable size and may consist of A/D, Serving Cell ID, BWP ID, SP CSI-RS resource set ID, IM, SP CSI-IM resource set ID, TCI state ID, and R. The A/D field may indicate whether the MAC CE is used to activate or deactivate indicated SP CSI-RS and CSI-IM resource set(s). The field may be set to '1' to indicate activation, otherwise it may indicate deactivation. The Serving Cell ID field may indicate the identity of the Serving Cell for which the MAC CE applies. The length of the field may be 5 bits. The Serving Cell ID field may indicate the identity of the Serving Cell for which the MAC CE applies. The length of the field may be 5 bits. The SP CSI-RS resource set ID field may contain an index of NZP-CSI-RS-ResourceSet containing Semi Persistent NZP CSI-RS resources indicating the Semi Persistent NZP CSI-RS resource set, which may be activated or deactivated. The length of the field may be 6 bits. The IM field may indicate whether semi-persistent CSI-IM resource set indicated with semi-persistent CSI-IM resource set ID field may be activated/deactivated. If IM field is set to "1", SP CSI-IM resource set may be activated or deactivated (depending on A/D field setting). If IM field is set to "0", the octet containing semi-persistent CSI-IM resource set ID field may not be present. The SP CSI-IM resource set ID field may contain an index of CSI-IM-ResourceSet containing Semi Persistent CSI-IM resources, indicating the Semi Persistent CSI-IM resource set, which may be activated or deactivated. The length of the field may be 6 bits. The TCI State ID field may contain TCI-StateId of a TCI State, which may be used as QCL source for the resource within the Semi Persistent NZP CSI-RS resource set indicated by semi-persistent CSI-RS resource set ID field. TCI State $ID_0$ may indicate TCI State for the first resource within the set, TCI State $ID_1$ for the second one and so on. The length of the field may be 7 bits. If A/D field is set to "0" then the octet containing this field may be not present. The R field may indicate reserved bit, which may be set to "0".

Figure 28:
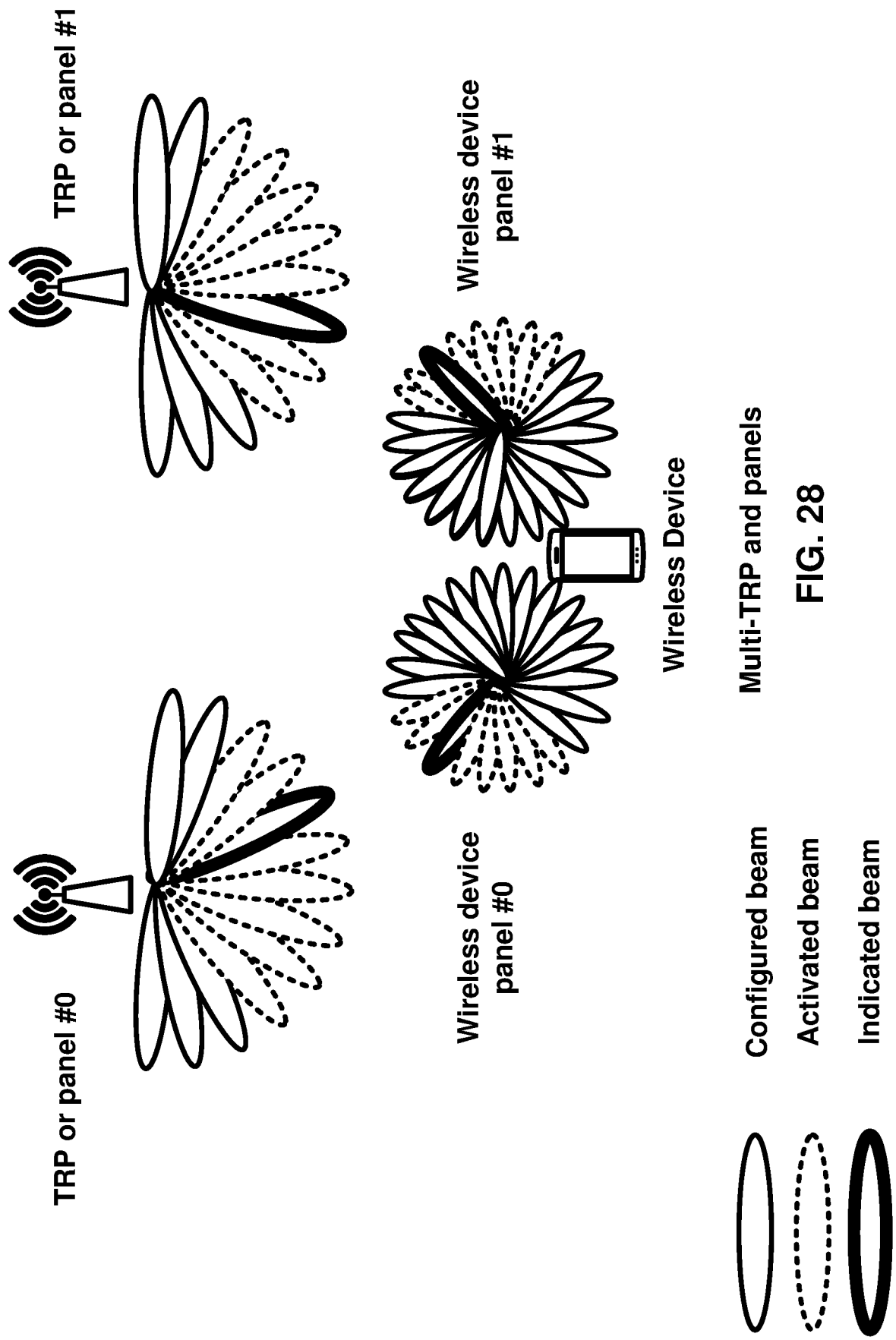
FIG. 28 is a diagram showing operations of multi-TRPs and panels as per an aspect of an example embodiment of the present disclosure.

In order to achieve higher capacity and/or reliability, a base station and/or a wireless device may comprise multi-TRPs and/or panels. FIG. 28 is an example diagram illustrating detailed operations multi-TRPs and/or panels in accordance with embodiments of the present disclosure. In an example, a wireless device on an cell edge may experience a low signal to noise ratio due to the long distance from the base station and/or interferences from other base stations and/or wireless devices. For example, multiple TRPs and/or panels may transmit packets, e.g., by a dynamic point selection (DPS)), to reduce interference between the TRPs and/or the panels. In an example, multiple TRPs and/or panels may jointly transmit packets to increase received signal power at the wireless device. There may be two types of transmission for joint transmission (JT). First type is coherent joint transmission. In the coherent joint transmission, multiple TRPs may transmit the same data in the same time and/or frequency resources. Transmitting the same data in the same time and/or frequency resources may focus the energy at a wireless device. The focused energy enhances system capacity by increasing signal-to-interference ratio (SINR). The coherent joint transmission may be seen as a beam forming from different TRPs. Second type is noncoherent joint transmission (NC-JT). For the NC-JT, the multi-TRPs may transmit different data, to a wireless device, in fully, partially or non-overlapped resources. For example, each TRP of the multi-TRPs may transmit a respective data, to at the wireless device, in fully, partially or non-overlapped resources. Since multi-TRP transmit different data, the transmission from each TRP may results in increased interference leading to a low signal quality. Considering such aspects, at high-load situations (e.g., resource utilization 80%), supporting coordinated transmissions to wireless devices which are close to each TRP may result better system capacity than NC-JT. However, NC-JT may be beneficial at low-load situations (e.g., resource utilization 20%). When a TRP does not have packets to transmit to a wireless device which is close to the TRP, the TRP may transmit data and achieve better performance to other UEs which are close to the other TRPs.

Figure 29:
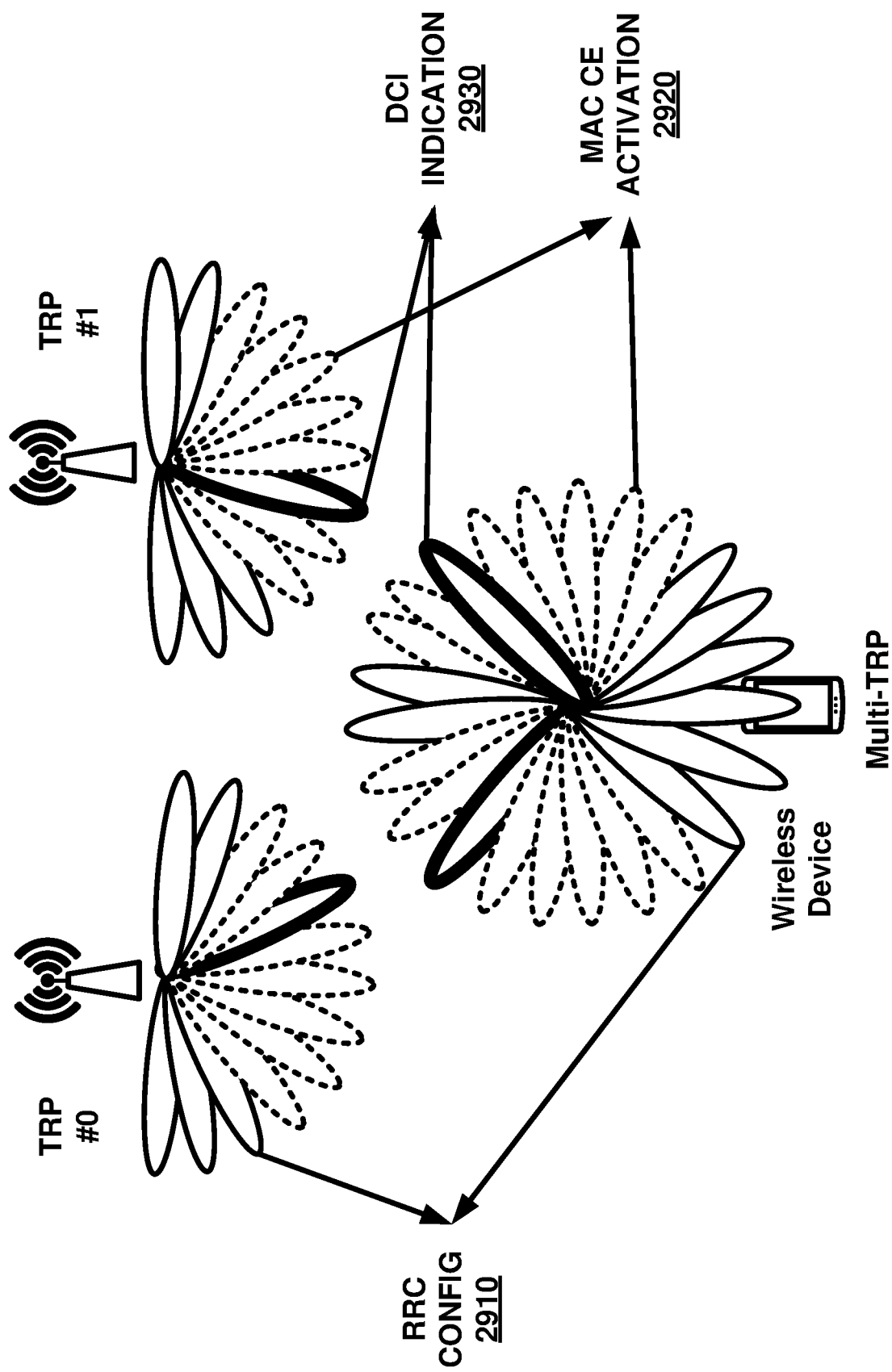
FIG. 29 is a diagram showing operations of multi-TRP as per an aspect of an example embodiment of the present disclosure.

In order to support the independent configuration, activation and indication procedures, a DCI may indicate one or more TCI states for a downlink channel (e.g., PDSCH). The indication of the one or more TCI states may be based on a group of TCI states (e.g., TCI state group). FIG. 29 is an example diagram illustrating detailed TCI state indication with multiple TRPs in accordance with embodiments of the present disclosure. A base station may configure multiple TCI state configurations (e.g., 2910) in an RRC configuration. Based on the multiple TCI state configurations (e.g., 2910), the base station may configure multiple groups of TCI states. The base station may indicate one of the multiple TCI state groups. The wireless device and/or the base station may activate a TCI state among the one of the multiple groups of TCI states for transmission of downlink channels. Without TCI state groups, a base station may need to indicate a TCI state among the all configured TCI states. This may lead to a higher DCI payload size and/or decreased coverage of a TRP. In an example, a wireless device may need to activate all the configured TCI states for multiple panels of the wireless device. However, with TCI state groups, the base station and the wireless device may activate associated TCI states with a specific panel. Supporting TCI state groups may reduce implementation complexity by reducing a number of activated TCI states for the wireless device. In an example, one or more configurations may comprise one or more groups for downlink transmissions. Among the configured TCI state groups (e.g., 2910), the base station may indicate one or more TCI state groups for the activation and deactivation of configured TCI states (e.g., 2910) via MAC CE signaling (e.g., 2920). Based on the indicated one or more TCI state groups, the base station may activate and deactivate one or more TCI states (e.g., 2910) in the indicated one or more TCI state groups. Among the activated TCI state groups via MAC CE signaling, one or more DCIs may indicate (e.g., 2930) one or more TCI state groups for downlink transmissions. Based on the indication of TCI state groups, one or more DCIs may schedule downlink channels (e.g., 2930) with one or more activated TCI states in the indicated TCI state groups. The indication of multiple TCI state groups for activation/deactivation and downlink transmissions may be delivered via a single MAC CE and DCI signaling as well as multiple MAC CE and DCI signaling. It should be noted that a group of TCI states may also be referred to as a list of TCI states and an operation of the TCI states group may be based on a CORESET group.

Figure 30:
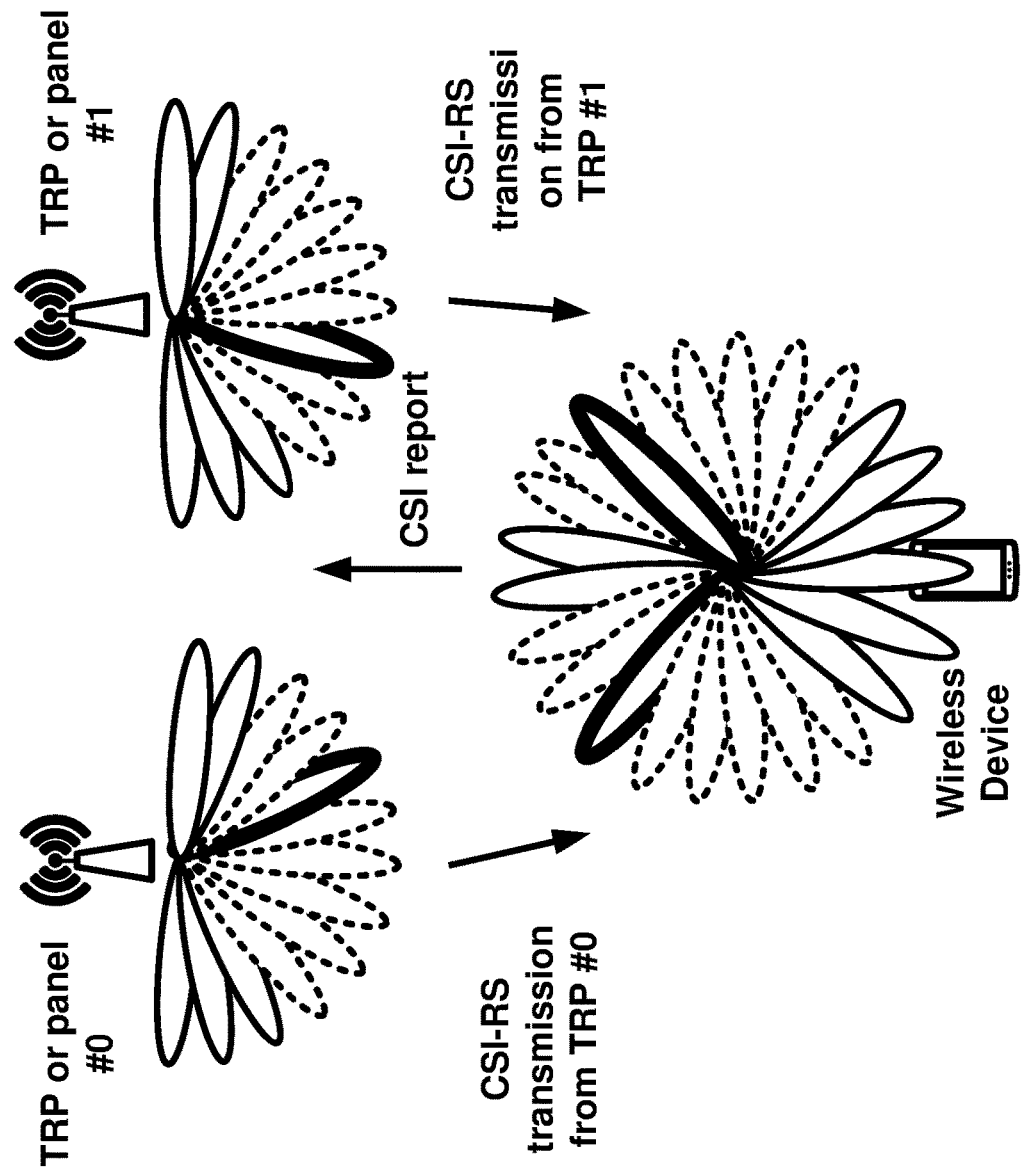
FIG. 30 is a diagram showing operations of CSI measurement and reporting as per an aspect of an example embodiment of the present disclosure.

FIG. 30 is an example diagram illustrating CSI-RS transmissions and CSI reporting with multiple TRPs and/or panels for NC-JT transmission in accordance with embodiments of the present disclosure.

In existing technologies, a CSI reporting for multi-TRP/panel (e.g., TRP/panel #0 or TRP/panel #1) may be configured to achieve higher data rate by supporting multi-TRP/panel transmission compared to a single TRP/panel transmission for a base station and a wireless device. A wireless device may support CSI measurement and CSI reporting for a single TRP/panel. When the wireless device supports the CSI measurement and the CSI reporting for the single TRP/panel, the wireless device may report information (e.g., RI, PMI and/or CQI) based on (or considering) single TRP/panel. The wireless device may not take other TRPs/panels into account in the CSI measurement and the CSI reporting. This may result in the information not being accurate for multi-TRP/panel (e.g., TRP/panel #0 or TRP/panel #1) transmission when the wireless device is served by multi-TRP/panel. For example, selections of precoding matrix, coding rate and modulation by the wireless device in a CSI report for multi-TRP/panel may be different when the wireless device considers (or takes into account) interferences, e.g., due to simultaneous, data transmissions from multi-TRP/panel. In order to generate the CSI report (e.g., CSI report for multi-TRP/panel) considering the interferences, the base station and the wireless device may support measurement of multiple channels from multi-TRP/panel. For example, the base station may configure and transmit multiple CSI-RS resources (e.g., CSI-RS transmission from TRP/panel #0 and #1) for multi-TRP/panel (e.g., TRP/panel #0 or TRP/panel #1). Based on the transmitting the multiple CSI-RS resources (e.g., CSI-RS transmission from TRP/panel #0 and #1), the wireless device may measure wireless channels from multi-TRP/panel. Based on the measurement, the wireless device may generate a CSI report considering interferences between multi-TRP/panel.

In existing technologies, additional information may be included in a CSI report for multi-TRP/panel. For example, a CSI reporting with the additional information such as multiple RIs, PMIs and/or CQIs may be configured. In this example, each RI, PMI, and/or CQI of the multiple RIs, PMIs and/or CQIs may indicate a number of layers, precoding matrix indicator, and/or channel quality indicator with a respective measurement of channel from each TRP/panel of the multi-TRP/panel. The usage of multiple RIs, PMIs and/or CQIs may be semi-statically configured in an RRC configuration in reportQuantity by a base station. A semi-statically configured CSI report for multi-TRP/panel may provide a higher system capacity in a low-load situation by supporting effective multi-TRP/panel transmission. The semi-statically configured CSI report may require increased uplink resource overhead for CSI reporting and/or increased power consumption of a wireless device in a high-load situation. A traffic load for a base station and a wireless device may vary dynamically (e.g., between high-load and low-load). The semi-statically configured CSI report may not adapt a dynamic load change. When the traffic load varies dynamically, implementation of existing semi-statically configured CSI report may increase uplink resource overhead for CSI reporting, increase power consumption and/or provide a lower capacity. There is a need to implement an enhanced procedure when the traffic load varies dynamically.

Example embodiments implement an enhanced procedure for a CSI reporting in multi-TRP/panel, e.g., when the traffic load varies dynamically. For example, a dynamic CSI report type indication may be supported. For example, in a low-load traffic, the base station may turn on multi-TRP/panel CSI report to support effective multi-TRP/panel transmission. In a high-load traffic, the base station may turn off multi-TRP/panel CSI report and turn on single-TRP/panel CSI report to support effective multi-TRP/panel transmission and/or reduce unnecessary consumption of uplink resource and wireless device's power consumption.

This enhanced process reduces uplink overhead and interference, reduces battery power consumption at the wireless device and/or base station.

Figure 31:
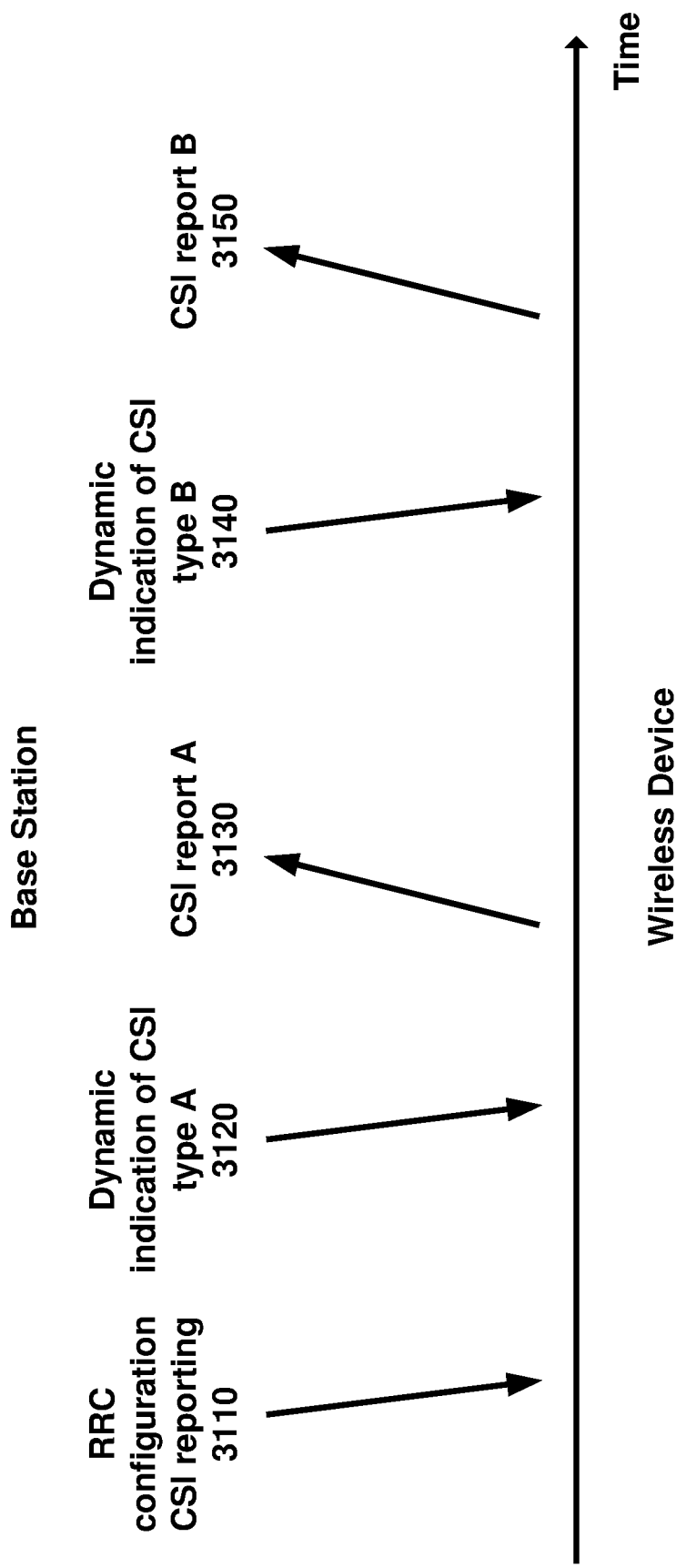
FIG. 31 is a diagram showing application of dynamic signaling as per an aspect of an example embodiment of the present disclosure.

FIG. 31 is an example diagram illustrating dynamic indication of CSI type in accordance with embodiments of the present disclosure. In an example, RRC configuration (e.g., 3110) for CSI reporting may be configured in RRC. The configuration may comprise a usage of dynamic indication of CSI reporting type, serving cell index, resource config for channel measurement, resource config for CSI-IM for interference, resource config for NZP-CSI-RS resources for interference, report config type, report quantity, report frequency config, report frequency config, time restriction of channel measurements, time restriction of interference measurements, codebook config, usage of group based beam reporting, CQI table config, subband size, and/or usage of non-PMI port indication. Based on the RRC configuration (e.g., 3110), dynamic indication a CSI report for single TRP/panel (e.g., 3120) may be transmitted to a wireless device. A signaling of the dynamic indication (e.g., 3120) may be DCI, MAC CE or DCI+MAC CE. Based on the indication (e.g., 3120), the wireless device may transmit a CSI report for single TRP/panel (e.g., 3130). Based on the configuration (e.g., 3110), the base station may dynamically indicate a CSI report for multi-TRP/panel (e.g., 3140). Based on the indication (e.g., 3150), the wireless device may transmit a CSI report for multi-TRP/panel (e.g., 3150).

Figure 32:
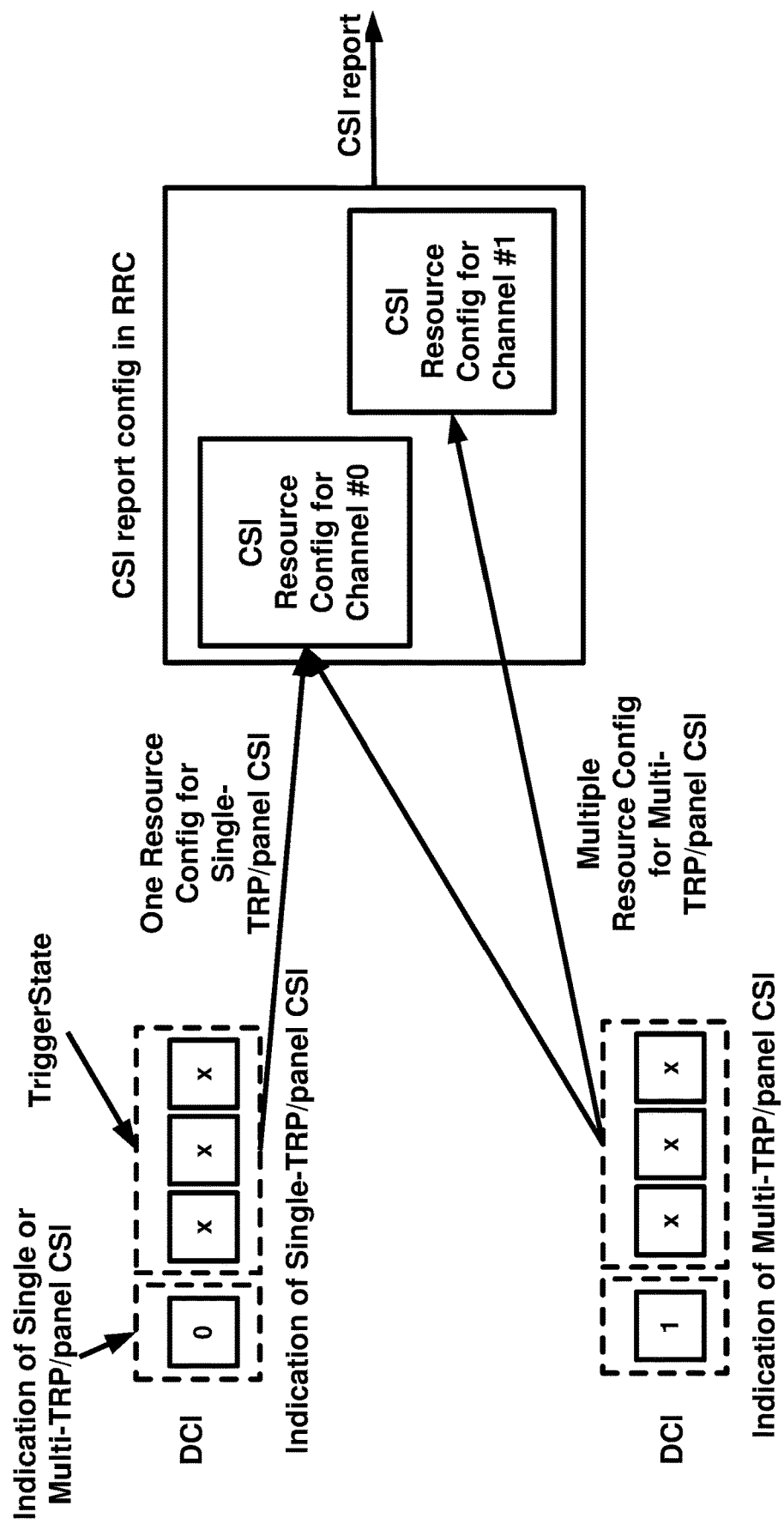
FIG. 32 is a diagram showing application of DCI signaling as per an aspect of an example embodiment of the present disclosure.

In an example, DCI based signaling by a base station may be supported to dynamically indicate a type of CSI reporting (e.g., 3120 or 3140). FIG. 32 is an example diagram illustrating detailed operation of DCI based signaling in accordance with embodiments of the present disclosure. Information bits (e.g., indication of Single or Multi-TRP/panel CSI) to indicate CSI reporting type may be introduced to indicate CSI reporting type. The base station may transmit the information bits with CSI report trigger (e.g., TriggerState) for aperiodic CSI report or semi-persistent CSI report with PUSCH. For example, a wireless device may receive one or more CSI report configurations (e.g., CSI report config in RRC) with a plurality of CSI resource configurations for channel measurement (e.g., CSI Resource Config for Channel #0 and #1). Based on the CSI report configurations (e.g., CSI report config in RRC), the wireless device may receive a DCI (e.g., Indication of single-TRP/panel CSI or multi-TRP/panel CSI) comprising a first field and a second field. The first field may have a triggering state (e.g., TriggerState) indicating one or more CSI report configs (e.g., CSI report config in RRC) for aperiodic CSI reporting or semi-persistent CSI reporting with PUSCH. The second field (e.g., indication of single or multi-TRP/panel CSI) may indicate a CSI type. For example, based on the CSI type (e.g., indication of single or multi-TRP/panel CSI), the wireless device may decide which one or more of the plurality of CSI resource configurations (e.g., CSI Resource Config for Channel #0 and/or CSI Resource Config for Channel #1) is selected for channel measurement. When the one of the plurality of CSI resource configuration in the CSI report configuration (e.g., CSI Resource Config for Channel #0 or CSI Resource Config for Channel #1) is selected, the one of the plurality of CSI resource configuration (e.g., CSI Resource Config for Channel #0 or CSI Resource Config for Channel #1) may be the CSI resource configuration with the lowest order (e.g., CSI Resource Config for Channel #0), the existing CSI resource configuration for single TRP CSI report (e.g., CSI Resource Config for Channel #0), CSI-RS resource configuration with the lowest CSI-RS resource identity, CSI-RS resource configuration with the lowest CSI-RS resource set identity, or preconfigured CSI-RS resource configuration for the selection by RRC configuration. In an example, the second field (e.g., Indication of Single or Multi-TRP/panel CSI) may indicate a set of CSI resource configuration among a plurality of sets in the CSI reporting config. The preconfigured sets may have one or more CSI resource configurations for channel measurement for single and multi-TRP/panel scenarios. The set of CSI resource configuration may be higher layer configured by the base station.

Figure 33:
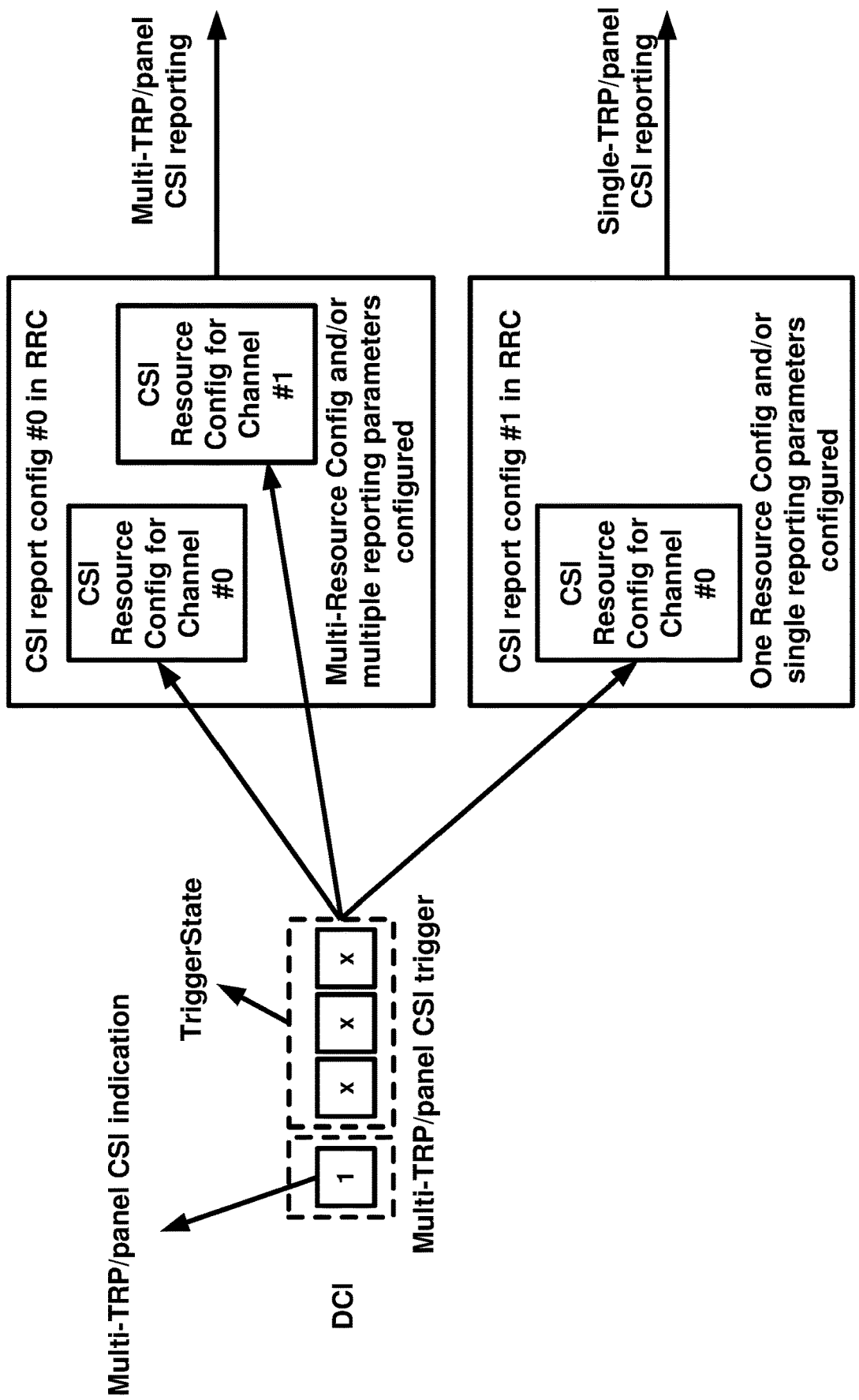
FIG. 33 is a diagram showing application of DCI signaling as per an aspect of an example embodiment of the present disclosure.

When the first field (e.g., TriggerState) triggers a plurality of CSI report configs and the second field (e.g., Indication of Single or Multi-TRP/panel CSI) indicates multi-CSI reporting, some of the plurality of CSI report configs may not support a CSI reporting for multi-TRP/panel. FIG. 33 is an example diagram illustrating application of DCI based CSI reporting type indication to CSI report configs in accordance with embodiments of the present disclosure. For example, when multiple CSI resource configs for channel measurements are configured (e.g., CSI report config #0 in RRC), a CSI reporting for multi-TRP/panel (e.g., Multi-TRP/panel CSI reporting) may be supported based on the configuration (e.g., CSI report config #0 in RRC) and the second field (e.g., Multi-TRP/panel CSI indication). When only one CSI resource config is configured (e.g., CSI report config #1 in RRC), a CSI reporting for single TRP/panel (e.g., Single-TRP/panel CSI reporting) may be supported regardless of the CSI type indication of the second field (e.g., Multi-TRP/panel CSI indication).

The usage of CSI report for multi-TRP/panel may be indicated as a usage of CSI reporting parameters by a base station. For example, a wireless device may receive a report quantity parameter indicating that a CSI report config comprises at least one RI, at least one PMI and at least one CQI in an RRC configuration. For example, configuration of report quantity parameters such as 'cri-cri-RI-RI-PMI-PMI-CQI-CQI', 'cri-RI-PMI-CQI-cri-RI-PMI-CQI', 'cri-cri-RI-RI-LI-LI-PMI-PMI-CQI-CQI', 'cri-RI-LI-PMI-CQI-cri-RI-LI-PMI-CQI', 'cri-cri-RI-RI-CQI-CQI' and/or 'cri-RI-CQI-cri-RI-CQI' may be used. In an example, additional configuration to report quantity parameter may be used to indicate the usage of at least one RI, at least one PMI and at least one CQI. In other words, single RI, single PMI and single CQI may be reported by the wireless device unless the additional configuration exists. When the additional configuration is configured, at least one RI, at least one PMI, and at least one CQI may be reported by the wireless device. Based on the configuration, the wireless device may receive a DCI comprising a first field and a second field. The first field may have a triggering state indicating one or more CSI report configs for aperiodic CSI reporting or semi-persistent CSI reporting with PUSCH. The second field may indicate a CSI type. For example, based on the CSI type, the wireless device may decide whether a CSI reporting associated with the CSI report configuration comprises one RI, one PMI, and one CQI; or multiple RIs, multiple PMIs and multiple CQIs. In an example, the second field may indicate one of higher layer preconfigured report quantity. For example, 'cri-RI-PMI-CQI' may be configured for the value '0' and 'cri-cri-RI-RI-PMI-PMI-CQI-CQI' may be configured for the value '1'.

When the first field (e.g., TriggerState in FIG. 33) triggers a plurality of CSI report configs and the second field (e.g., Multi-TRP/panel CSI indication in FIG. 33) indicates multi-CSI reporting, some of the plurality of CSI report configs may not support a CSI reporting for NC-JT. For example, when at least one RI, at least one PMI, and at least one CQI are configured in a CSI report config (e.g., CSI report config #0 in FIG. 33), a CSI reporting for multi-TRP/panel may be supported based on the configuration (e.g., CSI report config #0 in FIG. 33) and the second field (e.g., Multi-TRP/panel CSI indication in FIG. 33). However, when only one RI, one PMI, and one CQI are configured in reportQuantity (e.g., CSI report config #1 in FIG. 33), a CSI reporting for single TRP/panel may be supported regardless of the second field (e.g., Multi-TRP/panel CSI indication in FIG. 33).

In an example, a MAC CE signaling may be used to indicate a CSI reporting type of a CSI report configuration. In this case, dedicated MAC CE signaling may be supported. For example, a MAC CE signaling with a dedicated LCID may comprise a cell ID, BWP ID, a CSI report config ID and/or a CSI report type to indicate the CSI report type of the CSI report config.

A CSI report type indication may be added to a CSI report config activation MAC CE. In this case, the wireless device may receive a CSI report configuration with a plurality of CSI resource configurations for channel measurement. Based on the CSI report configuration, the wireless device may receive a MAC CE signaling with a first field and second field. The first field may activate the CSI report configuration. The second field may indicate whether one of the plurality of CSI resource configurations is selected for channel measurement or all of the plurality of CSI resource configurations are selected for channel measurement. The wireless device may process a CSI report based on the one or more CSI resource configurations selected for the channel measurements and transmit the CSI report.

Report quantity may depend on the MAC CE signaling based indication. In an example, a wireless device may receive a report quantity parameter indicating that a CSI report configuration comprises at least one RI, at least one PMI and at least one CQI. Based on the report quantity parameter, the wireless device may receive a MAC CE comprising a first field and a second field. The first field may activate the CSI report configuration. The second field may indicate whether the CSI report configuration comprises one RI, one PMI, and one CQI or multiple RIs, multiple PMIs and multiple CQIs. The wireless device may process a CSI report based on the one or more RIs, one or more PMIs, and one or more CQIs. The wireless device may transmit the CSI report.

Figure 34:
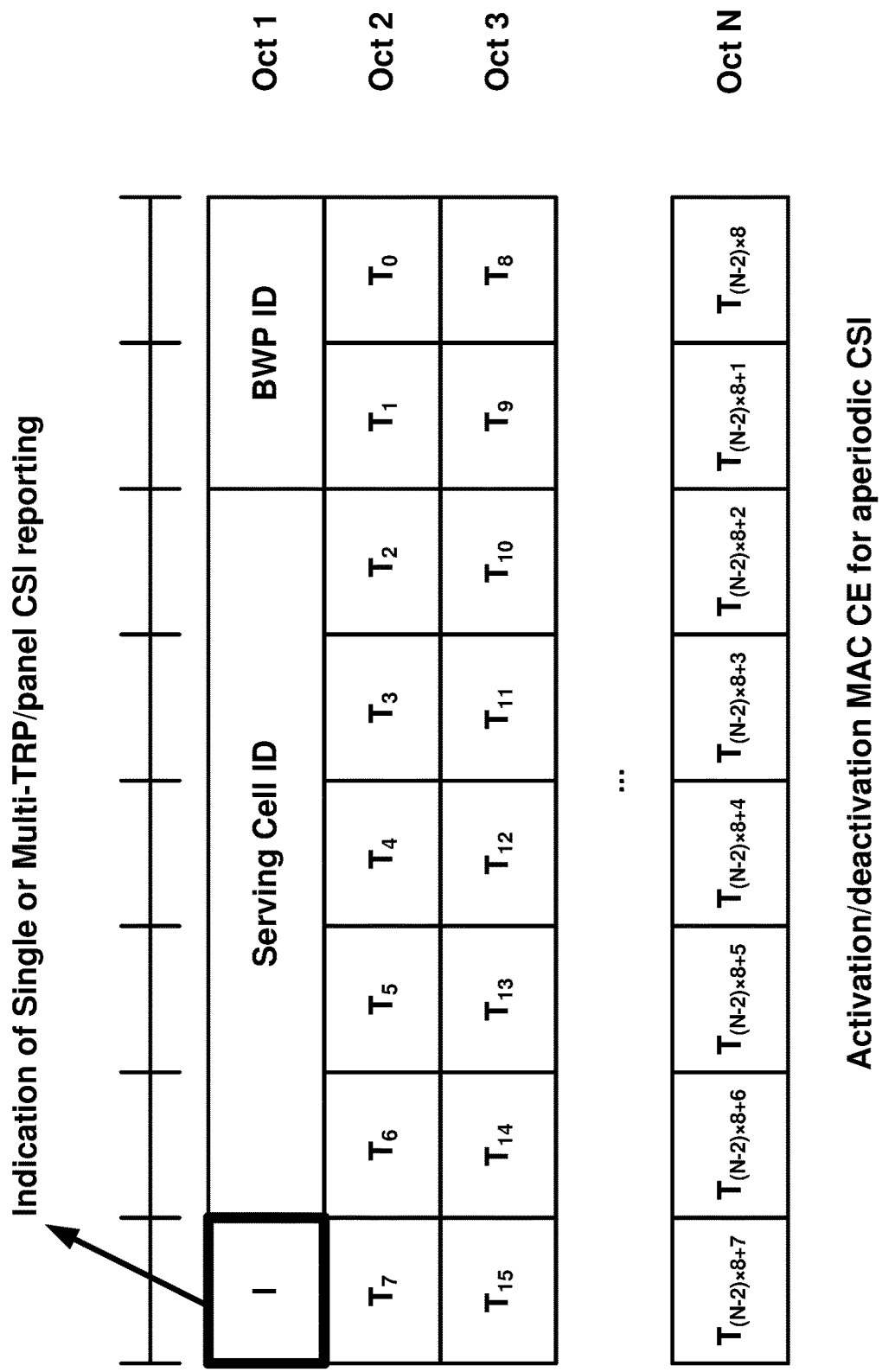
FIG. 34 is a diagram showing application of MAC CE signaling as per an aspect of an example embodiment of the present disclosure.
Figure 35:
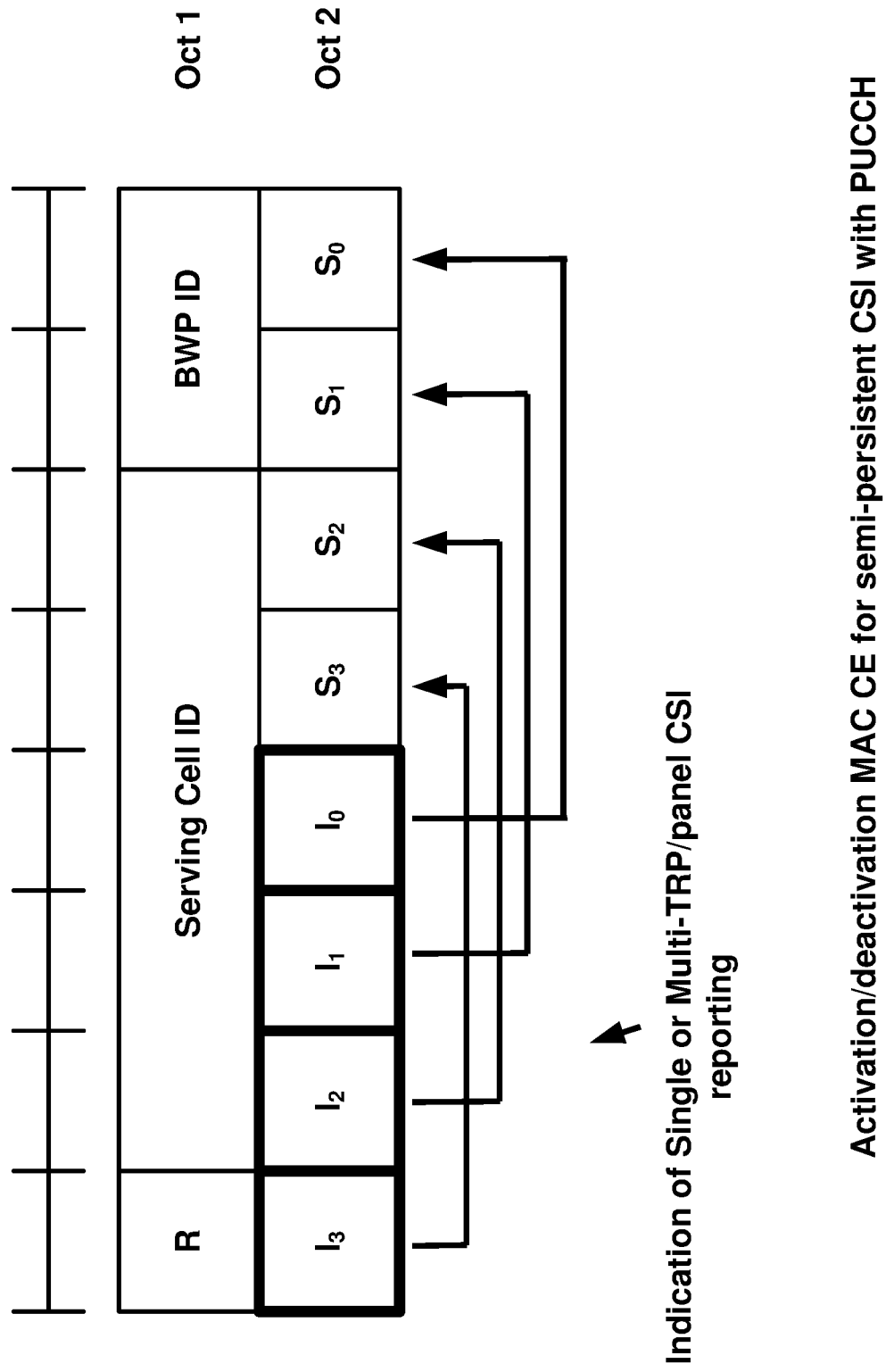
FIG. 35 is a diagram showing application of MAC CE signaling as per an aspect of an example embodiment of the present disclosure.

FIG. 34 and FIG. 35 are example diagrams illustrating applications of MAC CE signaling for activation/deactivation of aperiodic CSI (e.g., FIG. 34) and semi-persistent CSI with PUCCH (e.g., FIG. 35) in accordance with embodiments of the present disclosure. For example, as shown in FIGS. 34 and 35, one or more bits to indicate CSI reporting type (e.g., Indication of Single or Multi-TRP/panel CSI reporting) for one or more trigger states/CSI report configs (e.g., T) may be supported. The indication bit (e.g., Indication of Single or Multi-TRP/panel CSI reporting) may be a reserved bit when the usage of CSI report type indication is not configured. The indication bit (e.g., Indication of Single or Multi-TRP/panel CSI reporting) may indicate CSI reporting type when the usage of CSI report type indication is configured in RRC configuration by the base station.

Figure 36:
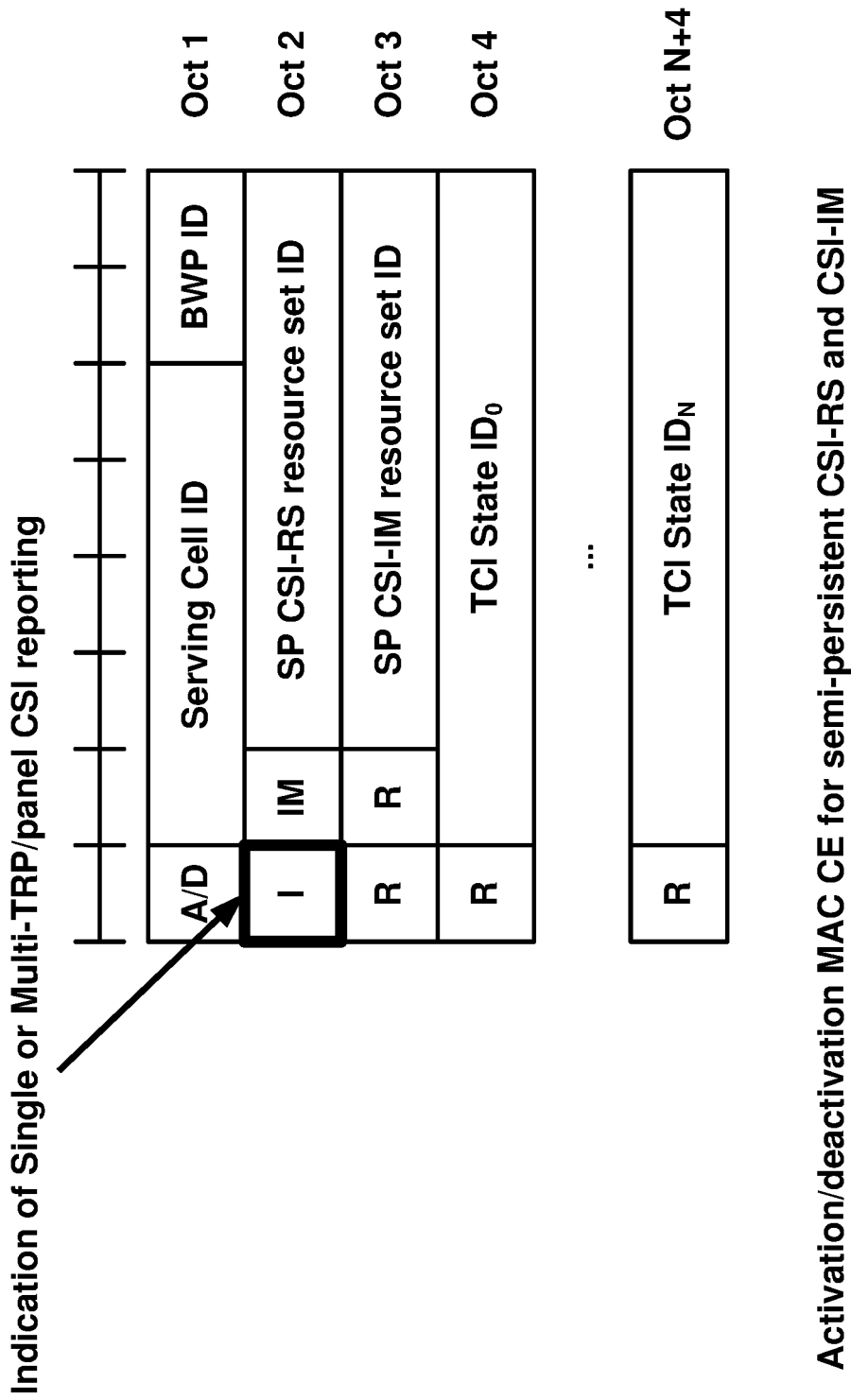
FIG. 36 is a diagram showing application of MAC CE signaling as per an aspect of an example embodiment of the present disclosure.

In an example, the CSI report type indication may be supported with a semi-persistent CSI-RS activation/deactivation MAC CE. FIG. 36 is an example diagram illustrating applications of MAC CE signaling for activation/deactivation of semi-persistent CSI-RS and CSI-IM in accordance with embodiments of the present disclosure. For example, a wireless device may receive a CSI-RS resource set configuration in CSI-RS resource config of RRC configuration from a base station. Based on the configuration, the wireless device may receive a MAC CE signaling for semi-persistent CSI-RS resource set activation/deactivation with a first field (e.g., A/D) and a second field (e.g., Indication of Single or Multi-TRP/panel CSI reporting). The first field (e.g., A/D) may indicate activation and deactivation of the semi-persistent CSI-RS resource set which is indicated by a CSI-RS resource set identity (e.g., SP CSI-RS resource set ID) and the second field (e.g., Indication of Single or Multi-TRP/panel CSI reporting) may indicate the CSI report type (e.g., single TRP/panel or multi-TRP/panel) for the semi-persistent CSI-RS resource set. The wireless device may process a CSI report based on the CSI report type (e.g., single TRP/panel or multi-TRP/panel) of the CSI-RS resource set when the wireless device process a CSI report for a CSI report config comprises the CSI-RS resource set. The wireless device may transmit the CSI report. The indication bit of the second field (e.g., Indication of Single or Multi-TRP/panel CSI reporting) may be a reserved bit when the usage of CSI report type indication is not configured in RRC configuration. The indication bit (e.g., Indication of Single or Multi-TRP/panel CSI reporting) may indicate CSI reporting type when the usage of CSI report type indication is configured in RRC configuration.

Figure 37:
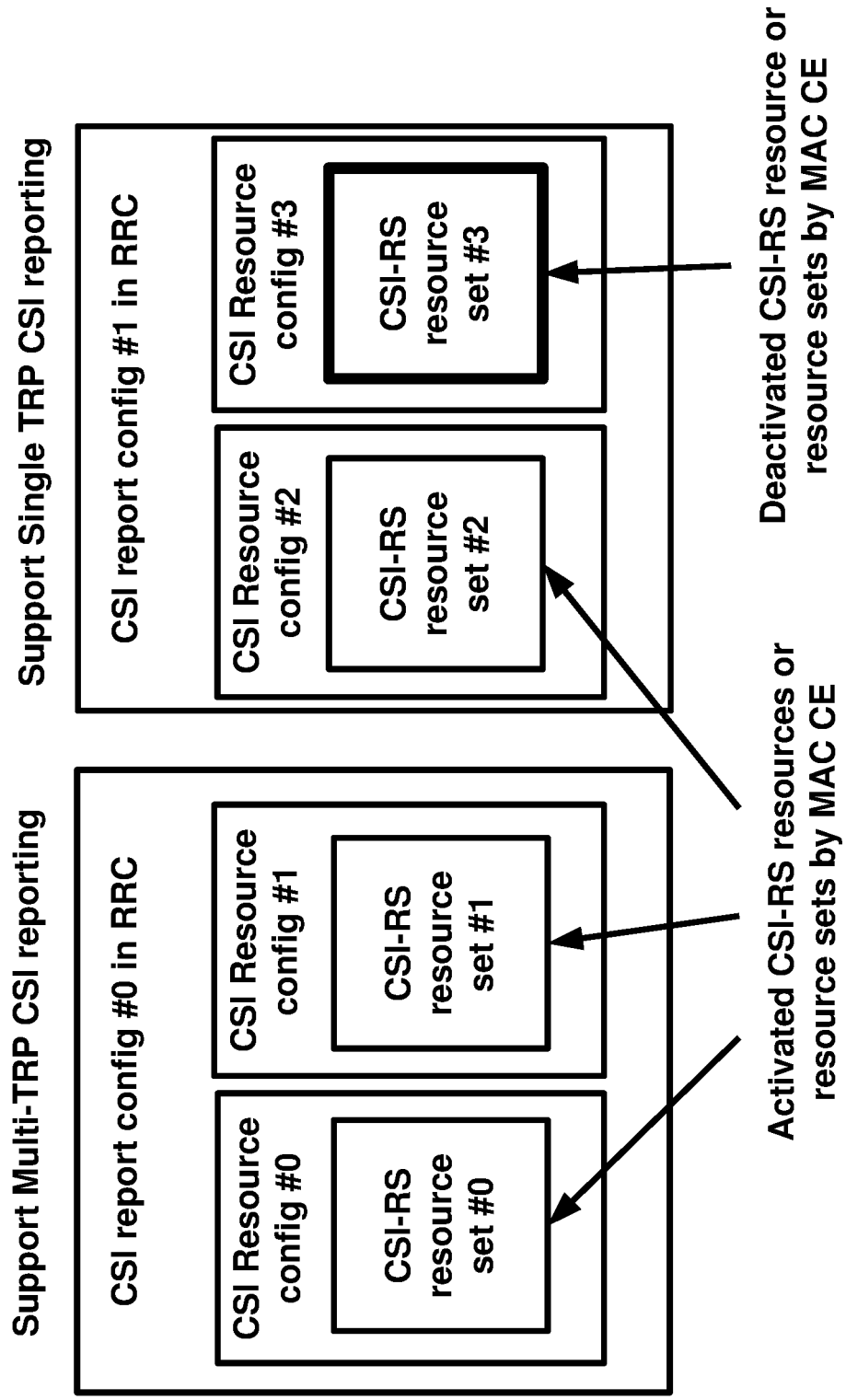
FIG. 37 is a diagram showing operation of CSI-RS activation as per an aspect of an example embodiment of the present disclosure.

In an example, the CSI report type indication may be based on the number of activated CSI-RS resource sets for channel measurement in the CSI report config. FIG. 37 is an example diagram illustrating application of CSI report type based on the number of activated CSI-RS resource sets in a CSI resource config for channel measurement in the CSI report config in accordance with embodiments of the present disclosure. For example, a wireless device may receive CSI resource configurations (e.g., CSI Resource config #0, #1, #2 and/or #3) comprising one or more CSI-RS resource sets (e.g., CSI-RS resource set #0, #1, #2 and/or #3) for channel measurement in a CSI report configuration (e.g., CSI report config #0 or #1). Based on the configuration, the wireless device may receive a MAC CE signaling indicating activation/deactivation states of the one or more CSI-RS resource sets (e.g., CSI-RS resource set #0, #1, #2 and/or #3). Based on the activation/deactivation states, the wireless device may determine a number of activated CSI-RS resource sets (e.g., CSI-RS resource set #0, #1 and #2) or CSI-RS resource configs for channel measurement (CSI Resource config #0, #1, and #2) in the CSI report configuration (e.g., CSI report config #0 or #1). Based on the number of activated CSI-RS resource sets (e.g., CSI-RS resource set #0, #1 and #2) or resource configs (e.g., CSI-RS Resource config #0, #1 and #2), the wireless device may determine numbers of RIs, PMIs and CQIs for the CSI report configuration (e.g., CSI report config #0 or #1). For example, when the number of the activated CSI-RS resource sets (e.g., CSI-RS resource set #0 and #1) or CSI Resource config (e.g., CSI Resource config #0 and #1) in a CSI report config is multiple (e.g., CSI report config #0), the number of RIs, PMIs and CQIs may be multiple to support multi-TRP/panel CSI reporting. When the number of the activated CSI-RS resource set (e.g., CSI-RS resource set #2) or CSI resource config for channel measurement (e.g., CSI Resource config #2) is one in the CSI report config (e.g., CSI report config #1), the number of RIs, PMIs and CQIs may be one, respectively. Based on the determined numbers of RIs, PMIs and CQIs, the wireless device may process a CSI report and transmit the CSI report.

In an example, aperiodic CSI-RS transmission based on the aperiodic CSI trigger may be different based on the CSI report type indication in DCI. When a plurality of CSI-RS resource configs for channel measurements are semi-statically configured in a CSI report config to support multi-TRP/panel CSI reporting, CSI-RS resources may be transmitted regardless of dynamic CSI type indication. In this case, resources for the CSI-RS transmission may not change dynamically and may not be needed when the base station indicates and triggers single-TRP/panel CSI reporting. In order to efficiently support CSI-RS resources, aperiodic CSI-RS transmissions may be based on the CSI report type indication. FIG. 38A and FIG. 38B are example diagrams illustrating application of the dynamic CSI report type indication for aperiodic CSI-RS transmission in accordance with embodiments of the present disclosure. As shown in FIG. 38A, when single TRP/panel CSI is indicated (e.g., Indication of Single TRP/panel CSI), only CSI-RS resource set for single TRP CSI (e.g., CSI-RS resource set in CSI Resource Config #0) may be transmitted. Transmission offset for the CSI-RS resource set (e.g., CSI-RS resource set in CSI Resource Config #0) may be configured in the CSI-RS resource set config. As shown in FIG. 38B, when multi-TRP/panel CSI is indicated (e.g., Indication of Multi-TRP/panel CSI), both CSI-RS resource sets (e.g., CSI-RS resource set #0 and #1 in CSI Resource Config #0 and #1) for multi-TRP CSI reporting may be transmitted.

It should be noted that a CSI resource config in the embodiments of the present disclosure may also be referred to as a CSI-RS resources or a CSI-RS resource sets.

In an example, a wireless device may receive a channel state information (CSI) report configuration comprising a plurality of CSI resource configurations for channel measurement. The wireless device may receive a downlink control information comprising: a first field triggering the CSI report configuration and a second field indicating which one or more of the plurality of CSI resource configurations is selected for channel measurement. The wireless device may transmit a CSI report based on the one or more CSI resource configurations selected for channel measurement. The CSI report configuration may be higher layer configured. The CSI report may be reported via a physical uplink shared channel. The CSI report may comprise one rank indicator, one precoding matrix indicator and one channel quality indicator when the second field indicates one of the plurality of CSI resource configurations is selected for channel measurement. The CSI report may comprise multiple rank indicators, multiple precoding matrix indicators and multiple channel quality indicators when the second field indicates all of the plurality of CSI resource configurations are selected for channel measurement. The presence of the second field may be higher layer configured. The number of the plurality of CSI resource configurations for channel measurement may be two.

In an example, a wireless device may receive a plurality of CSI resource configurations for channel measurement for a channel state information (CSI) report configuration. The wireless device may receive a downlink control information comprising a first field triggering the CSI report configuration and a second field indicating which of one or more of the plurality of CSI resource configurations is selected for channel measurement. The wireless device may transmit a CSI report based on the one or more CSI resource configurations selected for channel measurement. The CSI report configuration may be higher layer configured. The CSI report may be reported via a physical uplink shared channel. The CSI report configuration may comprise a plurality of CSI resource configurations for channel measurement. One of the plurality of CSI resource configurations may be selected for channel measurement when the second field indicates the CSI report configuration comprises one rank indicator, one precoding matrix indicator and one channel quality indicator. Multiple of the plurality of CSI resource configurations may be selected for channel measurement when the second field indicates the CSI report configuration comprises multiple rank indicator, multiple precoding matrix indicator and multiple channel quality indicator. The presence of the second field may be higher layer configured.

In an example, a wireless device may receive a report quantity parameter indicating that a channel state information (CSI) report configuration comprises at least one rank indicator, at least one precoding matrix indicator and at least one channel quality indicator. The wireless device may receive a downlink control information comprising a first field triggering the CSI report configuration and a second field indicating whether the CSI report configuration comprises one rank indicator, one precoding matrix indicator and one channel quality indicator or multiple rank indicators and multiple precoding matrix indicators. The wireless device may transmit a CSI report based on the one or more rank indicators, one or more precoding matrix indicators and one or more channel quality indicators. The CSI report configuration may be higher layer configured. The CSI report may be reported via a physical uplink control channel. The CSI report may comprise one rank indicator, one precoding matrix indicator and one channel quality indicator when the second field indicates one of the plurality of CSI resource configurations is selected for channel measurement. The CSI report may comprise multiple rank indicators, multiple precoding matrix indicators and multiple channel quality indicators when the second field indicates all of the plurality of CSI resource configurations are selected for channel measurement. The presence of the second field may be higher layer configured. The number of the plurality of CSI resource configurations for channel measurement may be two.

In an example, a wireless device may receive a report quantity parameter indicating that a channel state information (CSI) report configuration comprises at least one rank indicator, at least one precoding matrix indicator and at least one channel quality indicator. The wireless device may receive a medium access control control element (MAC CE) comprising a first field activating the CSI report configuration and a second field indicating whether the CSI report configuration comprises one rank indicator, one precoding matrix indicator and one channel quality indicator or multiple rank indicators, multiple precoding matrix indicators and multiple channel quality indicators. The wireless device may transmit a CSI report based on the one or more rank indicators, one or more precoding matrix indicators and one or more channel quality indicators. The CSI report configuration may be higher layer configured. The CSI report may be reported via a physical uplink control channel. The CSI report configuration may comprise a plurality of CSI resource configurations for channel measurement. One of the plurality of CSI resource configurations may be selected for channel measurement when the second field indicates the CSI report configuration comprises one rank indicator, one precoding matrix indicator and one channel quality indicator. Multiple of the plurality of CSI resource configurations may be selected for channel measurement when the second field indicates the CSI report configuration comprises multiple rank indicator, multiple precoding matrix indicator and multiple channel quality indicator. The presence of the second field may be higher layer configured.

In an example, a wireless device may receive a channel state information (CSI) report configuration comprising CSI resource configurations comprising one or more of CSI reference signal resource sets for channel measurement. The wireless device may receive a medium access control control element indicating activation/deactivation states of the one or more CSI reference signal resource sets. The wireless device may determine, based on the medium access control control element, a number of activated CSI reference signal resource sets in the CSI report configuration. The wireless device may determine numbers of rank indicators, precoding matrix indicators and channel quality indicators based on the number of activated CSI reference signal resource sets. The wireless device may transmit a CSI report based on the one or more rank indicators, one or more precoding matrix indicators and one or more channel quality indicators. The CSI report configuration may be higher layer configured. The CSI report may be reported via a physical uplink shared channel. The CSI report may be reported via a physical uplink shared channel. Only one of the CSI reference signal resource set per CSI resource configuration may be activated. The presence of the second field may be higher layer configured.

Figure 39:
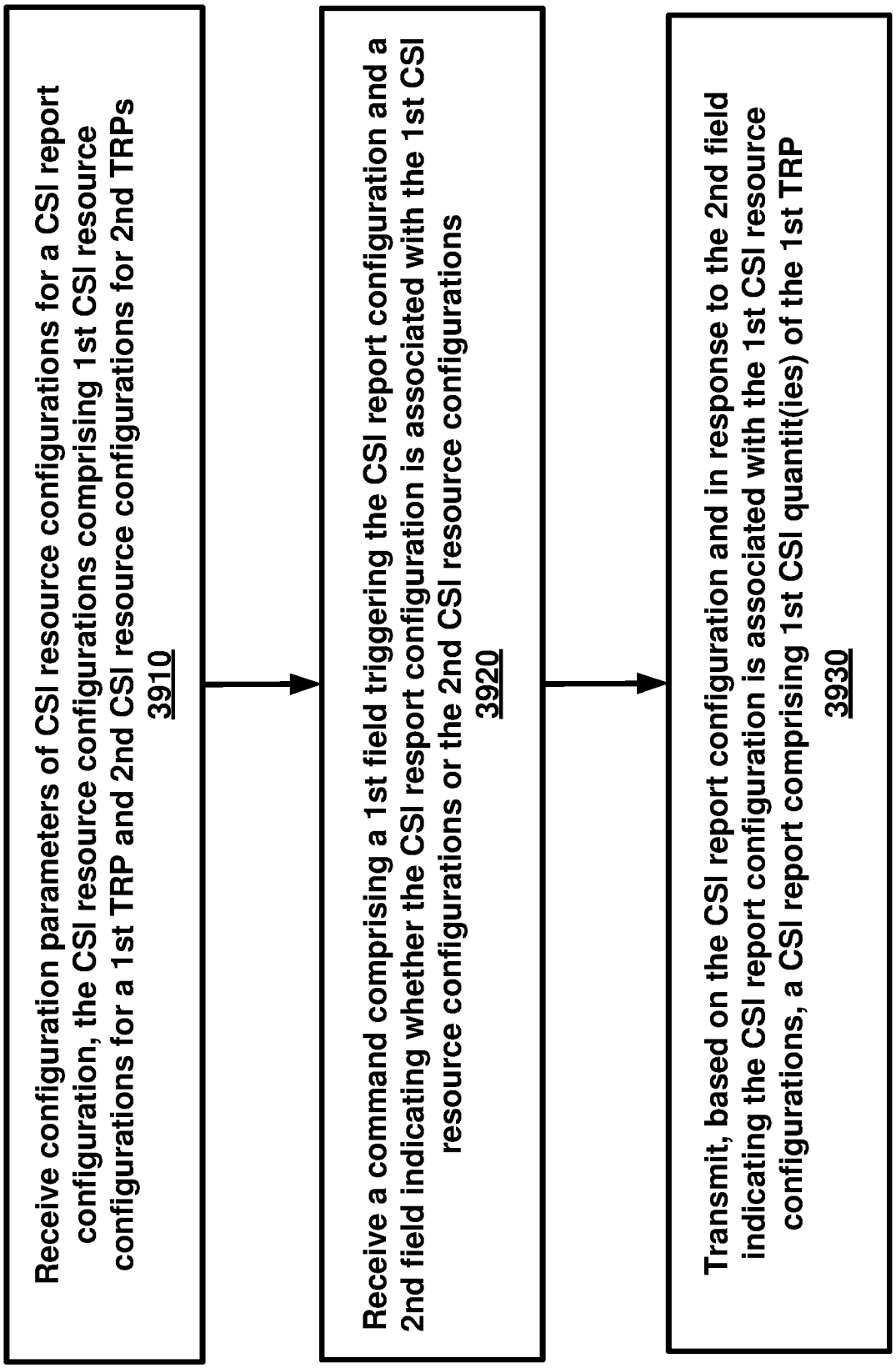
FIG. 39 illustrates a procedure as per an aspect of an example embodiment of the present disclosure.

FIG. 39 shows an example flowchart of CSI report as per an aspect of an example embodiment of the present disclosure. At 3910, a wireless device receives configuration parameters of channel state information (CSI) resource configurations for a CSI report configuration. The CSI resource configurations comprise first CSI resource configurations associated with a first transmission reception point (TRP) and second CSI resource configurations associated with at least two second TRPs. At 3920, the wireless device receives a command comprising a first field triggering the CSI report configuration and a second field indicating whether the CSI report configuration is associated with the first CSI resource configurations or the second CSI resource configurations. At 3930, the wireless device transmits, based on the CSI report configuration and in response to the second field indicating the CSI report configuration is associated with the first CSI resource configurations, a CSI report comprising one or more first CSI quantities of the first TRP.

According to an example embodiment, the wireless device may receive one or more radio resource control messages comprising configuration parameters indicating whether the second field is present in the command. The command may be a downlink control information via a physical downlink control channel.

According to an example embodiment, a CSI resource configuration, of the CSI resource configurations, may be associated with configuration parameters comprising a CSI resource configuration index identifying the CSI resource configuration. According to an example embodiment, a CSI resource configuration, of the CSI resource configurations, may be associated with configuration parameters comprising one or more CSI reference signals (RSs). According to an example embodiment, a CSI resource configuration, of the CSI resource configurations, may be associated with configuration parameters comprising a bandwidth part index. According to an example embodiment, a CSI resource configuration, of the CSI resource configurations, may be associated with configuration parameters comprising a resource type indicator.

According to an example embodiment, the CSI report configuration may be associated with configuration parameters comprising a CSI report configuration index identifying the CSI report configuration. According to an example embodiment, the CSI report configuration may be associated with configuration parameters comprising a carrier indicator. According to an example embodiment, the CSI report configuration may be associated with configuration parameters comprising a CSI report configuration type indicator. According to an example embodiment, the CSI report configuration may be associated with configuration parameters comprising one or more report quantity indicators. According to an example embodiment, the CSI report configuration may be associated with configuration parameters comprising a report frequency parameter. According to an example embodiment, the CSI report configuration may be associated with configuration parameters comprising one or more time domain configuration parameters.

According to an example embodiment, the one or more first CSI quantities may comprise a rank indicator for the first TRP. According to an example embodiment, the one or more first CSI quantities may comprise a precoding matrix indicator for the first TRP. According to an example embodiment, the one or more first CSI quantities may comprise a channel quality indicator for the first TRP.

According to an example embodiment, the wireless device may receive one or more configuration parameters of a plurality of control resource sets (CORESETs) grouped into CORESET groups. A CORESET group of the CORESET groups corresponds to a respective TRP of the at least two second TRPs. Each of the plurality of CORESETs is identified by a CORESET index. Each of the plurality of COESETs belongs to a CORESET group of the CORESET groups.

According to an example embodiment, the one or more second CSI quantities may comprise one or more rank indicators for the at least two second TRPs. According to an example embodiment, the one or more second CSI quantities may comprise one or more precoding matrix indicators for the at least two second TRPs. According to an example embodiment, the one or more second CSI quantities may comprise one or more channel quality indicators for the at least two second TRPs.

According to an example embodiment, the wireless device may transmit, based on the CSI report configuration and in response to the second field indicating the CSI report configuration is associated with the second CSI resource configurations, a CSI report comprising one or more second CSI quantities of the at least two second TRPs. The wireless device may measure the one or more second CSI quantities based on second CSI resources of the second CSI resource configurations. The second CSI resources may comprise a plurality of CSI resource subsets, each of the plurality of CSI resource subsets being associated with a respective TRP of the at least two second TRPs.

In an example, in order to achieve higher capacity and/or reliability, a wireless device may comprise (or be equipped with) multiple panels.

Figure 40:
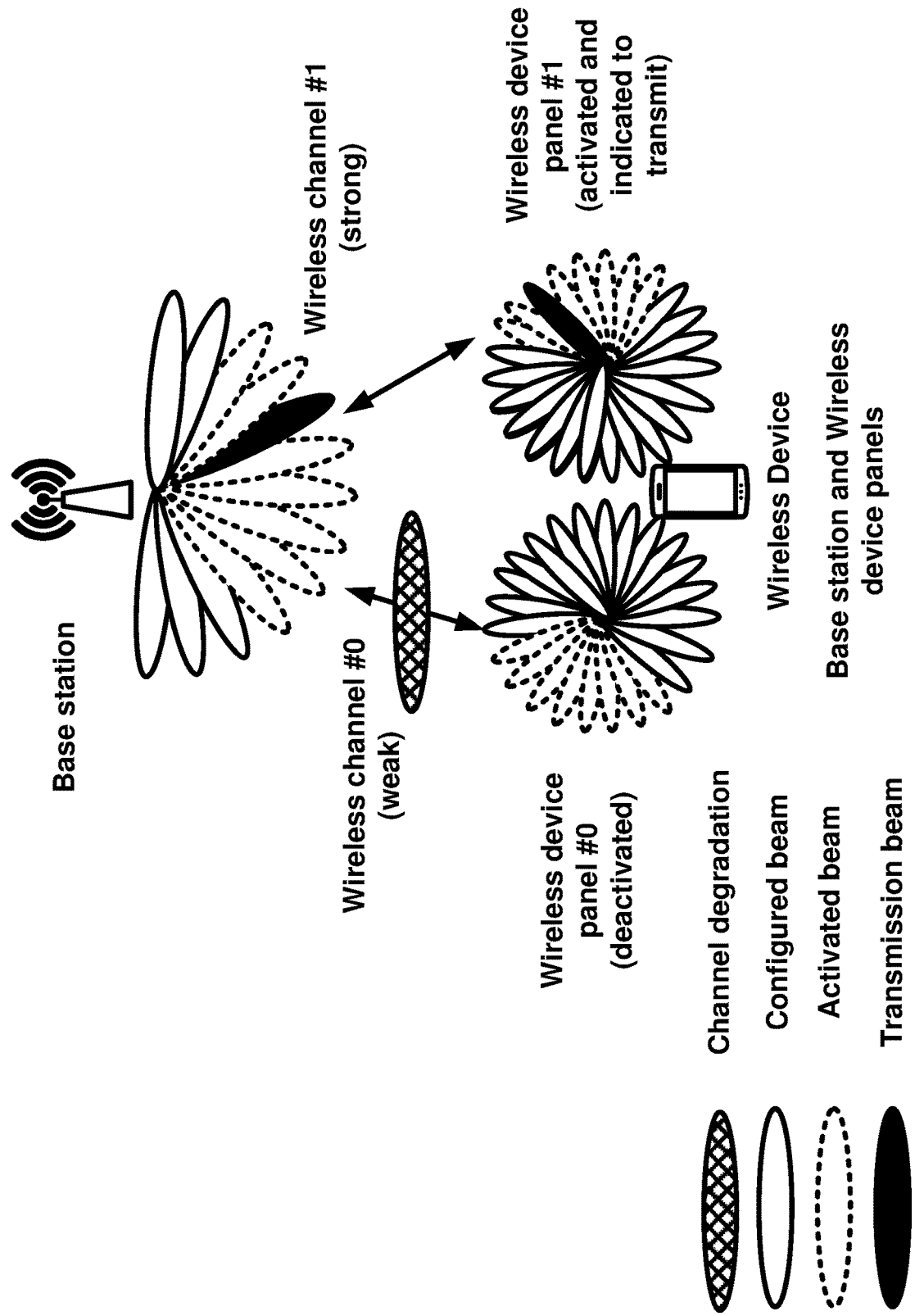
FIG. 40 is a diagram showing operations of multiple panels as per an aspect of an example embodiment of the present disclosure.

FIG. 40 is an example diagram illustrating detailed operations of a wireless device with multiple panels in accordance with embodiments of the present disclosure. In an example, when a wireless device is equipped with multiple panels (e.g., panel #0 and panel #1), wireless channel(s) between each panel of the multiple panels and a base station (e.g., wireless channel #0 or #1) may be different. For example, a channel quality of a first wireless channel (e.g., wireless channel #0) of the wireless channels may be weaker (e.g., channel degradation, lower RSRP, lower SINR, higher BLER, etc.) than a channel quality of a second wireless channel (e.g., wireless channel #1), of the wireless channels, that is different from the first wireless channel. In an example, the first wireless channel may be between a first antenna panel (e.g., panel #0) of the multiple panels and the base station. The second wireless channel may be between a second antenna panel (e.g., panel #1) of the multiple panels and the base station. The channel quality of the first wireless channel may be weak (or with f a low channel quality (e.g., degradation))based on at least one of: interferences, reflection, diffraction, blockage and so on. For example, there may be a strong interferer near the first panel (e.g., panel #0) resulting in a low signal-to-interference ratio (SINR) degrading the system capacity. The strong interferer may not have a strong effect (e.g., may not incur high interference) to the second panel (e.g., panel #1) due to different beams (used for the first and the second panels), panel direction (different directions the first and the second panels are facing) and the like. Based on the low SINR at the first panel, the base station and/or the wireless device may transmit/receive via the second panel with less interference (e.g., panel #1) for data communication. Based on the low SINR at the first panel, the base station and/or the wireless device may deactivate the first panel (e.g., panel #0) with strong interference. In an example, diffractions and/or reflections may degrade the quality of channel. When a signal from the base station and/or the wireless device is reflected or diffracted due to an object/obstacle (e.g., building, car and so on), a strength of the signal (e.g., RSRP, signal power, etc.) may reduce. In order to reduce low quality channel due to such diffractions and reflections, the base station and/or the wireless device may use the second panel with less reflections and diffractions (e.g., panel #1) for its data communication. For example, when a wireless device utilizes analog beamforming in high frequency range (e.g., 28 GHz or 60 GHz), a beam width of an analog beam may be narrow (e.g., 2 or 3 degrees). A narrow beam may be easily blocked by a moving object (e.g., human, car and so on). Since the blockage reduces the signal strength especially for high frequency range (e.g., 28 GHz or 60 GHz), the base station and the wireless device may use the second panel without the blockage (e.g., panel #1). When the objects (e.g., human, car and so on) near a panel (e.g., panel #0 or #1) move, the quality of the wireless channel for the panel may change dynamically. Based on the dynamic change of the quality of the wireless channel, the base station and/or the wireless may activate/deactivate/indicate panels for wireless communication. Support of dynamic activation/deactivation/indication of panels may be based on a SRS resource set and/or an uplink transmission configuration indication (UL TCI).

For example, an SRS resource set configuration may be for a configuration of a panel. The SRS resource set configuration may indicate the panel. The base station may configure multiple SRS resource sets to support multiple panels. Each SRS resource set of the multiple SRS resource sets may correspond to (or associated with) a respective panel of the multiple panels. Based on the configuration of the multiple SRS resource sets, the base station may activate/deactivate at least one SRS resource set of the multiple SRS resource sets via a MAC CE signaling.

Figure 41:
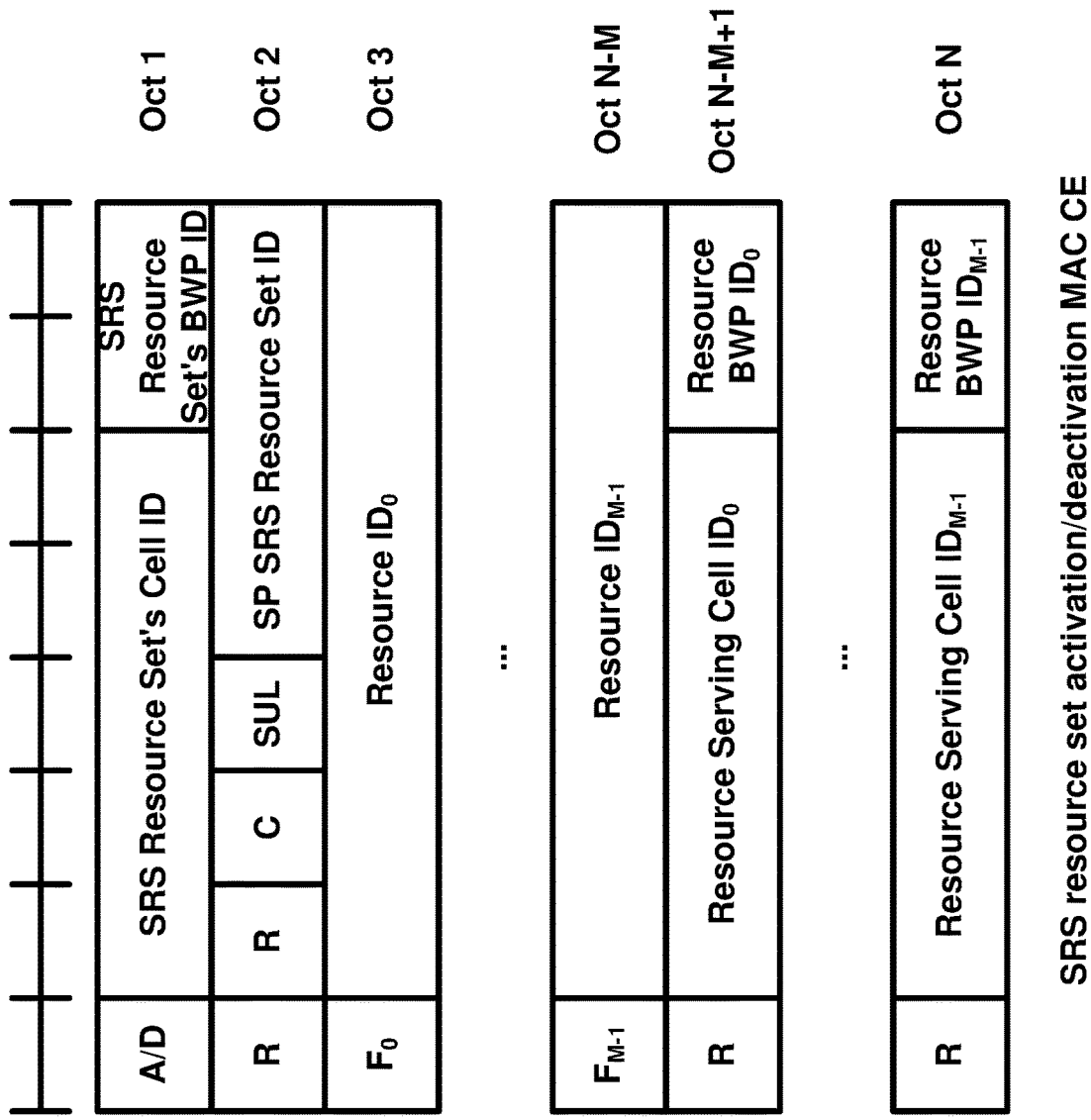
FIG. 41 is a diagram showing applications of MAC for semi-persistent SRS resource sets as per an aspect of an example embodiment of the present disclosure.

FIG. 41 is an example diagram illustrating SRS resource set activation/deactivation MAC CE in accordance with embodiments of the present disclosure. The MAC CE signaling may be identified by a MAC subheader with LCID. The MAC CE signaling may have a variable size with A/D, SRS Resource Set's Cell ID, SRS Resource Set's BWP ID, C, SUL, Fi, Resource ID, Resource Serving cell IDi, Resource BWP IDi and R. A/D may indicate whether to activate or deactivate indicated SP SRS resource set. In an example, the field may be set to 1 to indicate activation, otherwise it may indicate deactivation. SRS Resource Set's Cell ID may indicate the identity of the Serving Cell, which contains activated/deactivated SP SRS Resource Set. If the C field is set to 0, this field may also indicate the identity of the Serving Cell which contains all resources indicated by the Resource IDi fields. The length of the SRS Resource Set's Cell ID field may be 5 bits. SRS Resource Set's BWP ID may indicate a UL BWP as the codepoint of the DCI bandwidth part indicator field comprising activated/deactivated SP SRS Resource Set. If the C field is set to 0, this field may indicate the identity of the BWP comprising all resources indicated by the Resource IDi fields. The length of the SRS Resource set's BWP ID field may be 2 bits. C may indicate whether the octets containing Resource Serving Cell ID field(s) and Resource BWP ID field(s) are present. If this field is set to 1, the octets containing Resource Serving Cell ID field(s) and Resource BWP ID field(s) may be present, otherwise they may not be present. SUL may indicate whether the MAC CE applies to the NUL carrier or SUL carrier configuration. This field may be set to 1 to indicate that it applies to the SUL carrier configuration, and it may be set to 0 to indicate that it applies to the NUL carrier configuration. SP SRS Resource Set ID may indicate the SP SRS Resource Set ID identified by SRS-ResourceSetId, which may be to be activated or deactivated. The length of the field may be 4 bits. Fi may indicate the type of a resource used as a spatial relationship for SRS resource within SP SRS Resource Set indicated with SP SRS Resource Set ID field. F0 may refer to the first SRS resource within the resource set, F1 to the second one and so on. The field may be set to 1 to indicate NZP CSI-RS resource index is used, and it may be set to 0 to indicate either SSB index or SRS resource index is used. The length of the field may be 1 bit. This field may be only present if MAC CE is used for activation, i.e. the A/D field is set to 1. Resource IDi may contain an identifier of the resource used for spatial relationship derivation for SRS resource i. Resource ID0 may refer to the first SRS resource within the resource set, Resource ID1 to the second one and so on. If Fi is set to 0, and the first bit of this field may be set to 1, the remainder of this field may contain SSB-Index. If Fi is set to 0, and the first bit of this field is set to 0, the remainder of this field may contain SRS-ResourceId. The length of the field may be 7 bits. This field may be only present if MAC CE is used for activation, i.e. the A/D field may be set to 1. Resource Serving Cell IDi may indicate the identity of the Serving Cell on which the resource used for spatial relationship derivation for SRS resource i is located. The length of the field may be 5 bits, Resource BWP IDi may indicate a UL BWP as the codepoint of the DCI bandwidth part indicator field, on which the resource used for spatial relationship derivation for SRS resource i may be located. The length of the field may be 2 bits. R may be a Reserved bit, set to 0. Based on the activated SRS resource sets, the base station may indicate one of SRS resource sets for a transmission (e.g., SRS resource set indicator) to the wireless device. An SRS resource in the SRS resource set may be indicated to indicate UL transmission beam of the indicate panel via SRS resource set indicator. Based on the indicated SRS resource set and SRS resource, the wireless device may determine the panel and the beam for the UL transmission.

For example, multiple UL TCI states may be configured, e.g., by a base station, via RRC signaling to support activation/deactivation/indication of one or more panels at a wireless device. Each UL TCI state of the multiple UL TCI states may comprise a respective identity to indicate a panel of/at the wireless device (e.g., SRS resource set ID). Based on the configuration, the base station may activate/deactivate one or more UL TCI states of the multiple UL TCI states. The base station may activate, e.g., via MAC CE, UL TCI states of the multiple UL TCI states. The base station may indicate an UL TCI state of the activated UL TCI states for a transmission to the wireless device. The indication of the UL TCI state may be based on RRC, MAC CE and/or DCI signaling.

Figure 42:
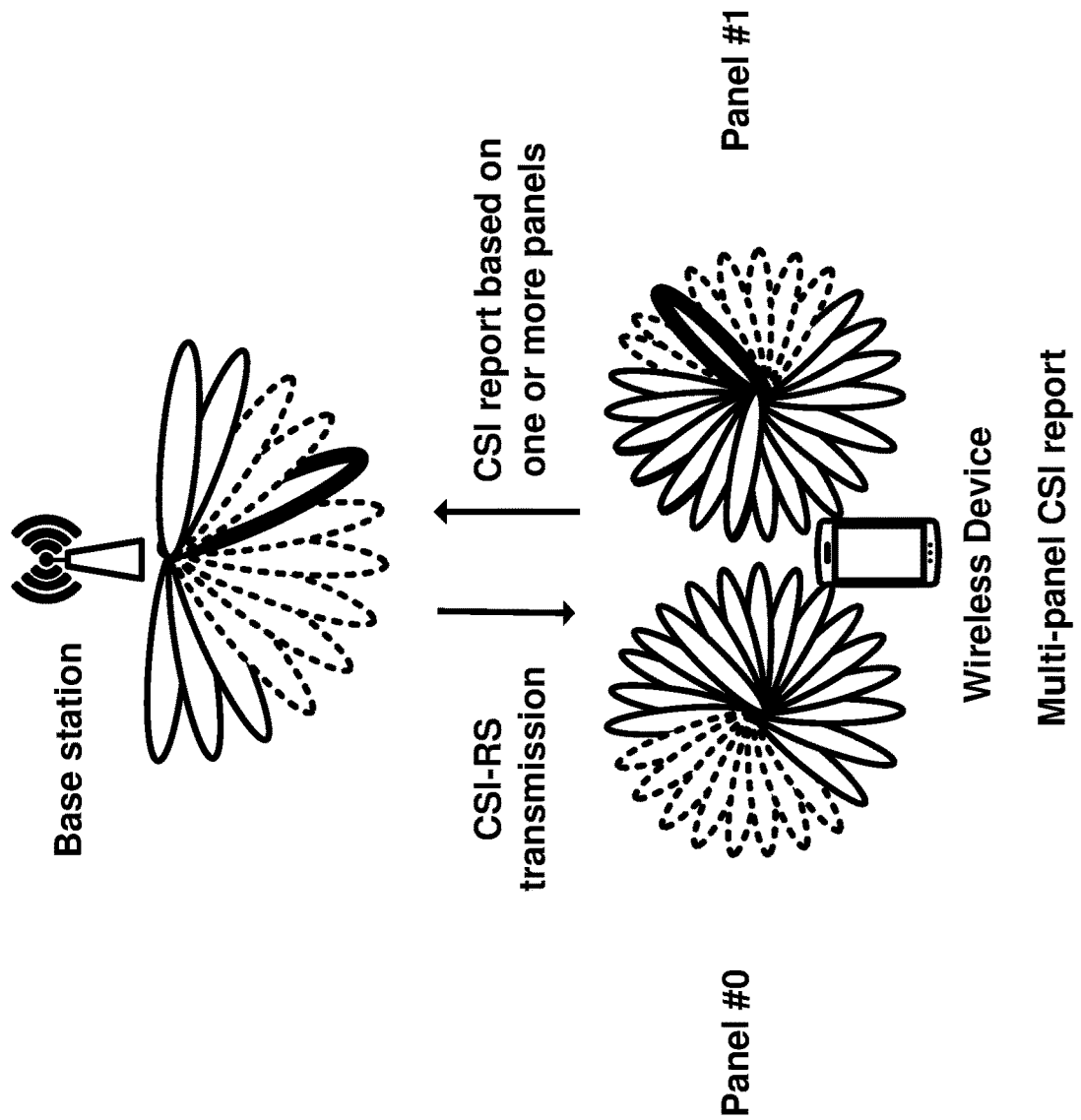
FIG. 42 is a diagram showing operations of CSI measurement and reporting as per an aspect of an example embodiment of the present disclosure.

FIG. 42 is an example diagram illustrating CSI-RS transmissions and CSI reporting with multiple panels of a wireless device with embodiments of the present disclosure.

In existing technologies, a base station transmits one or more RRC messages comprising configuration parameters for configuring CSI reporting based on one or more panels (e.g., panel #0 and/or #1) at a wireless device to achieve higher data rate. The base station may select at least one panel, among the one or more panels, with better channel conditions (e.g., higher SINR, RSRP and/or RSRQ) based on the CSI reporting. Based on the different channel environments, selections of respective spatial Rx parameters, CSI-RS resource indicator (CRI), precoding matrix, modulation and coding rate by the wireless device in a CSI report for each panel may be different. A CSI reporting based on one or more panels (e.g., panel #0 and/or #1) at the wireless may be supported. In order to support the CSI reporting (e.g., CSI report based on one or more panels) based on the measurement via the one or more panels (e.g., panel #0 and/or panel #1), the base station may configure one or more CSI-RS and/or CSI-IM (e.g. CSI-RS transmission) with the measurement based on/via the one or more panels (e.g., panel #0 and/or panel #1) in a CSI report configuration (e.g., via RRC). The wireless device may measure the one or more CSI-RS and/or CSI-IM via the one or more panels (e.g., panel #0 and/or panel #1) to generate a CSI report (e.g., CSI report based on one or more panels) for the one or more panels (e.g., panel #0 and/or panel #1).

Considering dynamic changes of channel conditions (SINR, RSRP and/or RSRQ), a wireless device may dynamically activate (e.g., when the one or more panels are in better channel conditions) or deactivate (e.g., when the one or more panels are in worse channel conditions) the one or more panels (e.g., panel #0 and/or panel #1). When the one or more panels are deactivated, the CSI report may require uplink resource overhead for the CSI report and/or result in increased power consumption of the wireless device without a higher system capacity increase. There is a need to implement an enhanced procedure, e.g. when the channel conditions vary dynamically, to reduce the uplink resource overhead and/or the decrease power consumption of the wireless device.

Example embodiments implement an enhanced procedure for a CSI reporting in multiple panels of a wireless device. For example, a base may dynamically indicate, via physical layer (e.g. a DCI) or MAC layer (e.g. MAC CE) signal, a panel from a base station for CSI reporting. Implementation of example embodiments reduces RRC signaling overhead for changing panels used for measurement of CSI reference signals. Example embodiments enable base station signaling for dynamic panel selection for measurement of CSI. Example embodiment reduces uplink overhead and power consumption at the wireless device and/or base station.

Figure 43:
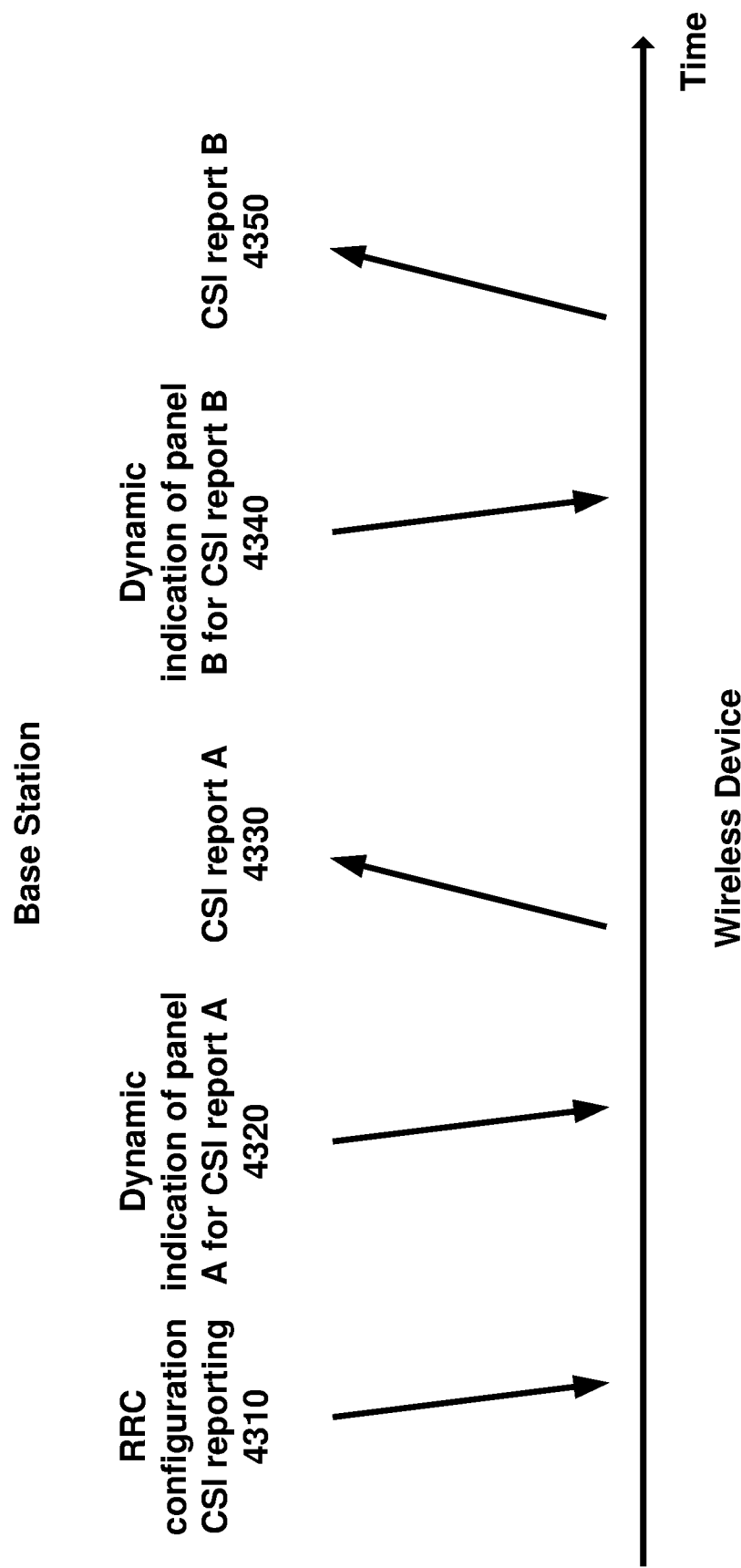
FIG. 43 is a diagram showing application of dynamic signaling as per an aspect of an example embodiment of the present disclosure.
Figure 50B:
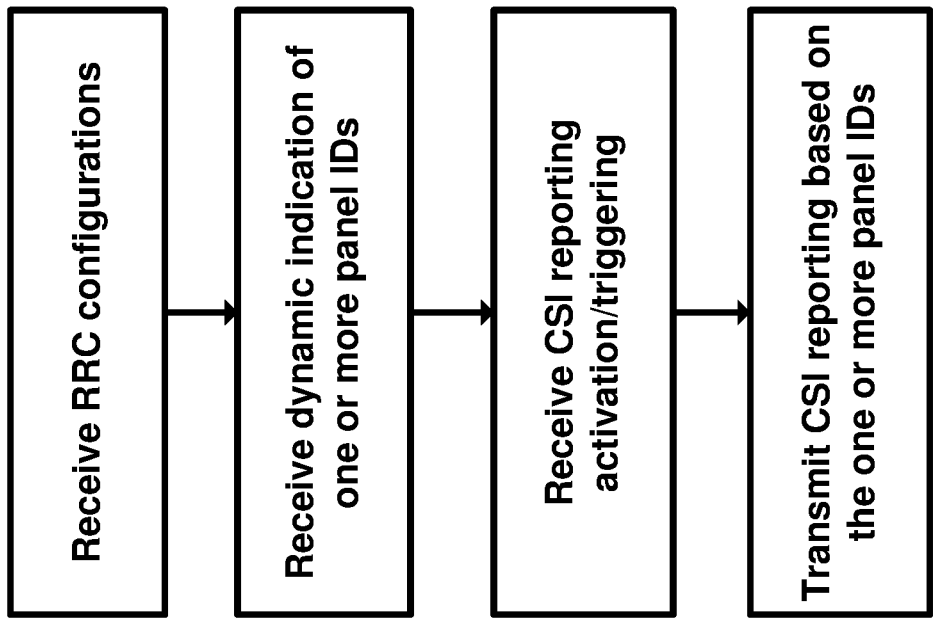
FIG. 50A and FIG. 50B are diagrams showing operation of a wireless device as per an aspect of an example embodiment of the present disclosure.
Figure 50A:
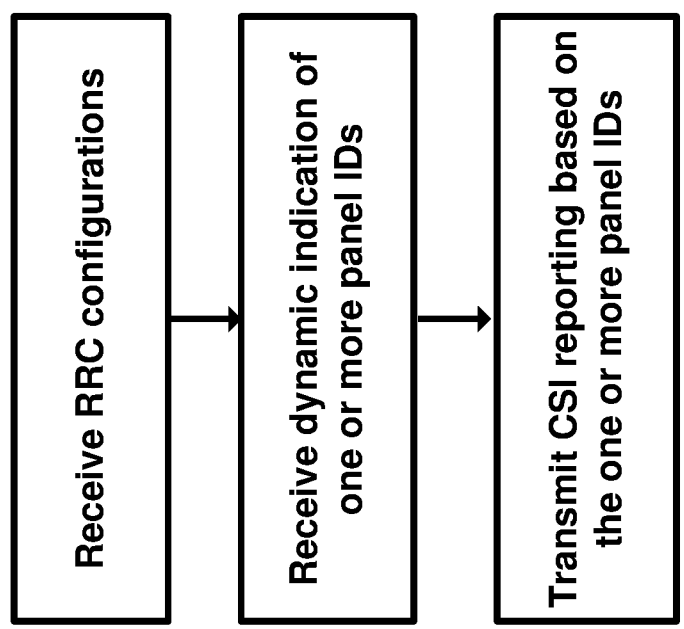
Figure 51B:
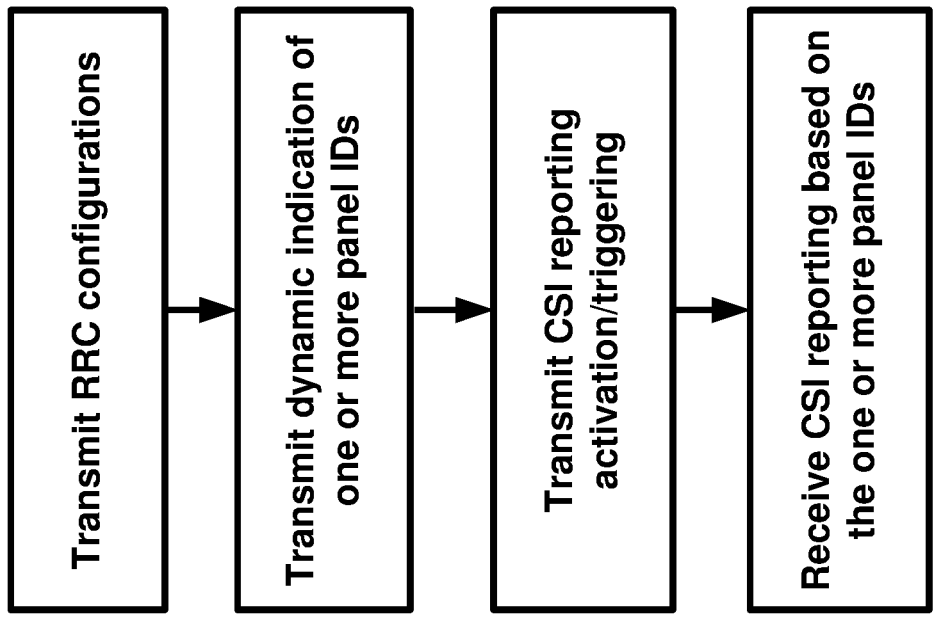
FIG. 51A and FIG. 51B are diagrams showing operation of a base station as per an aspect of an example embodiment of the present disclosure.
Figure 51A:
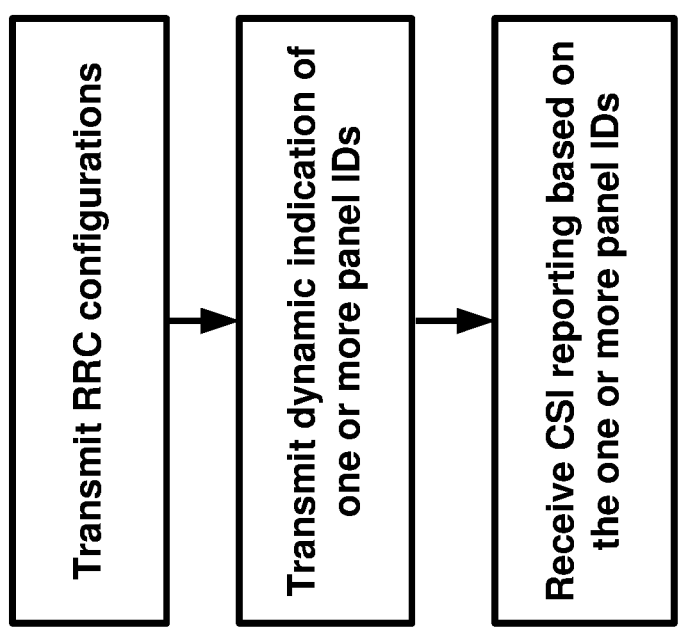

FIG. 43 is an example diagram illustrating dynamic indication of panel ID in accordance with embodiments of the present disclosure. FIG. 50A and FIG. 50B describe example flow charts for a wireless device. FIG. 51A and FIG. 51B describe example flow charts for a base station. In an example, a base station may transmit an RRC message comprising a configuration (e.g., 4310) for a CSI reporting. The configuration may comprise at least one of: at least one parameter indicating that dynamic indication of one or more panel IDs is configured/enabled, CSI reporting type, serving cell index, resource config for channel measurement, resource config for CSI-IM for interference, resource config for NZP-CSI-RS resources for interference, report config type, report quantity, report frequency config, report frequency config, time restriction of channel measurements, time restriction of interference measurements, codebook config, usage of group based beam reporting, CQI table config, subband size, and/or usage of non-PMI port indication. Based on the RRC configuration (e.g., 4310), dynamic indication of a panel ID (e.g., panel A) for a CSI report (e.g., 4320) may be transmitted to a wireless device. A signaling of the dynamic indication (e.g., 4320) may be DCI, MAC CE or DCI+MAC CE. The wireless device may transmit a CSI report (e.g., 4330) based on a CSI measurement via the indicated panel (e.g., panel A). Based on the RRC configuration (e.g., 4310), the base station may dynamically indicate a panel ID (e.g., panel B) for a CSI report (e.g., 4340). The wireless device may transmit a CSI report (e.g., 4350) based on a measurement via the indicated panel (e.g., panel B).

Figure 44:
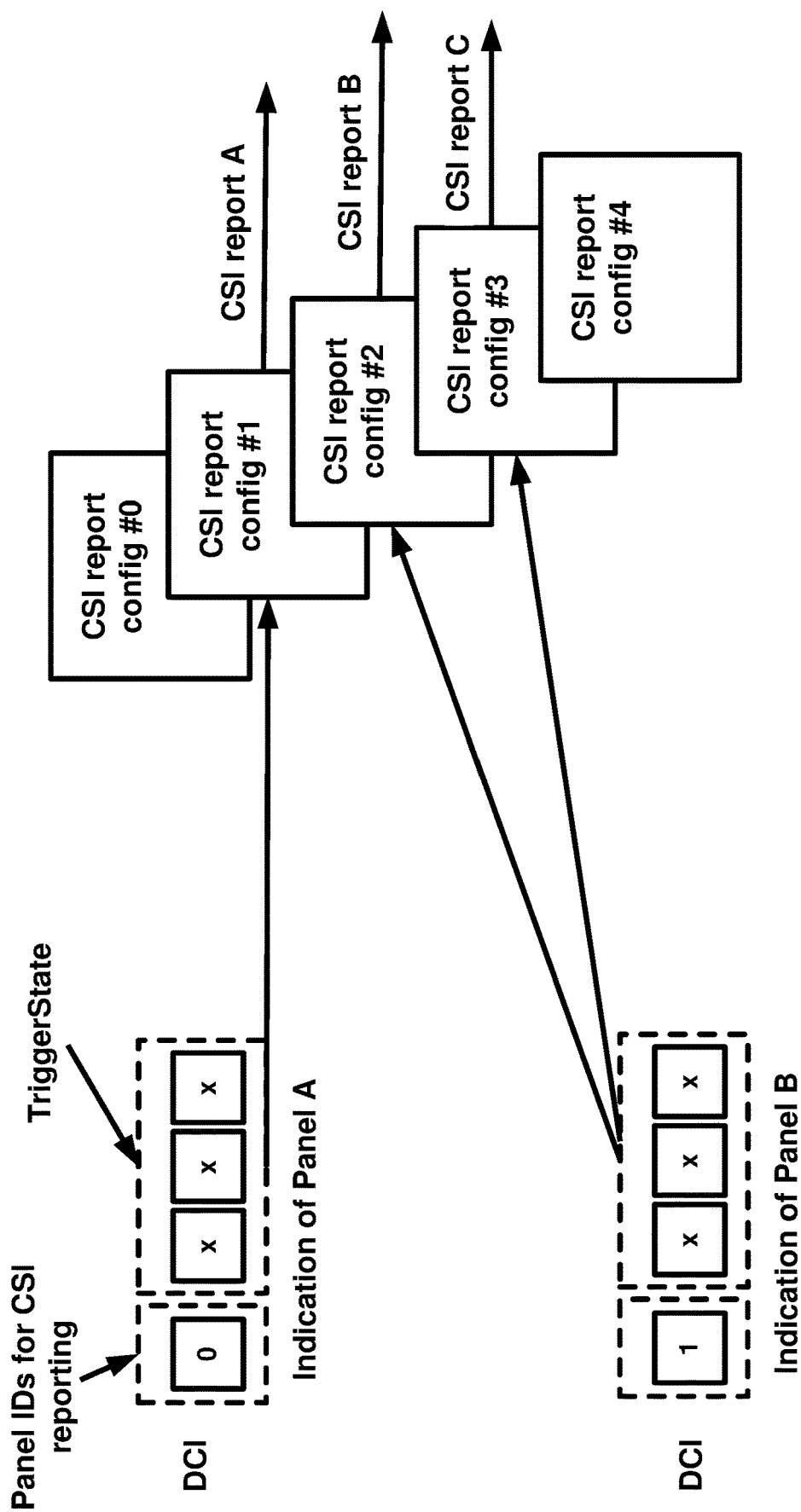
FIG. 44 is a diagram showing application of DCI signaling as per an aspect of an example embodiment of the present disclosure.

In an example, DCI based signaling by a base station may be supported to dynamically indicate one or more panel IDs (e.g., 4320 or 4340). FIG. 44 is an example diagram illustrating detailed operation of DCI based signaling in accordance with embodiments of the present disclosure. A DCI may comprise information bits (e.g., panel IDs for CSI reporting) to indicate one or more panel IDs for CSI reporting. The base station may transmit the information bits with CSI report trigger (e.g., TriggerState) for aperiodic CSI report or semi-persistent CSI report with PUSCH. For example, a wireless device may receive one or more CSI report configurations (e.g., CSI report config #0, #1, #2, #3 and #4). Based on the CSI report configurations (e.g., CSI report config #0, #1, #2, #3 and #4), the wireless device may receive a DCI comprising a first field (e.g., TriggerState) and a second field (e.g., panel IDs for CSI reporting). The first field may have a triggering state (e.g., TriggerState) indicating one or more CSI report configs (e.g., CSI report config #1 or #2/#3) for aperiodic CSI reporting or semi-persistent CSI reporting with PUSCH. The second field (e.g., panel IDs for CSI reporting) may indicate one or more panel IDs (e.g., indication of panel A or B) for a CSI reporting. For example, based on the panel ID (e.g., indication of panel A or panel B), the wireless device may measure one or more reference signals (e.g., CSI-RS resources) received via the panel (indicated by the panel ID) for the triggered CSI report configs (e.g., CSI report config #1 or #2/#3). In an example, the second field (e.g., panel IDs for CSI reporting) may indicate a set of panels among a plurality of sets configured in RRC. The configured sets may have one or more panels for CSI measurement. The set of one or more panels may be higher layer configured by the base station.

Figure 45:
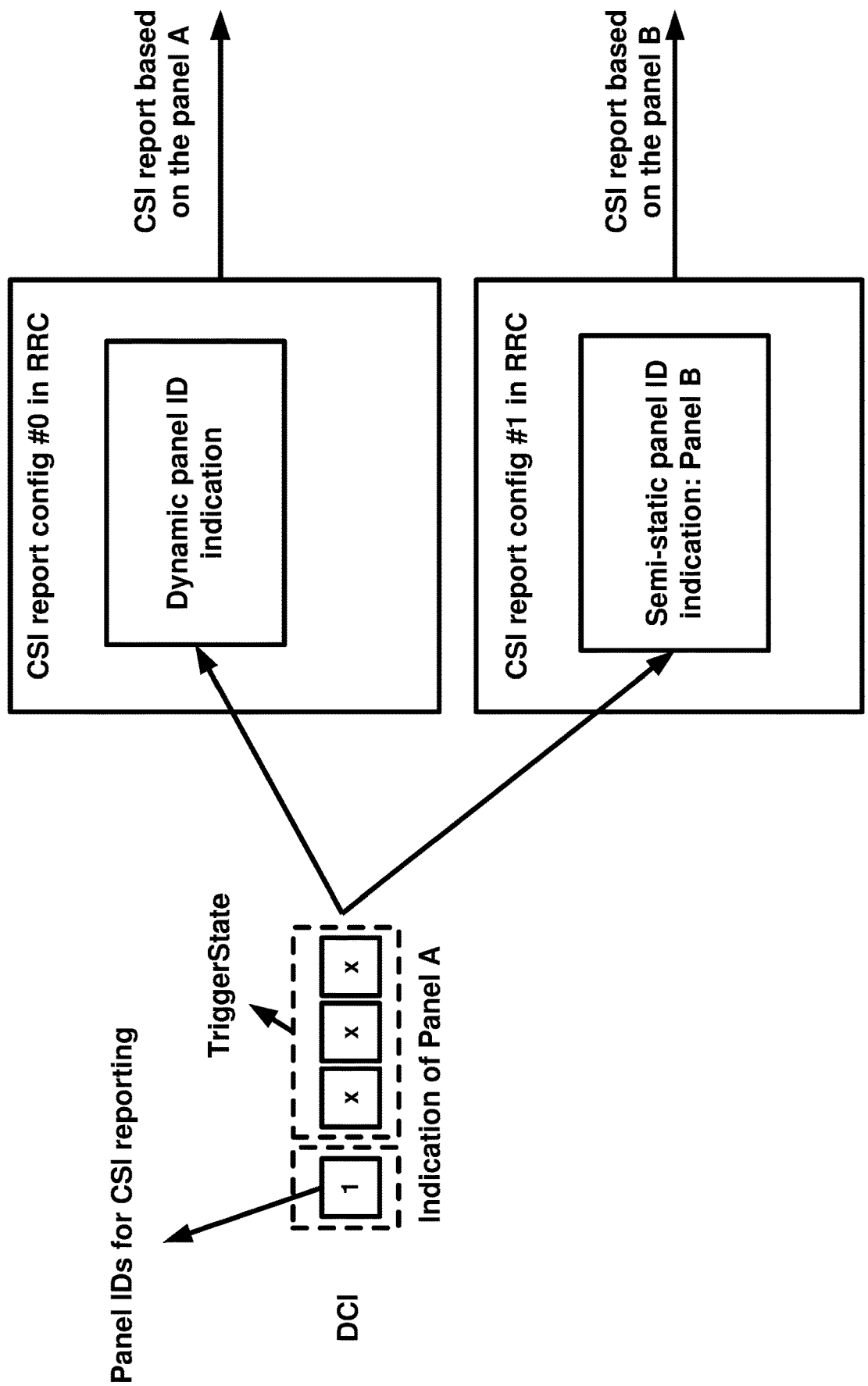
FIG. 45 is a diagram showing application of DCI signaling as per an aspect of an example embodiment of the present disclosure.

When the first field (e.g., TriggerState) triggers a plurality of CSI report configs and the second field (e.g., panel IDs for CSI reporting) indicates one or more panels for CSI reporting, some of the plurality of CSI report configs may not support a dynamic panel ID indications for a CSI reporting. FIG. 45 is an example diagram illustrating detailed operation of DCI based signaling for dynamic panel ID indications in accordance with embodiments of the present disclosure. For example, when a usage of dynamic panel ID indication (e.g., Dynamic panel ID indication) is configured in a CSI report config (e.g., CSI report config #0 in RRC), a dynamic indication of panel IDs for a CSI reporting may be supported and the second field (e.g., panel IDs for CSI reporting) may dynamically indicate the panel IDs for the CSI report config (e.g., panel IDs for CSI reporting). When one or more panels are semi-statistically configured in a CSI report config (e.g., CSI report config #1 in RRC), a CSI reporting with the semi-statistically configured panel IDs may be supported regardless of the second field (e.g., panel IDs for CSI reporting).

In an example, a MAC CE signaling may be used to indicate one or more panel IDs of a CSI report configuration. In this case, dedicated MAC CE signaling may be supported. For example, a MAC CE signaling with a dedicated LCID may comprise a cell ID, BWP ID, a CSI report config ID and/or panel IDs of the CSI report config.

For example, an indication of one or more panels IDs may be added to a CSI report config activation MAC CE. In this case, the wireless device may receive a CSI report configuration with configuration of dynamic panel ID indication. Based on the CSI report configuration, the wireless device may receive a MAC CE signaling with a first field and second field. The first field may activate the CSI report configuration. The second field may indicate whether one of the plurality of CSI resource configurations is selected for channel measurement or all of the plurality of CSI resource configurations are selected for channel measurement. The wireless device may process a CSI report based on the one or more CSI resource configurations selected for the channel measurements and transmit the CSI report.

Figure 46:
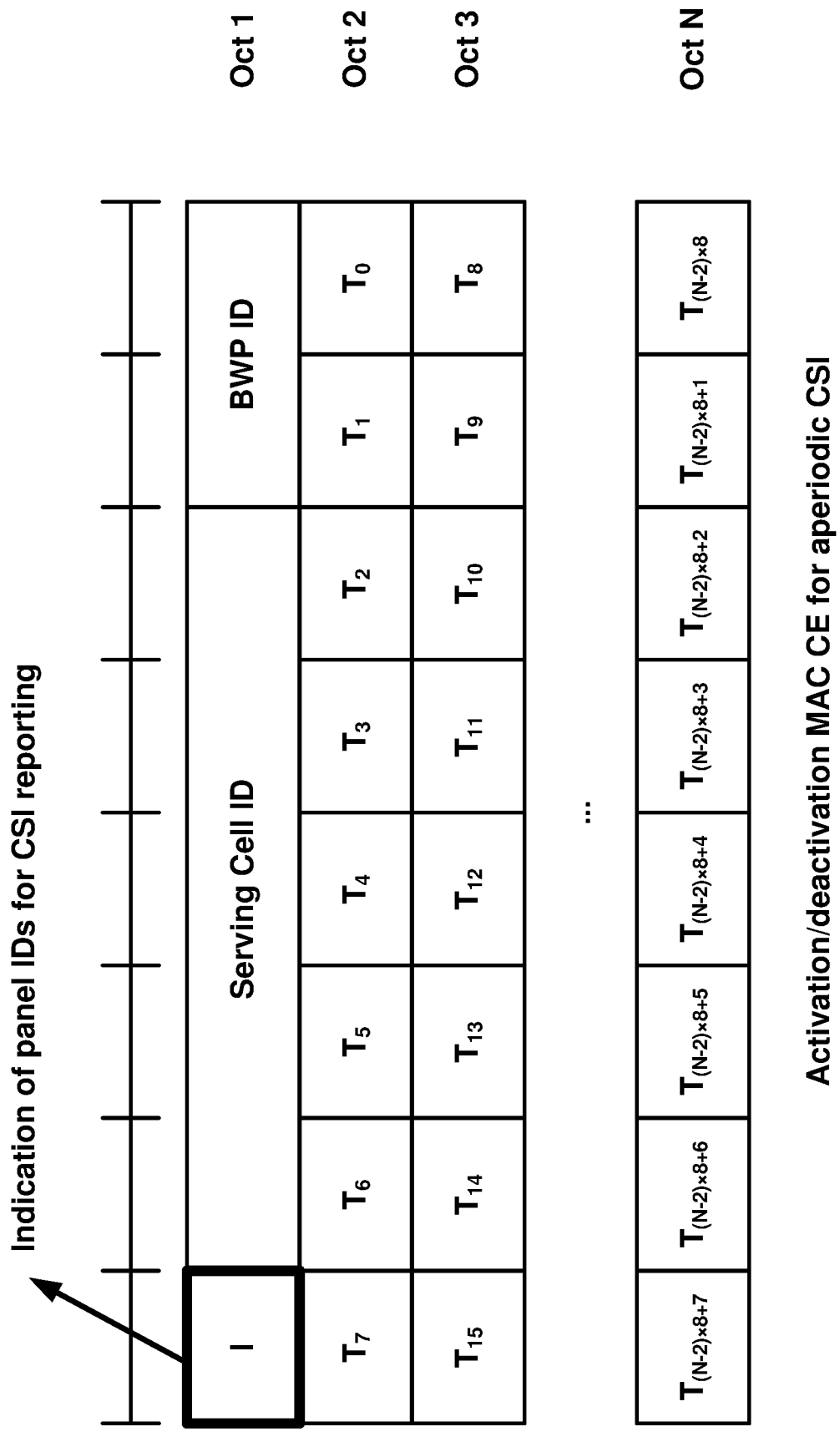
FIG. 46 is a diagram showing application of MAC CE signaling as per an aspect of an example embodiment of the present disclosure.
Figure 47:
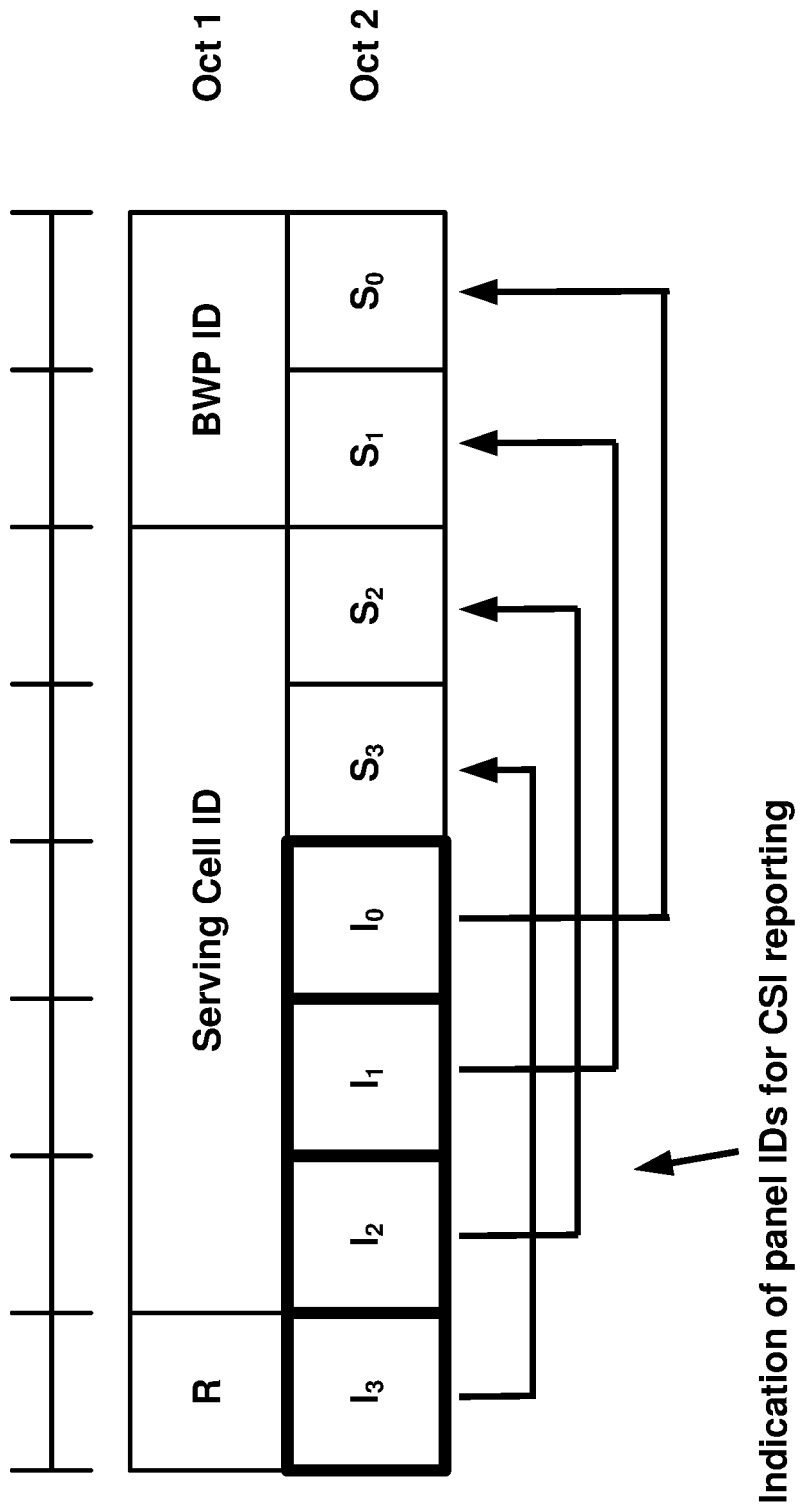
FIG. 47 is a diagram showing application of MAC CE signaling as per an aspect of an example embodiment of the present disclosure.

FIG. 46 and FIG. 47 are example diagrams illustrating applications of MAC CE signaling for activation/deactivation of aperiodic CSI (e.g., FIG. 46) and semi-persistent CSI with PUCCH (e.g., FIG. 47) in accordance with embodiments of the present disclosure. For example, as shown in FIGS. 46 and 47, one or more bits to indicate one or more panel IDs (e.g., indication of panel IDs for CSI reporting) for one or more trigger states/CSI report configs (e.g., Ti or Si) may be supported. The indication bit (e.g., indication of panel IDs for CSI reporting) may be a reserved bit when the usage of dynamic panel ID indication is not configured. The indication bit (e.g., indication of panel IDs for CSI reporting) may indicate one or more panel IDs when the usage of dynamic panel ID indication is configured in RRC configuration by the base station.

Figure 48:
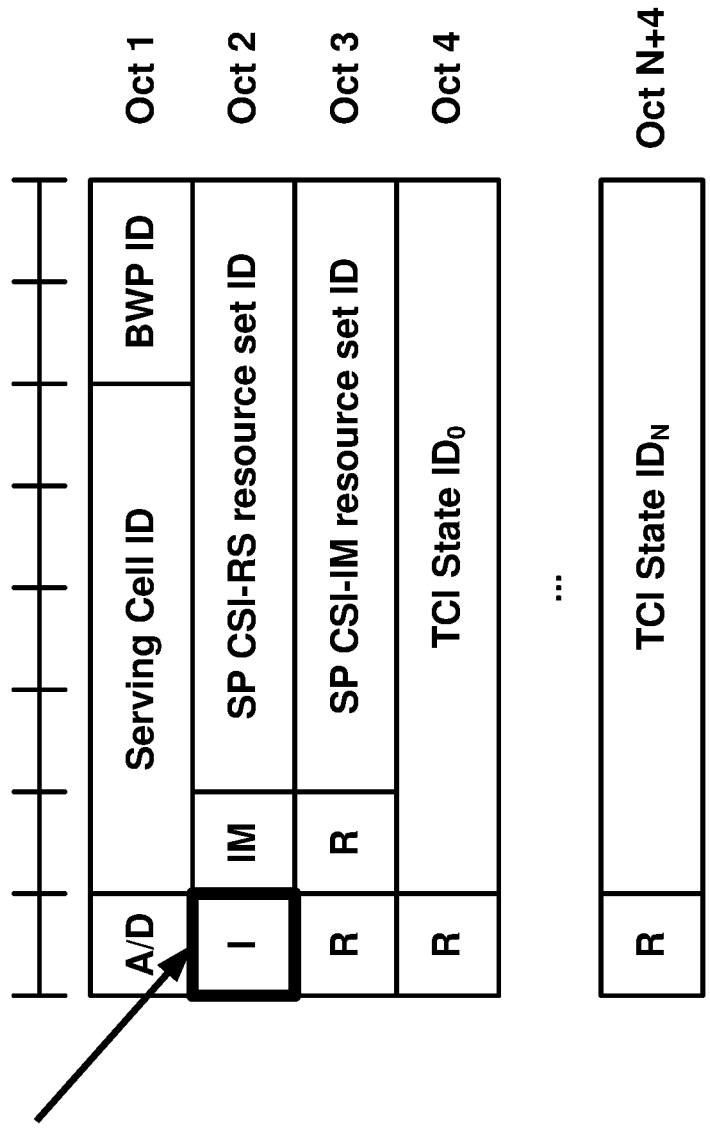
FIG. 48 is a diagram showing application of MAC CE signaling as per an aspect of an example embodiment of the present disclosure.

In an example, the dynamic indication of panel IDs for a CSI report may be supported with a semi-persistent CSI-RS activation/deactivation MAC CE. FIG. 48 is an example diagram illustrating applications of MAC CE signaling for activation/deactivation of semi-persistent CSI-RS and CSI-IM in accordance with embodiments of the present disclosure.

For example, a wireless device may receive a CSI-RS resource set configuration in CSI-RS resource config of RRC configuration from a base station. FIG. 48 is an example diagram illustrating applications of a dynamic panel ID indication for CSI reporting based on a MAC CE signaling for activation/deactivation of semi-persistent CSI-RS in accordance with embodiments of the present disclosure. Based on the configuration, the wireless device may receive a MAC CE signaling for semi-persistent CSI-RS resource set activation/deactivation with a first field (e.g., A/D) and a second field (e.g., Indication of panel IDs for a CSI reporting). The first field (e.g., A/D) may indicate activation and deactivation of the semi-persistent CSI-RS resource set which is indicated by a CSI-RS resource set identity (e.g., SP CSI-RS resource set ID) and the second field (e.g., indication of panel IDs for a CSI reporting) may indicate one or more panels for the semi-persistent CSI-RS resource set. The wireless device may measure one or CSI-RS and/or CSI-IM resource sets via the indicated one or more panels when the wireless device processes a CSI report config which includes the activated CSI-RS resource set. The wireless device may transmit the CSI report. The indication bit of the second field (e.g., indication of panel IDs for a CSI reporting) may be a reserved bit when the usage of dynamic panel ID indication for a CSI report is not configured in RRC configuration. The indication bit (e.g., indication of panel IDs for a CSI reporting) may indicate one or more panels for a CSI reporting when the usage of dynamic panel ID indication for a CSI reporting is configured in RRC configuration.

Figure 49:
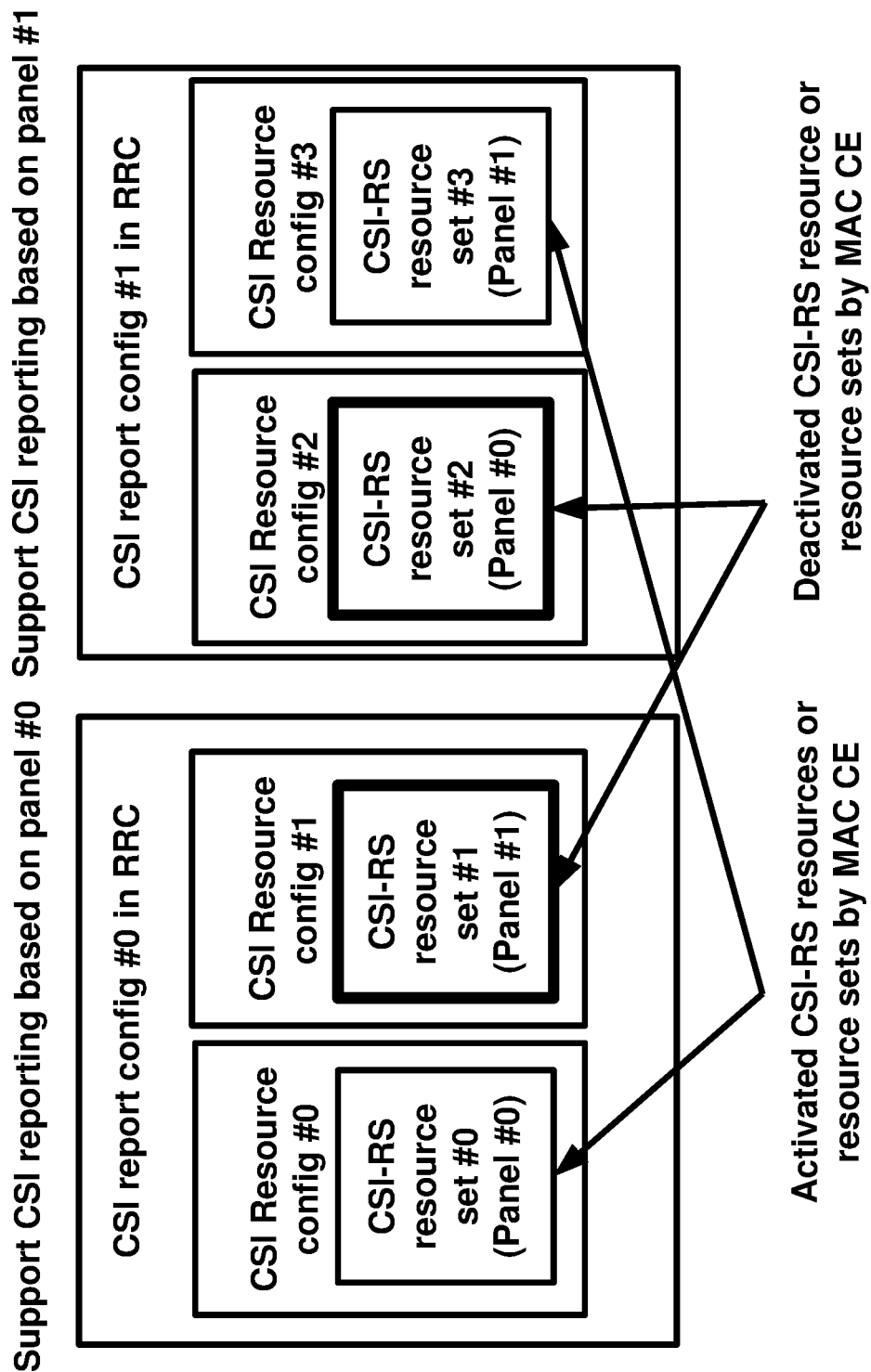
FIG. 49 is a diagram showing operation of CSI-RS activation as per an aspect of an example embodiment of the present disclosure.

In an example, the CSI report type indication may be based on the activated CSI-RS resource set in the CSI report config. FIG. 49 is an example diagram illustrating application of panel ID for a CSI report based on the activated CSI-RS resource set in a CSI resource config in the CSI report config in accordance with embodiments of the present disclosure. For example, a wireless device may receive CSI resource configurations (e.g., CSI Resource config #0, #1, #2 and/or #3) comprising one or more CSI-RS resource sets (e.g., CSI-RS resource set #0, #1, #2 and/or #3) in a CSI report configuration (e.g., CSI report config #0 and/or #1). Based on the configurations, the wireless device may receive a MAC CE signaling indicating activation/deactivation states of the one or more CSI-RS resource sets (e.g., CSI-RS resource set #0, #1, #2 and/or #3). Based on the activation/deactivation states, the wireless device may determine an activated CSI-RS resource set (e.g., CSI-RS resource set #0 or #3) or an activated CSI-RS resource config (CSI Resource config #0 or #3) in the CSI report configuration (e.g., CSI report config #0 or #1). Based on the configured panels (e.g., panel #0 or panel #1) in the activated CSI-RS resource set (e.g., CSI-RS resource set #0 or #3) or resource configs (e.g., CSI-RS Resource config #0 or #3), the wireless device may measure CSI-RS resources in the activated resource set (e.g., CSI-RS resource set #0 or #3) via the configured panel (e.g., panel #0 or #1). The configurations of panel ID may only exist in CSI Resource configs for channel measurement or CSI-RS resource sets in a CSI Resource config for channel measurement since the wireless device may use only one panel assumption for both channel and interference measurements.

It should be noted that a CSI resource config in the embodiments of the present disclosure may also be referred to as a CSI-RS resources or a CSI-RS resource sets.

In an example, a wireless device may receive a downlink control information (DCI) comprising a first field triggering one or more channel state information (CSI) report configurations indicating one or more reference signals (RSs) and a second field indicating a panel of a plurality of panels at the wireless device for the one or more CSI report configurations. The wireless device may transmit a CSI report based on a measurement of the one or more reference signals received by the indicated panel. The wireless device may receive at least one radio resource control (RRC) message comprising the CSI report configuration. The one or more reference signals may comprise channel state information-reference signals (CSI-RSs). The one or more reference signals may comprise synchronization signal blocks (SSBs). The indication of the panel may comprise an indication of a sounding reference signal (SRS) resource set identity. The indication of the panel may comprise an indication of an uplink (UL) transmission configuration indication (TCI). The CSI report may be transmitted via a physical uplink shared channel (PUSCH). The CSI report may comprise an aperiodic CSI report. The CSI report may comprise a semi-persistent CSI report with PUSCH. A presence of the second field may be RRC configured. The wireless device may transmit a capability of the wireless device for a usage of the second field to a base station. The CSI report configuration may comprise CSI report configuration identity. The CSI report configuration may comprise serving cell identity. The CSI report configuration may comprise CSI-RS resources for channel measurement. The CSI report configuration may comprise channel state information-interference measurement (CSI-IM) resources for interference measurement. The CSI report configuration may comprise CSI-RS resources for interference measurement. The CSI report configuration may comprise report config type. The CSI report configuration may comprise report quantity. The CSI report configuration, wherein the CSI report configuration may comprise report frequency configuration. The CSI report configuration may comprise time restriction for channel measurements. The CSI report configuration may comprise time restriction for interference measurements. The CSI report configuration may comprise codebook config. The CSI report configuration may comprise time restriction for channel quality indicator (CQI) table configuration. The CSI report configuration comprises subband size.

In an example, a wireless device may receive a medium access control control element (MAC CE) indicating a panel of a plurality of panels at the wireless device. The wireless device may transmit a CSI report based on a measurement of the one or more reference signals received by the indicated panel. The wireless device may receive at least one radio resource control (RRC) message comprising the CSI report configuration. The one or more reference signals may comprise channel state information-reference signals (CSI-RSs). The one or more reference signals may comprise synchronization signal blocks (SSBs). The indication of a panel may comprise an indication sounding reference signal (SRS) resource set identity. The indication of a panel may comprise an indication of uplink (UL) transmission configuration indication (TCI). The CSI report may be transmitted via a physical uplink shared channel (PUCCH). The CSI report may comprise a periodic CSI report. The CSI report may comprise a semi-persistent CSI report with PUCCH. The CSI report may be transmitted via a physical uplink control channel (PUSCH). The CSI report may comprise an aperiodic CSI report. The CSI report may comprise a semi-persistent CSI report with PUSCH. The wireless device may transmit a capability of the wireless device for a usage of the second field to a base station. The CSI report configuration may comprise CSI report configuration identity. The CSI report configuration may comprise serving cell identity. The CSI report configuration may comprise CSI-RS resources for channel measurement. The CSI report configuration may comprise channel state information-interference measurement (CSI-IM) resources for interference measurement. The CSI report configuration may comprise CSI-RS resources for interference measurement. The CSI report configuration may comprise report config type. The CSI report configuration may comprise report quantity. The CSI report configuration, wherein the CSI report configuration may comprise report frequency configuration. The CSI report configuration may comprise time restriction for channel measurements. The CSI report configuration may comprise time restriction for interference measurements. The CSI report configuration may comprise codebook config. The CSI report configuration may comprise time restriction for channel quality indicator (CQI) table configuration. The CSI report configuration comprises subband size.

In an example, a wireless device may receive a medium access control control element (MAC CE) comprising a first field activating one or more channel state information (CSI) report configurations indicating one or more reference signals and a second field indicating a panel of a plurality of panels at the wireless device. The wireless device may transmit a CSI report based on a measurement of the one or more reference signals received by the indicated panel. The wireless device may receive at least one radio resource control (RRC) message comprising the CSI report configuration. The one or more reference signals may comprise channel state information-reference signals (CSI-RSs). The one or more reference signals may comprise synchronization signal blocks (SSBs). The indication of a panel may comprise an indication sounding reference signal (SRS) resource set identity. The indication of a panel may comprise an indication of uplink (UL) transmission configuration indication (TCI). The CSI report may be transmitted via a physical uplink shared channel (PUCCH). The CSI report may comprise a periodic CSI report. The CSI report may comprise a semi-persistent CSI report with PUCCH. A presence of the second field may be RRC configured. The wireless device may transmit a capability of the wireless device for a usage of the second field to a base station. The CSI report configuration may comprise CSI report configuration identity. The CSI report configuration may comprise serving cell identity. The CSI report configuration may comprise CSI-RS resources for channel measurement. The CSI report configuration may comprise channel state information-interference measurement (CSI-IM) resources for interference measurement. The CSI report configuration may comprise CSI-RS resources for interference measurement. The CSI report configuration may comprise report config type. The CSI report configuration may comprise report quantity. The CSI report configuration, wherein the CSI report configuration may comprise report frequency configuration. The CSI report configuration may comprise time restriction for channel measurements. The CSI report configuration may comprise time restriction for interference measurements. The CSI report configuration may comprise codebook config. The CSI report configuration may comprise time restriction for channel quality indicator (CQI) table configuration. The CSI report configuration comprises subband size.

A wireless device may receive a medium access control control element (MAC CE) comprising a first field activating one or more channel state information reference signal (CSI-RS) resource sets and a second field indicating a panel of a plurality of panels at the wireless device for the one or more CSI-RS resource sets. The wireless device may transmit a CSI report based on a measurement of the one or more CSI-RS sets received by the indicated panel. The wireless device may receive at least one radio resource control (RRC) message comprising the CSI report configuration. The one or more CSI-RS resource sets may comprise semi-persistent CSI-RS resource sets. The indication of a panel may comprise an indication sounding reference signal (SRS) resource set identity. The indication of a panel may comprise an indication of uplink (UL) transmission configuration indication (TCI). The CSI report may be transmitted via a physical uplink shared channel (PUCCH). The CSI report may comprise a periodic CSI report. The CSI report may comprise a semi-persistent CSI report with PUCCH. The CSI report may comprise reported via a physical uplink control channel (PUSCH). The CSI report may comprise an aperiodic CSI report. The CSI report may comprise a semi-persistent CSI report with PUSCH. A presence of the second field may be RRC configured. The wireless device may report a capability of the wireless device for a usage of the second field to a base station. The CSI report configuration may comprise CSI report configuration identity. The CSI report configuration may comprise serving cell identity. The CSI report configuration may comprise CSI-RS resources for channel measurement. The CSI report configuration may comprise channel state information-interference measurement (CSI-IM) resources for interference measurement. The CSI report configuration may comprise CSI-RS resources for interference measurement. The CSI report configuration may comprise report config type. The CSI report configuration may comprise report quantity. The CSI report configuration, wherein the CSI report configuration may comprise report frequency configuration. The CSI report configuration may comprise time restriction for channel measurements. The CSI report configuration may comprise time restriction for interference measurements. The CSI report configuration may comprise codebook config. The CSI report configuration may comprise time restriction for channel quality indicator (CQI) table configuration. The CSI report configuration comprises subband size.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A wireless device comprising:
   one or more processors; and
   memory storing instructions that, when executed by the one or more processors, cause the wireless device to:
      receive configuration parameters of channel state information (CSI) resource configurations for a CSI report configuration of a cell, the CSI resource configurations comprising:
         first CSI resource configurations associated with a first transmission reception point (TRP) of the cell; and
         second CSI resource configurations associated with at least two TRPs of the cell, wherein the at least two TRPs comprise the first TRP;
      receive a command comprising:
         a first field triggering the CSI report configuration of the cell; and
         a second field indicating whether the CSI report configuration is associated with the first CSI resource configurations or the second CSI resource configurations; and
      transmit, based on the CSI report configuration and in response to the second field indicating the CSI report configuration is associated with the second CSI resource configurations, a CSI report comprising one or more CSI quantities of the at least two TRPs.

2. The wireless device of claim 1, wherein the configuration parameters indicate the second field is present in the command.

3. The wireless device of claim 1, wherein the command is a downlink control information (DCI) via a physical downlink control channel.

4. The wireless device of claim 1, wherein each of the first CSI resource configurations and the second CSI resource configurations comprise at least one of:
   a CSI resource configuration index identifying the CSI resource configuration;
   one or more CSI reference signals (RSS);
   a bandwidth part index; or
   a resource type indicator.

5. The wireless device of claim 1, wherein the configuration parameters comprise at least one of:
   a CSI report configuration index identifying the CSI report configuration;
   a carrier indicator;
   a CSI report configuration type indicator;
   one or more report quantity indicators;
   a report frequency parameter; or
   one or more time domain configuration parameters.

6. The wireless device of claim 1, wherein the one or more CSI quantities comprise at least one of:
   rank indicators for the at least two TRPs;
   precoding matrix indicators for the at least two TRPs; or
   channel quality indicators for the at least two TRPs.

7. The wireless device of claim 1, further comprising receiving one or more configuration parameters of a plurality of control resource sets (CORESETs) grouped into CORESET groups, wherein:
   a CORESET group of the CORESET groups corresponds to a respective TRP of the at least two TRPs; and
   each of the plurality of CORESETs:
      is identified by a CORESET index; and
      belongs to a CORESET group of the CORESET groups.

8. A base station comprising:
   one or more processors; and
   memory storing instructions that, when executed by the one or more processors, cause the base station to:
      transmit configuration parameters of channel state information (CSI) resource configurations for a CSI report configuration of a cell, the CSI resource configurations comprising:
         first CSI resource configurations associated with a first transmission reception point (TRP) of the cell; and
         second CSI resource configurations associated with at least two TRPs of the cell, wherein the at least two TRPs comprise the first TRP;
      transmit a command comprising:
         a first field triggering the CSI report configuration of the cell; and
         a second field indicating whether the CSI report configuration is associated with the first CSI resource configurations or the second CSI resource configurations; and
      receive, based on the CSI report configuration and in response to the second field indicating the CSI report configuration is associated with the second CSI resource configurations, a CSI report comprising one or more CSI quantities of the at least two TRPs.

9. The base station of claim 8, wherein the configuration parameters indicate the second field is present in the command.

10. The base station of claim 8, wherein the command is a downlink control information (DCI) via a physical downlink control channel.

11. The base station of claim 8, wherein each of the first CSI resource configurations and the second CSI resource configurations comprise at least one of:
    a CSI resource configuration index identifying the CSI resource configuration;
    one or more CSI reference signals (RSs);
    a bandwidth part index; or
    a resource type indicator.

12. The base station of claim 8, wherein the configuration parameters comprise at least one of:
    a CSI report configuration index identifying the CSI report configuration;
    a carrier indicator;
    a CSI report configuration type indicator;
    one or more report quantity indicators;

a report frequency parameter; or one or more time domain configuration parameters.

13. The base station of claim 8, wherein the one or more CSI quantities comprise at least one of:

rank indicators for the at least two TRPs;

precoding matrix indicators for the at least two TRPs; or channel quality indicators for the at least two TRPs.

14. The base station of claim 8, wherein the instructions further cause the base station to receive one or more configuration parameters of a plurality of control resource sets (CORESETs) grouped into CORESET groups, wherein:

a CORESET group of the CORESET groups corresponds to a respective TRP of the at least two TRPs; and each of the plurality of CORESETs:

is identified by a CORESET index; and belongs to a CORESET group of the CORESET groups.

15. A non-transitory computer-readable medium comprising instructions that, when executed by one or more processors of a wireless device, cause the wireless device to:

receive configuration parameters of channel state information (CSI) resource configurations for a CSI report configuration of a cell, the CSI resource configurations comprising:

first CSI resource configurations associated with a first transmission reception point (TRP) of the cell; and second CSI resource configurations associated with at least two TRPs of the cell, wherein the at least two TRPs comprise the first TRP;

receive a command comprising:

a first field triggering the CSI report configuration of the cell; and a second field indicating whether the CSI report configuration is associated with the first CSI resource configuration or the second CSI resource configurations; and transmit, based on the CSI report configuration and in response to the second field indicating the CSI report configuration is associated with the second CSI resource configurations, a CSI report comprising one or more CSI quantities of the at least two TRPs.

16. The non-transitory computer-readable medium of claim 15, wherein the configuration parameters indicate the second field is present in the command.

17. The non-transitory computer-readable medium of claim 15, wherein the command is a downlink control information (DCI) via a physical downlink control channel.

18. The non-transitory computer-readable medium of claim 15, wherein each of the first CSI resource configuration and the second CSI resource configurations comprise at least one of:

a CSI resource configuration index identifying the CSI resource configuration;

one or more CSI reference signals (RSs);

a bandwidth part index; or a resource type indicator.

19. The non-transitory computer-readable medium of claim 15, wherein the configuration parameters comprising at least one of:

a CSI report configuration index identifying the CSI report configuration;

a carrier indicator;

a CSI report configuration type indicator;

one or more report quantity indicators;

a report frequency parameter; or one or more time domain configuration parameters.

20. The non-transitory computer-readable medium of claim 15, wherein the one or more CSI quantities comprise at least one of:

rank indicators for the at least two TRPs;

precoding matrix indicators for the at least two TRPs; or channel quality indicators for the at least two TRPs.

* * * * *